(12) United States Patent
Kakutani

(10) Patent No.: US 6,215,561 B1
(45) Date of Patent: Apr. 10, 2001

(54) IMAGE PROCESSING APPARATUS AND IMAGE PROCESSING METHOD

(75) Inventor: Toshiaki Kakutani, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/987,375

(22) Filed: Dec. 9, 1997

(30) Foreign Application Priority Data

Feb. 28, 1997 (JP) .................................................. 9-062476

(51) Int. Cl.⁷ .................................................. G06K 15/00
(52) U.S. Cl. .............................................. 358/1.9; 358/1.1
(58) Field of Search .................................. 395/101, 105, 395/109, 112; 358/518, 519, 520, 521, 523, 530, 531, 532, 533, 534, 535, 536, 525; 382/167, 274, 275, 252, 162; 345/153, 152, 155, 150, 431

(56) References Cited

U.S. PATENT DOCUMENTS

| | | | |
|---|---|---|---|
| 5,214,294 | * | 5/1993 | Toyofuku .................. 250/559.05 |
| 5,293,254 | * | 3/1994 | Eschbach ...................... 358/445 |
| 5,293,579 | * | 3/1994 | Stockholm .................... 382/269 |
| 5,436,739 | * | 7/1995 | Imao et al. .................... 358/518 |
| 5,600,764 | * | 2/1997 | Kukatani ...................... 345/431 |
| 5,610,732 | * | 3/1997 | Komatsu ...................... 358/525 |
| 5,701,366 | * | 12/1997 | Ostromoukhov et al. ........... 382/237 |
| 5,795,082 | * | 8/1998 | Shimada et al. ............... 400/120.09 |
| 5,801,678 | * | 9/1998 | Huang et al. .................. 345/127 |
| 5,831,751 | * | 11/1998 | Ohneda et al. .................. 358/521 |

FOREIGN PATENT DOCUMENTS

| | | |
|---|---|---|
| 63-2669 | 1/1988 | (JP) . |
| 3-18177 | 1/1991 | (JP) . |
| 3-34767 | 2/1991 | (JP) . |
| 3-80767 | 4/1991 | (JP) . |
| 3-147480 | 6/1991 | (JP) . |
| 4-144481 | 5/1992 | (JP) . |
| 4-185075 | 7/1992 | (JP) . |
| 7-030772 | 1/1995 | (JP) . |

\* cited by examiner

*Primary Examiner*—Arthur G. Evans
(74) *Attorney, Agent, or Firm*—Oblon, Spivak, McClelland, Maier & Neustadt, P.C.

(57) ABSTRACT

The image processing technique of the present invention prevents the deterioration of picture quality due to quantization errors caused by conversion of the tone number, which allocates image data to lattice points previously set in a color space. Pre-conversion of the tone number allocates original color image data to peripheral lattice points among the lattice points set by dividing the color space into lattices. The allocation of the original color image data to the peripheral lattice points causes quantization errors. The allocation, however, causes the mean error to be not greater than a predetermined value, in order to output desirable colors in a resulting image. The color space may be divided into smaller areas in a low-density range. This minimizes the deterioration of picture quality due to the quantization errors. A smoothing process carried out after the pre-conversion of the tone number relieves the effect of the quantization errors and further improves the picture quality.

40 Claims, 32 Drawing Sheets

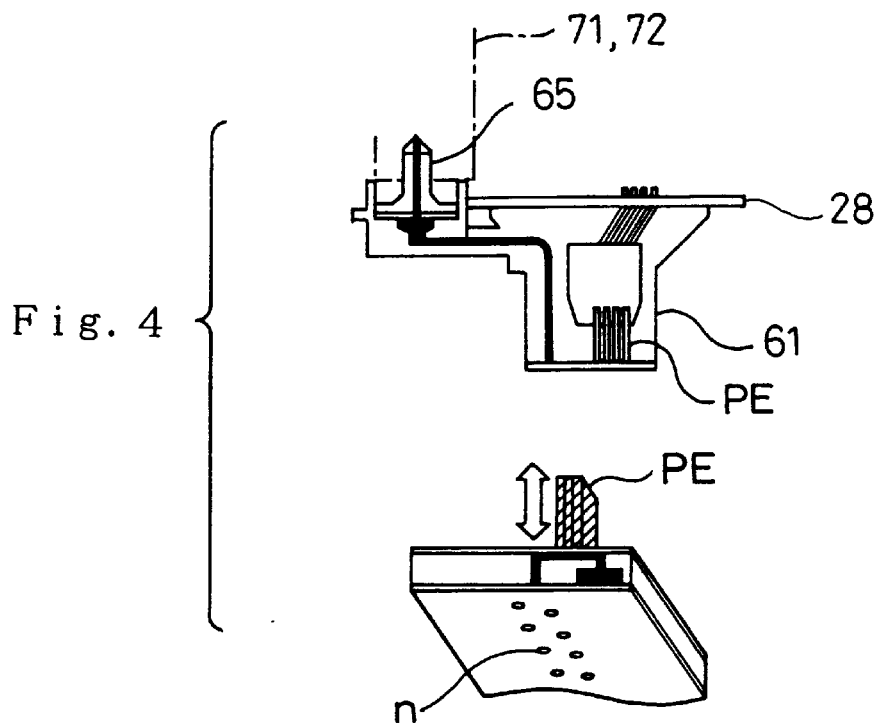
Fig. 4
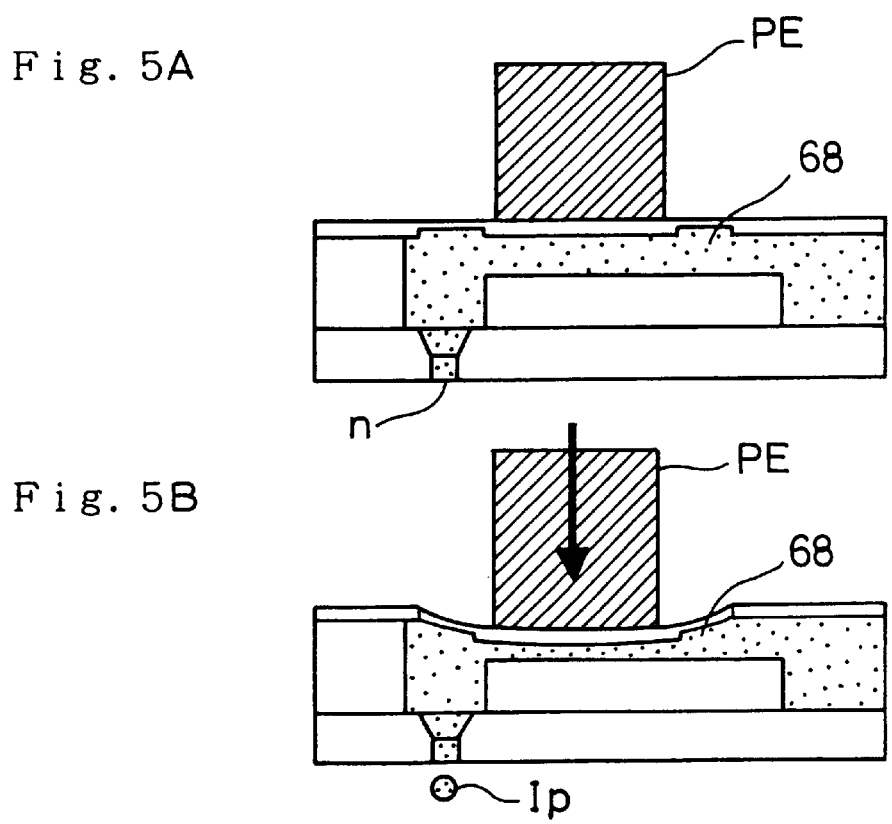
Fig. 5A
Fig. 5B

Fig. 10
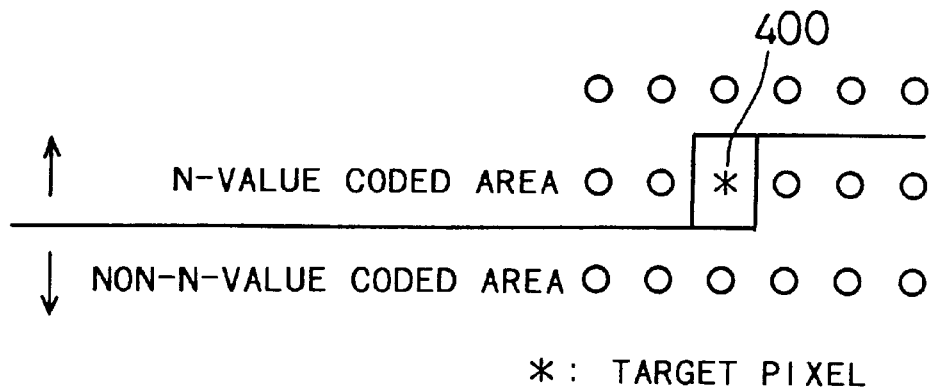
∗ : TARGET PIXEL
Fig. 11A
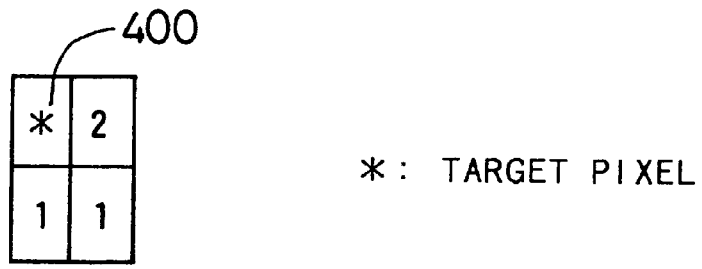
∗ : TARGET PIXEL
Fig. 11B
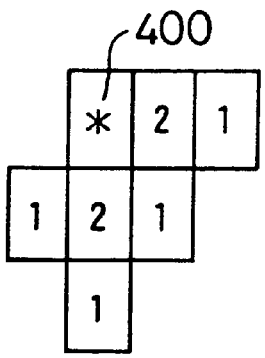
Fig. 11D
Fig. 11C
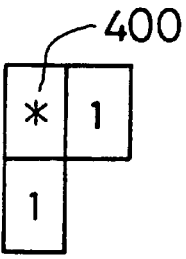
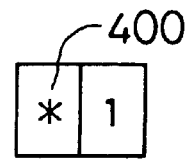

```
#define Nr 16
#define Ng 16
#define Nb  8
unsigned char C_table[Nr][Ng][Nb];
unsigned char M_table[Nr][Ng][Nb];
unsigned char Y_table[Nr][Ng][Nb];
```

```
C=C_table[i][j][k];
M=M_table[i][j][k];
Y=Y_table[i][j][k];
```

```
if data_C[p][q] ≥ slsh, result_C=255
if data_C[p][q] < slsh, result_C=0
```

```
#define Nr  16
#define Ng  16
#define Nb   8
unsigned char C_table[Nr][Ng][Nb];
unsigned char M_table[Nr][Ng][Nb];
unsigned char Y_table[Nr][Ng][Nb];
unsigned char K_table[Nr][Ng][Nb];
```

Fig. 37

COMPOSITION AND PROPERTIES OF INKS

|  |  | C1 | C2 | M1 | M2 | Y | Bk |
|---|---|---|---|---|---|---|---|
| Dyes | Directblue199 | 3.6 | 0.9 |  |  |  |  |
|  | Acidred289 |  |  | 2.8 | 0.7 |  |  |
|  | Directyellow86 |  |  |  |  | 1.8 |  |
|  | Foodblack2 |  |  |  |  |  | 4.8 |
| Diethylene glycol | | 30 | 35 | 20 | 25 | 30 | 25 |
| Surfinol 465 | | 1 | 1 | 1 | 1 | 1 | 1 |
| Water | | 65.4 | 63.1 | 76.2 | 73.3 | 67.2 | 69.2 |
| Viscosity (mPa·s) | | 3.0 | 3.0 | 3.0 | 3.0 | 3.0 | 3.0 |

IMAGE PROCESSING APPARATUS AND IMAGE PROCESSING METHOD

BACKGROUND OF THE INVENTION

1. Field of the Invention

The present invention relates to an image processing apparatus, an image processing method, and a computer program product for carrying out the image processing. More specifically the present invention pertains to an image processing apparatus that causes input color image data to be subjected to a color correction process and outputs the color-adjusted image data, and a method of the same.

2. Description of the Related Art

In known image processing apparatuses, image data representing a color original are read with an image input unit, such as a scanner, and reproduced and displayed, for example, on a display like a CRT or with a color printer.

The image output units, such as displays and color printers, have characteristic color reproducing properties. In order to enable the color of an original color image input with a scanner to be accurately reproduced irrespective of the characteristics of the image output unit, some proposed techniques carry out color correction suitable for the color reproducing properties of the image output unit. One of such known techniques is disclosed in JAPANESE PATENT LAYING-OPEN GAZETTE No. 63-2669. This prior art technique uses a three-dimensional RGB color correction table that corresponds to all the possible combinations of three color components, R (red), G (green), and B (blue). Color correction data regarding all the positions in a color space defined by three-dimensional coordinates are stored in advance in this color correction table. The image processing apparatus refers to the color correction table to carry out color correction.

This prior art technique of color correction, however, requires an extremely large storage capacity for the color correction table and is thus not practical. By way of example, in case that input original color image data have 256 tones (8 bits) for the respective color components R, G, and B, the total number of colors is given as the third power of 256 that amounts to approximately 16780 thousands. Provided that resulting color-adjusted data are also 8-bit data, the total required capacity for the color correction table is 48 megabytes for the three color components R, G, and B.

Other prior art techniques of color correction proposed to reduce the required capacity of the color correction table store only data corresponding to restricted lattice points into the color correction table and correct color data between the lattice points by interpolation with data of the lattice points (for example, JAPANESE PATENT LAYING-OPEN GAZETTE No.4-14481 and No.4-185075). These techniques, however, require a relatively long time for interpolation, although reducing the storage capacity required for the color correction table. This is especially disadvantageous when image data have high resolution and fine tone expression for each pixel. This lengthens the operation time required for outputting one page of image and thereby the wait time for completed output of resulting images. Simplified interpolation, on the other hand, deteriorates the reproducing properties of color.

The applicant of the present invention has proposed an image processing technique that does not increase the storage capacity required for the color correction table nor require time-consuming interpolation for color correction (see, for example, JAPANESE PATENT LAYING-OPEN GAZETTE No. 7-30772). This image processing technique divides a color space at predetermined intervals, provides color correction data only for lattice points obtained by the division, and allocates image data between the lattice points to any one of the peripheral lattice points, thereby implementing color correction without interpolation. Allocation of the original image data to a peripheral lattice point causes an error. The technique accordingly allocates image data regarding each pixel included in an original image to any one of peripheral lattice points, in such a manner as to minimize the errors on average.

Although an error exists in color of each pixel, the prior art image processing technique virtually cancels the errors in a predetermined area. This significantly shortens the operation time required for image processing without deteriorating the quality of output images. Some deterioration of the picture quality is, however, observed in a low-density range, in case that the image output unit for outputting an image has a significantly small number of expressible tones, for example, an ink jet printer that enables only binary expression. In the low-density range where dots are sparsely distributed, even a small noise (that is, quantization error caused by allocation of image data to a peripheral lattice point) causes the position of dots to be significantly shifted.

This prior art image processing technique may allocate image data of adjoining pixels having the same color in the original image to different lattice points. Rough division of the color space for reducing the number of lattice points and decreasing the storage capacity of the color correction table may cause a significant difference between the output colors of these adjoining pixels. This results in deteriorating the quality of the output image.

SUMMARY OF THE INVENTION

One object of the present invention is thus to improve the quality of an output image, especially in a low-density range, without increasing operations for color correction.

Another object of the present invention is to provide a simple technique for carrying out such color correction.

At least part of the above and the other related objects is realized by a first image processing apparatus for causing a multi-color original image expressed by coordinate values in a multi-dimensional color space to be subjected to color correction and outputting a color-adjusted resulting image. The first image processing apparatus includes: input means for inputting color image data with respect to each pixel included in the original image, coordinate values of the color image data being expressed by a predetermined number of tones; lattice point information storage means for dividing the color space by a number of tones, which is less than the predetermined number of tones expressing the coordinate values of the color image data, in such a manner that a predetermined low-density range of the color space is divided into smaller areas than the other density ranges, and storing coordinate values of lattice points in the color space obtained by carrying out the division for each dimension; a color correction table for storing correction data regarding color of the color image data corresponding to each lattice point; lattice point conversion means for converting the coordinate values of the input color image data in the color space to coordinate values of a specific lattice point stored in the lattice point information storage means according to a technique that makes mean offset of the coordinate values of the input color image data from the coordinate values of the specific lattice point not greater than a predetermined value; and color correction means for reading correction data of the specific lattice point corresponding to the converted coordinate values from the color correction table and outputting the correction data read from the color correction table as corrected color image data.

A first image processing method corresponding to this first image processing apparatus causes a multi-color original image expressed by coordinate values in a multi-dimensional color space to be subjected to color correction and outputs a color-adjusted resulting image. The first image processing method includes the steps of:

(a) inputting color image data with respect to each pixel included in the original image, coordinate values of the color image data being expressed by a predetermined number of tones;

(b) dividing the color space by a number of tones, which is less than the predetermined number of tones expressing the coordinate values of the color image data, in such a manner that a predetermined low-density range of the color space is divided into smaller areas than the other density ranges, and storing coordinate values of lattice points in the color space obtained by carrying out the division for each dimension;

(c) providing a color correction table for storing correction data regarding color of the color image data corresponding to each lattice point;

(d) converting the coordinate values of the input color image data in the color space to coordinate values of a specific lattice point stored in the step (b) according to a technique that makes mean offset of the coordinate values of the input color image data from the coordinate values of the specific lattice point not greater than a predetermined value; and (e) reading correction data of the specific lattice point corresponding to the converted coordinate values from the color correction table and outputting the correction data read from the color correction table as corrected color image data.

In the first image processing apparatus and the corresponding first image processing method, a multi-dimensional color space is divided by a number of tones that is smaller than a predetermined number of tones for expressing coordinate values in the color space, and coordinate values of lattice points obtained by the division for each dimension are stored. A color correction data stores correction data regarding color of color image data corresponding to each lattice point. Color image data, whose coordinate values are expressed by the predetermined number of tones, are input with respect to each pixel included in the original image. The coordinate values of the input color image data are converted to coordinate values of a specific lattice point, according to a technique that makes mean offset of the coordinate values of the input color image data from the coordinate values of the specific lattice point not greater than a predetermined value. Such conversion enables color correction without the time-consuming, complicated interpolation with a plurality of lattice point data. The color space is divided into smaller areas in a low-density range, so that data in the low-density range have narrower intervals in the color correction table. This structure decreases the quantization error, which is caused by the conversion of the coordinate values of input data to the coordinate values of a lattice point, in the low-density range where the quantization noise has significant effects, thereby effectively preventing the deterioration of picture quality. This technique enables high-speed color correction suitable for an image output unit and gives a resulting image of desirable quality and favorable color reproduction.

The low-density range herein represents a range in which the low density of dots are output to the image output unit. For example, in the case of an ink jet printer that expresses tones of a resulting output image by the on/off state of dots, the low-density range represents a range of low density of ink dots, such as C, M, and Y. In the case of a CRT, on the other hand, the low-density range represents either a range in which white dots are sparsely distributed (the high-density range in the whole image) or a range in which black dots are sparsely distributed (the low-density range in the whole image). In the case of a printer that uses higher-density ink and lower-density ink for the same hue and prints both deep dots and light dots, the low-density range represents either a range in which light dots are sparsely distributed (low-density range in the whole image) or a range in which deep dots are sparsely distributed.

A variety of color spaces may be adopted for the multi-dimensional color space of the present invention; for example, the RGB or CMY color space, a color space expressed by the XYZ colorimetric system, the L*a*b* colorimetric system, the L*C*h colorimetric system, and the Munsell's colorimetric system. In case that the coordinate values are expressed by n-bit digital data, the number of tones is often given as the n-th power of 2 (256 in the case of 8-bit data). The number of tones may, however, be other than the n-th power of 2; for example, 100 tones and 17 tones. In the above structure, the low-density range includes a greater number of lattice points. Another preferable structure narrows the intervals of tones with respect to each color component of the color image data corrected by the color correction means in the low-density range. This structure decreases the quantization error of the color-adjusted data due to the conversion of tone number in the low-density range, thereby effectively preventing the deterioration of picture quality when the color space is divided by a less number of tones.

It is desirable that the number of tones used for expressing image data output after the image processing is greater than the final number of tones suitable for the image output unit. The image data are given to the image output unit after conversion to the final number of tones. The quantization error caused by the allocation to lattice points is smaller than the error caused by the conversion to the final number of tones suitable for the image output unit. This results in preventing the deterioration of picture quality due to the allocation to lattice points.

The conversion of the coordinate values of the input color image data to the coordinate values of a lattice point may be carried out according to the error diffusion method or according to the systematic dither method using a threshold matrix of discrete dither. These methods appropriately disperse the quantization error.

In case that a combination of the densities of plural basic colors constitutes color image data like the RGB or the CMY system, the tones expressing the coordinate values in the color space directly correspond to the densities of the respective color components of the color image data. The color correction table stores information on the tones or the densities of the respective color components of the color image data. In this case, a predetermined low-density range of the color space is divided, in such a manner that the intervals of the tones of each color component of the color image data are narrower in the predetermined low-density range than in the other density ranges.

The color correction table used for correcting color of the color image data stores correction data compatible with the color reproducing properties of an image output unit for eventually processing the color image data. There are a variety of purposes of color correction. Color correction suitable for the color reproducing properties of the image output unit is often required in the image processing.

At least part of the objects is also realized by a second image processing apparatus for causing a multi-color original image expressed by coordinate values in a multi-dimensional color space to be subjected to color correction and outputting a color-adjusted resulting image. The second image processing apparatus includes: input means for inputting color image data with respect to each pixel included in the original image, coordinate values of the color image data being expressed by a predetermined number of tones; lattice point information storage means for dividing the color space by a number of tones, which is less than the predetermined number of tones expressing the coordinate values of the color image data, in such a manner that a predetermined low-density range of the color space is divided into smaller areas than the other density ranges, and storing coordinate values of lattice points in the color space obtained by carrying out the division for each dimension; a color correction table for storing correction data regarding color of the color image data corresponding to each lattice point; lattice point conversion means for converting the coordinate values of the input color image data in the color space to coordinate values of a specific lattice point stored in the lattice point information storage means according to a technique that makes mean offset of the coordinate values of the input color image data from the coordinate values of the specific lattice point not greater than a predetermined value; color correction data reading means for reading correction data of the specific lattice point corresponding to the converted coordinate values from the color correction table; and color correction means for selecting a first value corresponding to a main color among the correction data of the specific lattice point read by the color correction data reading means, reading a second value corresponding to the main color among correction data of an adjoining lattice point that has a coordinate value with respect to the main color different from that of the specific lattice point, carrying out interpolation with the first value and the second value, and outputting correction data including the coordinate value with respect to the main color replaced by a result of the interpolation as resulting corrected color image data.

A second image processing method corresponding to this second image processing apparatus causes a multi-color original image expressed by coordinate values in a multi-dimensional color space to be subjected to color correction and outputs a color-adjusted resulting image. The second image processing method includes the steps of:

(a) inputting color image data with respect to each pixel included in the original image, coordinate values of the color image data being expressed by a predetermined number of tones;

(b) dividing the color space by a number of tones, which is less than the predetermined number of tones expressing the coordinate values of the color image data, in such a manner that a predetermined low-density range of the color space is divided into smaller areas than the other density ranges, and storing coordinate values of lattice points in the color space obtained by carrying out the division for each dimension;

(c) providing a color correction table for storing correction data regarding color of the color image data corresponding to each lattice point;

(d) converting the coordinate values of the input color image data in the color space to coordinate values of a specific lattice point stored in the step (b) according to a technique that makes mean offset of the coordinate values of the input color image data from the coordinate values of the specific lattice point not greater than a predetermined value;

(e) reading correction data of the specific lattice point corresponding to the converted coordinate values from the color correction table; and (f) selecting a first value corresponding to a main color among the correction data of the specific lattice point read in the step (e), reading a second value corresponding to the main color among correction data of an adjoining lattice point that has a coordinate value with respect to the main color different from that of the specific lattice point, carrying out interpolation with the first value and the second value, and outputting correction data including the coordinate value with respect to the main color replaced by a result of the interpolation as resulting corrected color image data.

Like the first image processing apparatus and the first image processing method, the second image processing apparatus and the corresponding second image processing method ensure the less deteriorating quality of the image in the low-density range. This second technique carries out the interpolation only for the main color using the correction data read from the color correction table. This technique can effectively prevent the deterioration of picture quality due to the conversion of the coordinate values in the color space to the coordinate values of the lattice points, with no substantial complication of the operations. Such interpolation may be executed only in the low-density range where the quantization error due to the conversion of tone number has significant effects.

The interpolation carried out only for the main color may be a one-dimensional interpolation, such as linear interpolation. The conversion of the coordinate values is carried out to make the mean offset of the coordinate values of the color image data from the coordinate values of the lattice points not greater than a predetermined value. Even the simple interpolation thus ensures sufficient effects. The interpolation may also be a higher-dimensional interpolation using the coordinate values of adjoining lattice points.

In accordance with one preferable application of the second image processing apparatus, each coordinate value of the color image data is defined as a value corresponding to a density of each color component of the color image data, and the lattice point conversion means includes first tone number conversion means for carrying out the conversion of the coordinate values as tone number conversion. The second image processing apparatus further includes second tone number conversion means for converting a number of tones of each color component of the corrected color image data output from the color correction means to a number of tones suitable for an image output unit, wherein a number of tones obtained by the conversion of the coordinate values carried out by the first tone number conversion means is greater than the number of tones obtained by the conversion carried out by the second tone number conversion means.

At least part of the objects may also be realized by a third image processing apparatus for causing a multi-color original image expressed by coordinate values in a multi-dimensional color space to be subjected to color correction and outputting a color-adjusted resulting image. The third image processing apparatus includes: input means for inputting color image data with respect to each pixel included in the original image, coordinate values of the color image data being expressed by a predetermined number of tones; lattice point information storage means for dividing the color space by a number of tones, which is less than the predetermined number of tones expressing the coordinate values of the color image data, and storing coordinate values of lattice points in the color space obtained by carrying out the division for each dimension; a color correction table for storing correction data regarding color of the color image data corresponding to each lattice point; lattice point conversion means for converting the coordinate values of the input color image data in the color space to coordinate values of a specific lattice point stored in the lattice point information storage means according to a technique that makes mean offset of the coordinate values of the input color image data from the coordinate values of the specific lattice point not greater than a predetermined value; color correction data reading means for reading correction data of the specific lattice point corresponding to the converted coordinate values from the color correction table; and smoothing means for smoothing correction data of each pixel read by the color correction data reading means, based on correction data of a peripheral pixel in the vicinity of each pixel.

A third image processing method corresponding to his third image processing apparatus causes a multi-color original image expressed by coordinate values in a multi-dimensional color space to be subjected to color correction and outputs a color-adjusted resulting image. The third image processing method includes the steps of:

(a) inputting color image data with respect to each pixel included in the original image, coordinate values of the color image data being expressed by a predetermined number of tones;

(b) dividing the color space by a number of tones, which is less than the predetermined number of tones expressing the coordinate values of the color image data, and storing coordinate values of lattice points in the color space obtained by carrying out the division for each dimension;

(c) providing a color correction table for storing correction data regarding color of the color image data corresponding to each lattice point;

(d) converting the coordinate values of the input color image data in the color space to coordinate values of a specific lattice point stored in the step (b) according to a technique that makes mean offset of the coordinate values of the input color image data from the coordinate values of the specific lattice point not greater than a predetermined value;

(e) reading correction data of the specific lattice point corresponding to the converted coordinate values from the color correction table; and (f) smoothing correction data of each pixel read in the step (e), based on correction data of a peripheral pixel in the vicinity of each pixel.

The third image processing apparatus and the corresponding third image processing method carry out conversion of the coordinate values in the color space to the coordinate values of the lattice points. This technique does not require the complicated interpolation of the prior art technique and attains favorable color reproduction. The smoothing process of the color-adjusted data based on the correction data regarding a peripheral pixel effectively prevents the deterioration of the picture quality due to the conversion of the coordinate values of each pixel to the coordinate values of a lattice point. The smoothing process may be carried out only in the low-density range where the quantization error caused by the conversion of the coordinates value has significant effects.

It is desirable that the number of tones used for expressing image data output after the image processing is greater than the final number of tones suitable for the image output unit. The image data are given to the image output unit after conversion to the final number of tones. The quantization error due to the allocation to lattice points is lessened by the conversion to the final number of tones suitable for the image output unit. This results in preventing the deterioration of picture quality due to the allocation to lattice points. These effects are identical with those of the first image processing apparatus and the first image processing method.

The conversion of the coordinate values of the input color image data to the coordinate values of a lattice point may be carried out according to the error diffusion method or according to the systematic dither method using a threshold matrix of discrete dither. These methods appropriately disperse the quantization error. One preferable structure selects the appropriate technique, for example, based on the properties of the image. The error diffusion method has better dispersibility of errors, but increases the amount of operations. The discrete dither method, on the other hand, attains the faster processing. Selection of the appropriate method according to the requirements is thus preferable. In this case, the smoothing process may be carried out in the low-density range of image data in case that the error diffusion method has been selected.

The peripheral pixel used in the smoothing process may be an adjoining pixel in the input direction of color image data. The image processing is generally carried out in the input order of the image data, so that the adjoining pixel in the input direction facilitates the processing. The adjoining pixel in the input direction may be a pixel before a target pixel of the processing or after the target pixel in the input direction. Another possible procedure uses the average of two adjoining pixels before and after the target pixel. The peripheral pixel used in the smoothing process may be an adjoining pixel in the input direction of the color image data as well as a pixel in a direction intersecting the input direction. Instead of the simple mean, a weighted mean obtained by adding predetermined weights may be used for the smoothing process.

In accordance with one preferable application of the third image processing apparatus, each coordinate value of the color image data is defined as a value corresponding to a density of each color component of the color image data, and the lattice point conversion means includes first tone number conversion means for carrying out the conversion of the coordinate values as tone number conversion. The third image processing apparatus further includes second tone number conversion means for converting a number of tones of each color component of the corrected color image data output from the color correction means to a number of tones suitable for an image output unit, wherein a number of tones obtained by the conversion of the coordinate values carried out by the first tone number conversion means is greater than the number of tones obtained by the conversion carried out by the second tone number conversion means. In this structure, the quantization error caused by the first tone number conversion means is lessened by the conversion of tone number by the second tone number conversion means. This structure reduces the effect of the deteriorating picture quality due to the quantization error by the first tone number conversion means.

In accordance with one preferable structure, the second tone number conversion means binarizes dots and expresses tones as distribution densities of the binarized dots, and the smoothing means carries out the smoothing process when the density of the binarized dots is not greater than a predetermined value. An image output unit that carries out binarization expresses the density of the color by the density of the binarized dots. The structure of carrying out the smoothing process when the density of the binarized dots is not greater than a predetermined value effectively prevents deterioration of the quality of the image in the low-density range.

In accordance with another preferable structure, the smoothing means includes means for comparing the correction data of each pixel read by the color correction data reading means with correction data of an adjoining pixel to calculate a difference; and means for carrying out the smoothing process when the calculated difference is not greater than a predetermined value. Uniform smoothing often causes an image to lose the sharpness. At an edge, adjoining pixels may have significantly different colors. The structure of carrying out the smoothing process when the difference in correction data is not greater than a predetermined value does not implement the smoothing process at edges of an original image, thereby enabling the smooth picture quality to be compatible with the sharpness of edges.

In accordance with one preferable application, it is determined whether or not the smoothing process is to be carried out for at least one color component out of color components constituting the color image data, and the smoothing process is carried out for each color component based on the determination.

In accordance with another preferable application, the smoothing process is carried out when it is estimated that a difference between input color image data regarding peripheral pixels in the color space is not greater than a predetermined distance.

A variety of techniques may be adopted for the estimation of whether or not the difference of the color image data in the color space is not greater than the predetermined distance. By way of example, in case that lattice points converted from the peripheral pixels by the lattice point conversion means are at farthest adjacent to each other, it is estimated that the difference between the peripheral pixels is not greater than the predetermined distance. As another example, it is estimated that the difference between the peripheral pixels is not greater than the predetermined distance, in case that the input color image data regarding the peripheral pixels are both included in a unit space defined by the lattice points stored in the lattice point information storage means. When the lattice point conversion means allocates the pixels having identical or substantially similar colors in an original image to different lattice points, the smoothing process improves the picture quality without damaging the fineness and resolution of the image.

In accordance with another possible application, the smoothing means determines whether or not another condition of the smoothing process is fulfilled when it is estimated that a difference between input color image data regarding peripheral pixels in the color space is not greater than a predetermined distance, and carries out the smoothing process only when the difference between the peripheral pixels is not greater than the predetermined distance and another condition is fulfilled. Another condition may be, for example, that the density of image data is not greater than a predetermined level.

In accordance with still another possible application, the lattice point information storage means may store coordinate values of lattice points obtained by dividing a predetermined low-density range of the color space into smaller areas than the other density ranges. This structure further improves the picture quality in the low-density range.

At least part of the objects may further be realized by a fourth image processing apparatus for causing a multi-color original image expressed by coordinate values in a multi-dimensional color space to be subjected to color correction and outputting a color-adjusted resulting image. The fourth image processing apparatus includes: input means for inputting color image data with respect to each pixel included in the original image, coordinate values of the color image data being expressed by a predetermined number of tones; lattice point information storage means for dividing the color space by a number of tones, which is less than the predetermined number of tones expressing the coordinate values of the color image data, and storing coordinate values of lattice points in the color space obtained by carrying out the division for each dimension; a color correction table for storing correction data regarding color of the color image data corresponding to each lattice point; lattice point conversion means for converting the coordinate values of the input color image data in the color space to coordinate values of a specific lattice point stored in the lattice point information storage means according to a technique that makes mean offset of the coordinate values of the input color image data from the coordinate values of the specific lattice point not greater than a predetermined value; color correction data reading means for reading correction data of the specific lattice point corresponding to the converted coordinate values from the color correction table; and color correction means for selecting a first value corresponding to a main color among the correction data of the specific lattice point read by the color correction data reading means, reading a second value corresponding to the main color among correction data of an adjoining lattice point that has a coordinate value with respect to the main color different from that of the specific lattice point, carrying out interpolation with the first value and the second value, and outputting correction data including the coordinate value with respect to the main color replaced by a result of the interpolation.

A fourth image processing method corresponding to this fourth image processing apparatus causes a multi-color original image expressed by coordinate values in a multi-dimensional color space to be subjected to color correction and outputs a color-adjusted resulting image. The fourth image processing method includes the steps of:

(a) inputting color image data with respect to each pixel included in the original image, coordinate values of the color image data being expressed by a predetermined number of tones;

(b) dividing the color space by a number of tones, which is less than the predetermined number of tones expressing the coordinate values of the color image data, and storing coordinate values of lattice points in the color space obtained by carrying out the division for each dimension;

(c) providing a color correction table for storing correction data regarding color of the color image data corresponding to each lattice point;

(d) converting the coordinate values of the input color image data in the color space to coordinate values of a specific lattice point stored in the step (b) according to a technique that makes mean offset of the coordinate values of the input color image data from the coordinate values of the specific lattice point not greater than a predetermined value;

(e) reading correction data of the specific lattice point corresponding to the converted coordinate values from the color correction table; and (f) selecting a first value corresponding to a main color among the correction data of the specific lattice point read in the step (e), reading a second value corresponding to the main color among correction data of an adjoining lattice point that has a coordinate value with respect to the main color different from that of the specific lattice point, carrying out interpolation with the first value and the second value, and outputting correction data including the coordinate value with respect to the main color replaced by a result of the interpolation.

The fourth image processing technique carries out interpolation only for the main color. Such interpolation decreases the amount of operations, while substantially canceling the quantization error with respect to the main color. This technique accordingly minimizes the observable deterioration of the picture quality without lowering the processing speed.

The fourth image processing technique may carry out the smoothing process between adjoining lattice points, in combination with the conversion of the coordinate values based on the lattice points having narrower intervals in the low-density range and the interpolation for the main color. This structure shortens the total time required for the operations and minimizes the deterioration of the picture quality due to the conversion of the coordinate values.

The principles of the present invention may be realized as computer program products.

The present invention is directed to a first computer program product for causing a multi-color original image expressed by coordinate values in a multi-dimensional color space to be subjected to color correction and outputting a color-adjusted resulting image. The first computer program product includes:

a computer readable medium; and computer program code means stored on the computer readable medium, information previously stored on the computer readable medium including:

coordinate value data representing coordinate values of lattice points in the color space obtained by dividing the color space by a number of tones, which is less than a predetermined number of tones for expressing coordinate values of color image data, for each dimension, in such a manner that a predetermined low-density range of the color space is divided into smaller areas than the other density ranges; and a color correction table for storing correction data regarding color of the color image data corresponding to each lattice point, the compute program code means including:

first program code means for causing a computer to input the color image data with respect to each pixel included in the original image, the coordinate values of the color image data being expressed by the predetermined number of tones;

second program code means for causing the computer to convert the coordinate values of the input color image data in the color space to coordinate values of a specific lattice point stored as the coordinate value data according to a technique that makes mean offset of the coordinate values of the input color image data from the coordinate values of the specific lattice point not greater than a predetermined value; and third program code means for causing the computer to read correction data of the specific lattice point corresponding to the converted coordinate values from the color correction table and outputting the correction data read from the color correction table as corrected color image data.

The present invention is also directed to a second computer program product for causing a multi-color original image expressed by coordinate values in a multi-dimensional color space to be subjected to color correction and outputting a color-adjusted resulting image. The second computer program product includes:

a computer readable medium; and computer program code means stored on the computer readable medium, information previously stored on the computer readable medium including:

coordinate value data representing coordinate values of lattice points in the color space obtained by dividing the color space by a number of tones, which is less than a predetermined number of tones for expressing coordinate values of color image data, for each dimension, in such a manner that a predetermined low-density range of the color space is divided into smaller areas than the other density ranges; and a color correction table for storing correction data regarding color of the color image data corresponding to each lattice point, the compute program code means including:

first program code means for causing a computer to input the color image data with respect to each pixel included in the original image, the coordinate values of the color image data being expressed by the predetermined number of tones;

second program code means for causing the computer to convert the coordinate values of the input color image data in the color space to coordinate values of a specific lattice point stored as the coordinate value data according to a technique that makes mean offset of the coordinate values of the input color image data from the coordinate values of the specific lattice point not greater than a predetermined value;

third program code means for causing the computer to read correction data of the specific lattice point corresponding to the converted coordinate values from the color correction table; and fourth program code means for causing the computer to select a first value corresponding to a main color among the correction data of the specific lattice point read from the color correction table, to read a second value corresponding to the main color among correction data of an adjoining lattice point that has a coordinate value with respect to the main color different from that of the specific lattice point, to carry out interpolation with the first value and the second value, and to output correction data including the coordinate value with respect to the main color replaced by a result of the interpolation as resulting corrected color image data.

The present invention is further directed to a third computer program product for causing a multi-color original image expressed by coordinate values in a multi-dimensional color space to be subjected to color correction and outputting a color-adjusted resulting image. The third computer program product includes:

a computer readable medium; and computer program code means stored on the computer readable medium, information previously stored on the computer readable medium including:

coordinate value data representing coordinate values of lattice points in the color space obtained by dividing the color space by a number of tones, which is less than a predetermined number of tones for expressing coordinate values of color image data, for each dimension; and a color correction table for storing correction data regarding color of the color image data corresponding to each lattice point, the compute program code means including:

first program code means for causing a computer to input the color image data with respect to each pixel included in the original image, the coordinate values of the color image data being expressed by the predetermined number of tones;

second program code means for causing the computer to convert the coordinate values of the input color image data in the color space to coordinate values of a specific lattice point stored as the coordinate value data according to a technique that makes mean offset of the coordinate values of the input color image data from the coordinate values of the specific lattice point not greater than a predetermined value:

third program code means for causing the computer to read correction data of the specific lattice point corresponding to the converted coordinate values from the color correction table; and fourth program code means for causing the computer to smooth correction data of each pixel read from the color correction table, based on correction data of a peripheral pixel in the vicinity of each pixel.

The present invention is also directed to a fourth computer program product for causing a multi-color original image expressed by coordinate values in a multi-dimensional color space to be subjected to color correction and outputting a color-adjusted resulting image. The fourth computer program product includes:

a computer readable medium; and computer program code means stored on the computer readable medium, information previously stored on the computer readable medium including:

coordinate value data representing coordinate values of lattice points in the color space obtained by dividing the color space by a number of tones, which is less than a predetermined number of tones for expressing coordinate values of color image data, for each dimension; and a color correction table for storing correction data regarding color of the color image data corresponding to each lattice point, the compute program code means including:

first program code means for causing a computer to input the color image data with respect to each pixel included in the original image, the coordinate values of the color image data being expressed by the predetermined number of tones;

second program code means for causing the computer to convert the coordinate values of the input color image data in the color space to coordinate values of a specific lattice point stored as the coordinate value data according to a technique that makes mean offset of the coordinate values of the input color image data from the coordinate values of the specific lattice point not greater than a predetermined value;

third program code means for causing the computer to read correction data of the specific lattice point corresponding to the converted coordinate values from the color correction table;

fourth program code means for causing the computer to select a first value corresponding to a main color among the correction data of the specific lattice point read from the color correction table, to read a second value corresponding to the main color among correction data of an adjoining lattice point that has a coordinate value with respect to the main color different from that of the specific lattice point, to carry out interpolation with the first value and the second value, and to output correction data including the coordinate value with respect to the main color replaced by a result of the interpolation; and fifth program code means for causing the computer to smooth the output correction data of each pixel, based on correction data of a peripheral pixel in the vicinity of each pixel, and outputting the smoothed correction data as resulting color image data.

These and other objects, features, aspects, and advantages of the present invention will become more apparent from the following detailed description of the preferred embodiment with the accompanying drawings.

BRIEF DESCRIPTION OF THE DRAWINGS

FIG. 4 shows structure of a print head 28;

FIGS. 5A and 5B show the principle of discharging ink;

FIG. 10 shows a process of pre-conversion of the tone number;

FIGS. 11A through 11D show weighting matrices used when the pre-conversion of the tone number is carried out according to the error diffusion method;

FIG. 37 shows the composition of six color inks used in the printer of the sixth embodiment;

DESCRIPTION OF THE PREFERRED EMBODIMENTS

Figure 1:
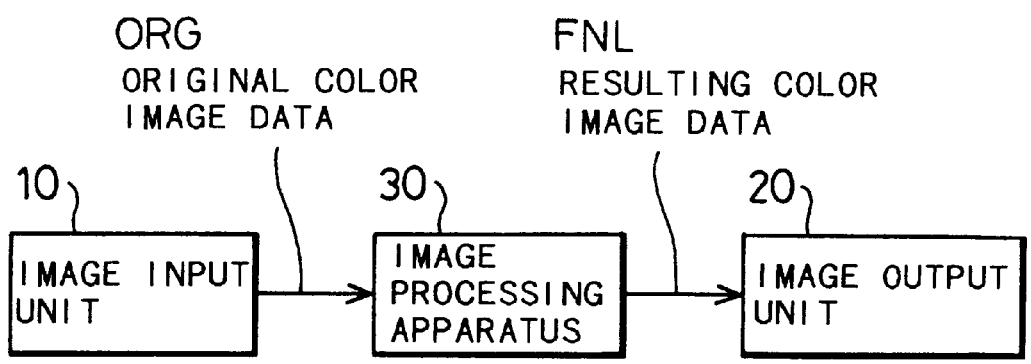
FIG. 1 is a block diagram schematically illustrating structure of an image processing system embodying the present invention.

Some modes of carrying out the present invention are discussed below as preferred embodiments. The block diagram of FIG. 1 illustrates structure of a color image processing system embodying the present invention. In the image processing system of the present invention, original color image data ORG output from an image input unit 10, such as a scanner, are input into an image processing apparatus 30. The image data processed by the image processing apparatus 30 are eventually output to an image output unit 20, such as a printer, to yield a resulting image. The preferred embodiments of the present invention are discussed below:

(1) Hardware of Image Processing Apparatus; and (2) Image Processing.

(1) Hardware of Image Processing Apparatus

The image processing apparatus 30 carries out the color correction and conversion of the tone number, in order to make the input original color image data ORG match the color reproducing properties of the image output unit 20. The color correction corrects the output characteristics of the image output unit 20 and is, for example, gamma correction. The conversion of the tone number converts the color-adjusted color image data to a final number of tones characteristic of the image output unit 20, in case that the number of tones outputtable from the image output unit 20 is smaller than the number of tones expressible by the color image data ORG output from the image input unit 10. By way of example, it is assumed that the image data ORG read with the scanner have 256 tones (equivalent to 8 bits) for the respective colors R, G, and B and that the image output unit 20 is an ink jet printer for expressing an image by the on/off state of ink and allows only two tones as the final number of tones. In this case, the image processing apparatus 30 converts the image data of 256 tones to data of two tones and outputs the data of two tones as resulting color image data FNL to the image output unit 20. The conversion of the tone number mentioned above includes pre-conversion of the tone number and post-conversion of the tone number. The pre-conversion of the tone number allocates the input original color image data ORG to lattice points having the less number of tones prior to the color correction, so as to reduce the number of tones. The post-conversion of the tone number takes advantage of the halftone processing and binarizes the color-adjusted data according to the number of tones expressible by the printer. Details of the pre-conversion of the tone number and the post-conversion of the tone number will be discussed later.

Figure 2:
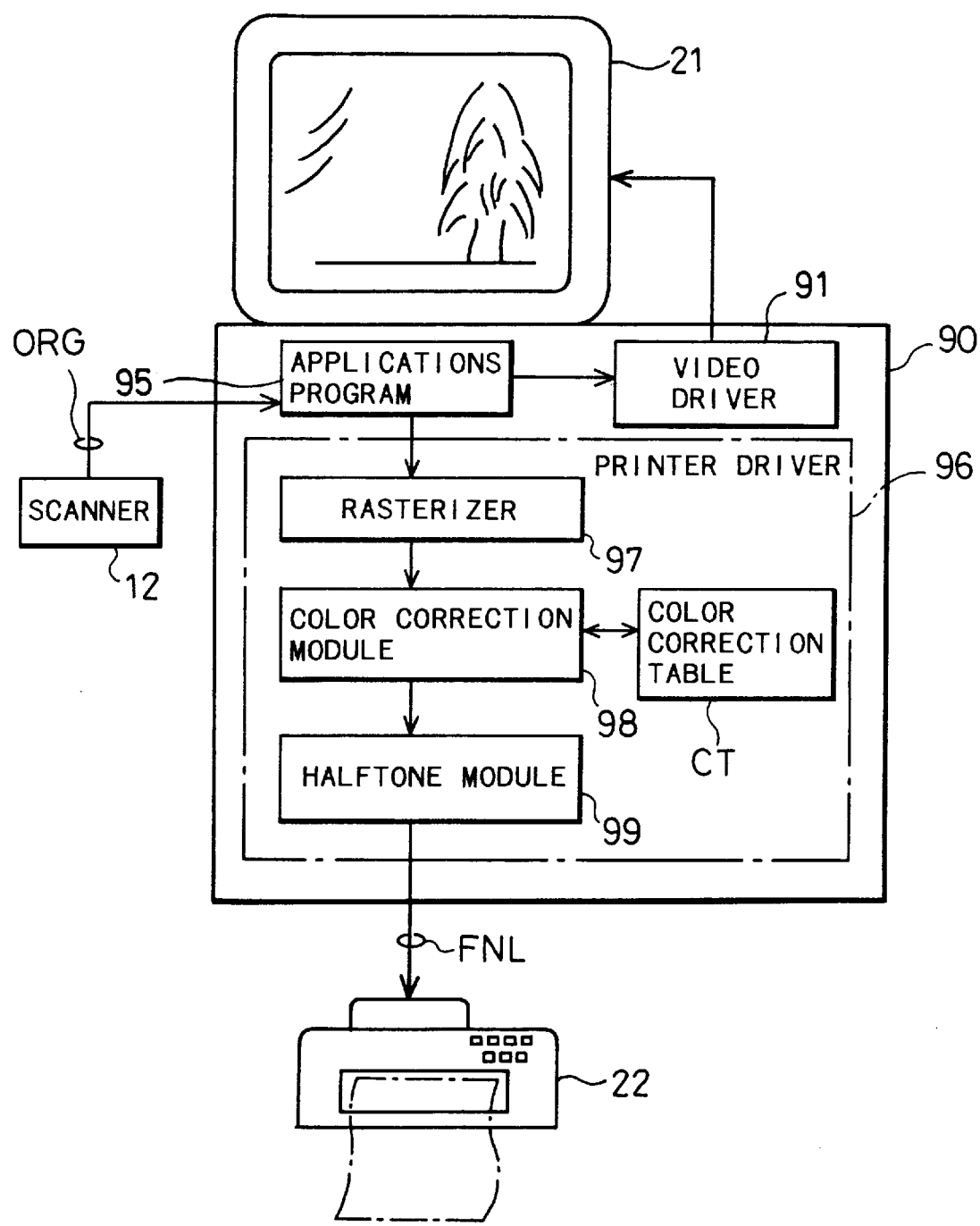
FIG. 2 is a block diagram illustrating a concrete structure of the color image processing system shown in FIG. 1.

FIG. 2 is a block diagram illustrating a concrete structure of the color image processing system shown in FIG. 1. The image input unit 10 used here is a scanner 12 that optically reads a color image from an original. The scanner 12 outputs the scanned color image data as the original color image data ORG consisting of three color components R, G, and B. In the embodiment, each color R, G, or B is expressed by 8-bit digital data and has 256 tones. The scanner 12 expresses the original color image data ORG by the three primary colors R, G, and B. Color of each pixel is defined by the position or coordinates in a three-dimensional color space, wherein the coordinate axes represent the respective colors R, G, and B. The color of each pixel may, however, be defined by the position or coordinates in any colorimetric system, such as $L^*a^*b^*$ system.

Other than the scanner 12, for example, a video camera or a host computer for computer graphics may be used as the image input unit 10.

In the image processing system of the embodiment, a color printer 22 that can not regulate the tone by the pixel unit is used as the image output unit 20. The color printer 22 requires the binarization process that reduces the number of tones regarding each color component of the original color image data ORG output from the scanner 12 to two tones corresponding to the on/off state of each pixel, as discussed previously.

A color display 21 is another available example of the image output unit 20. The color display 21 for the computer generally has a less number of display tones, compared with those of standard home TVs. In case that the color display 21 is used as the image output unit 20, it is required to convert the number of tones included in the original color image data ORG to the number of tones corresponding to the color display 21.

The following describes a concrete structure of the image processing apparatus 30. The block diagram of FIG. 2 shows a structure with a computer 90 that realizes the image processing apparatus 30. The computer 90 includes conventional elements (not shown), such as a CPU, a RAM, and a ROM, and an applications program 95 is executed under a predetermined operating system. A video driver 91 and a printer driver 96 are incorporated in the operating system, and the resulting color image data FNL are output from the applications program 95 via these drivers 91 and 96. The applications program 95, which carries out, for example, retouch of an image, reads an image with the scanner 12 and displays the image on a CRT display 93 via the video driver 91 while carrying out a predetermined process with respect to the scanned image. In response to a printing command issued by the applications program 95, the printer driver 96 of the computer 90 receives image information from the applications program 95 and converts the image information to signals printable by the printer 22 (that is, binarized signals for C, M, and Y). In the example of FIG. 2, the printer driver 96 includes a rasterizer 97 for converting the color image data processed by the applications program 95 to image data of the dot unit, a color correction module 98 for making the image data of the dot unit subjected to color correction according to the ink colors C, M, and Y used by the image output unit 20, such as the printer 22, and its colorimetric characteristics, a color correction table CT referred to by the color correction module 98, and a halftone module 99 for generating halftone image information, which expresses densities in a specific area by the existence or non-existence of ink in each dot unit, based on the color-adjusted image information.

The pre-conversion of the tone number is carried out by the color correction module 98, whereas the post-conversion of the tone number is carried out by the halftone module 99. The processing executed by the color correction module 98 corresponds to the lattice point conversion process.

Figure 3:
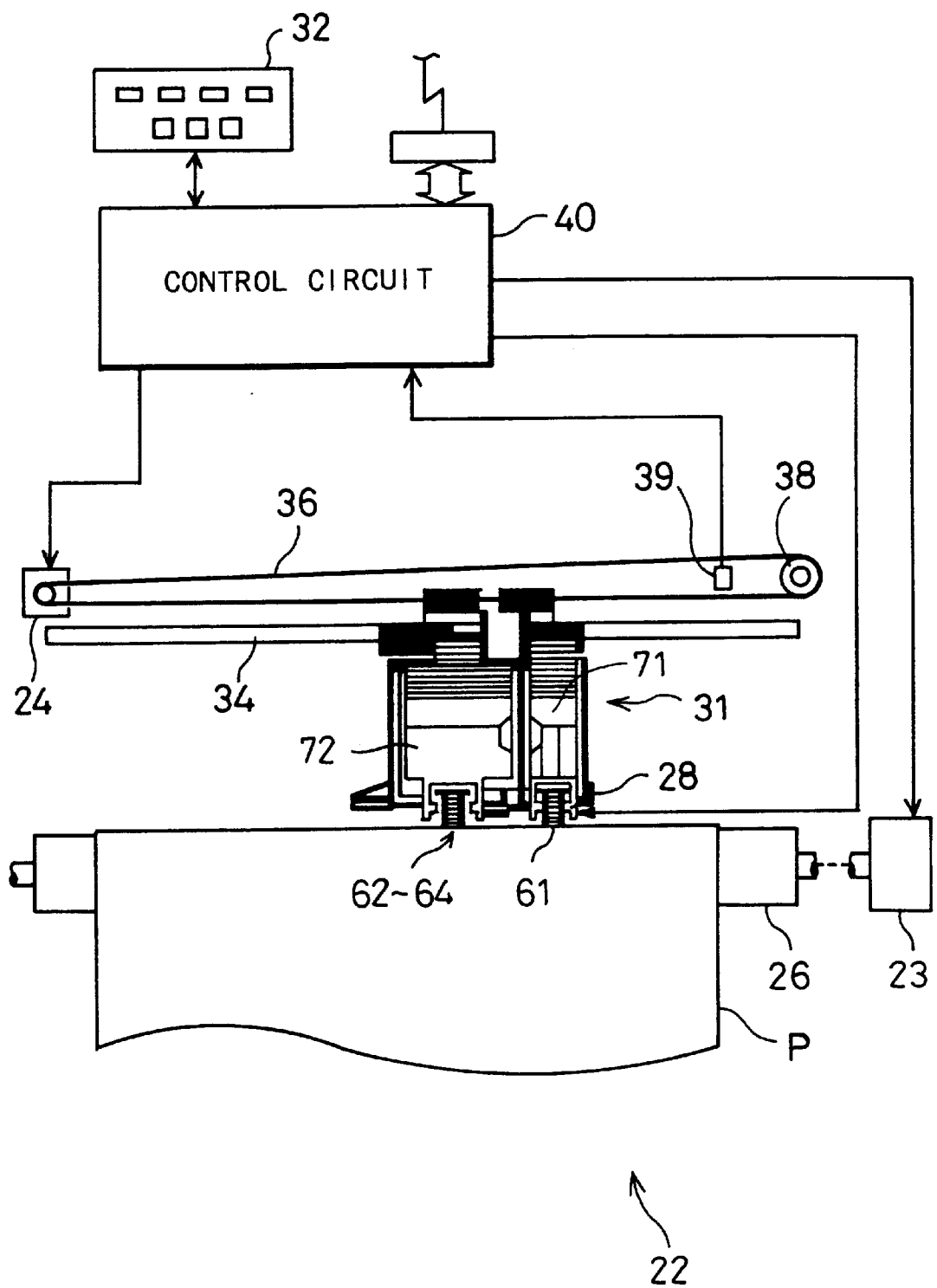
FIG. 3 schematically illustrates structure of a color printer 22 used as the image output unit 20.

FIG. 3 schematically illustrates structure of the printer 22 used as the image output unit 20. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control spout of ink and formation of dots, and a control circuit 40 for transmitting signals to and from the sheet feed motor 23, the carriage motor 24, the print head 28, and a control panel 32.

A black ink cartridge 71 and a color ink cartridge 72 for three different color inks, cyan, magenta, and yellow are attachable to the carriage 31 of the printer 22. Four color ink heads 61 through 64 for respectively discharging inks are formed in the print head 28 that is disposed on the lower portion of the carriage 31. Ink supply pipes 65 for leading inks from ink tanks to the respective color ink heads 61 through 64 are formed upright on the bottom of the carriage 31 as shown in FIG. 4. When the black ink cartridge 71 and the color ink cartridge 72 are attached downward to the carriage 31, the ink supply pipes 65 are inserted into connection holes formed in the respective cartridges 71 and 72, so that inks are fed from the ink cartridges 71 and 72 to the respective color ink heads 61 through 64.

Referring to FIG. 4, when the black ink cartridge 71 and the color ink cartridge 72 are attached to the carriage 31, inks in the ink cartridges 71 and 72 are sucked out by capillarity through the ink supply pipes 65 and are led to the color ink heads 61 through 64 formed in the print head 28 arranged on the lower portion of the carriage 31. In the event of initial attachment of the ink cartridges 71 and 72, the respective inks are sucked into the corresponding color ink heads 61 through 64 by means of a pump, although the pump, a cap for covering the print head 28 during the sucking operation, and the other related elements are omitted from the illustration.

A plurality of nozzles 'n' are formed in each of the color ink heads 61 through 64 as shown in FIG. 4. In this embodiment, the number of nozzles for each color ink head is 32. A piezoelectric element PE having excellent response characteristics is arranged for each nozzle 'n'. FIGS. 5A and 5B illustrate a configuration of the piezoelectric element PE and the nozzle 'n'. The piezoelectric element PE is disposed at a position that comes into contact with an ink conduit 68 for leading ink to the nozzle 'n'. As is known, the piezoelectric element PE has a crystal structure undergoing mechanical stress by application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to abruptly extend and deform one side wall of the ink conduit 68 as shown in FIG. 5B. The volume of the ink conduit 68 is reduced with an extension of the piezoelectric element PE, and a certain amount of ink corresponding to the volume reduction is discharged as ink particles Ip from the end of the nozzle 'n' at a high speed. The ink particles Ip soak into the paper P set on the platen 26, so as to print an image.

In the printer 22 having the above hardware structure, while the sheet feed motor 23 rotates the platen 26 and the other rollers to feed the paper P, the carriage 31 is driven and reciprocated by the carriage motor 24 and the piezoelectric elements PE on the respective color ink heads 61 through 64 of the print head 28 are driven simultaneously. The printer 22 accordingly spouts the respective color inks and creates a multi-color image onto the paper P.

The mechanism for feeding the paper P has a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 for detecting the position of the origin of the carriage 31.

Although the control circuit 40 of the printer 22 has a CPU (not shown) and other conventional elements, the printer 22 does not carry out any processes relating to the conversion of the tone number and the color correction, since the computer 90 executes the color correction and the conversion of the tone number according to the output characteristics of the printer 22. The printer 22 only receives the data output from the computer 90 and drives the piezoelectric elements PE on the respective color ink heads 61 through 64 of the print head 28 synchronously with the paper feed operation and the reciprocating movement of the carriage 31. The structure and the processing of the control circuit 40 of the printer 22 are thus not described specifically.

(2) Image Processing

The image processing carried out by the image processing apparatus 30 of the embodiment includes the pre-conversion of the tone number, the color correction, and the post-conversion of the tone number. There are a variety of techniques applicable to such image processing, for example, the error diffusion method, the least mean-error method, the systematic dither method, the software-based color correction, and the hardware-based color correction. The following discussion regards:

[A] Outline of Image Processing;
[B] Outline of Image Processing Common to First through Seventh Embodiments;
[C] Details of Image Processing Common to First through Third Embodiment;
[D] First through Third Embodiments;
[E] Details of Image Processing Common to Fourth through Seventh Embodiments; and
[F] Fourth through Seventh Embodiments

[A] Outline of Image Processing

Figure 6:
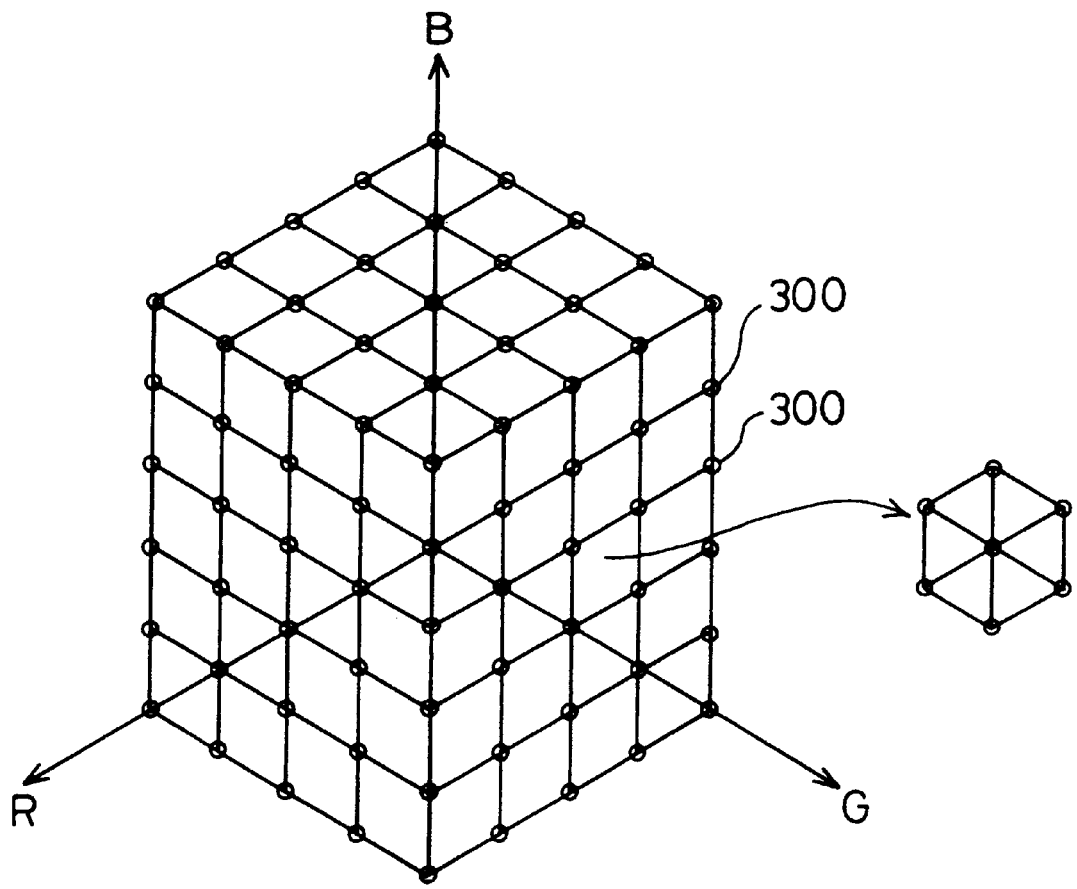
FIG. 6 shows a color space divided into lattices.

The color correction table CT referred to by the color correction module 98 in the computer 90 is a color table, in which a three-dimensional color space consisting of the three colors R, G, and B is divided into lattices as shown in FIG. 6. The color correction table CT is read from, for example, a hard disk, and stored in the RAM of the computer 90, while the printer driver 96 is incorporated into the operating system. Tone-adjusted data of the respective colors C, M, and Y obtained by converting the tone data of R, G, and B regarding each lattice point are stored at each lattice point in the color table. This makes the color of an input color original read with the scanner 12 identical with the color of an output color image printed on a printing medium with the color printer 22.

As mentioned previously, the computer 90 causes the original color image data ORG input with the scanner 12 to be subjected to a correction process with correction data stored in the color correction table CT (the pre-conversion of the tone number) and converts the color-adjusted color image data to a final number of tones corresponding to a tone number N of the image output unit 20, such as the color printer 22 (the post-conversion of the tone number). The resulting color image data FNL thus obtained may be output directly to the color printer 22 or stored in a memory of the computer 90 prior to the output to the color printer 22.

[B] Outline of Image Processing Common to First through Seventh Embodiments

Figure 7:
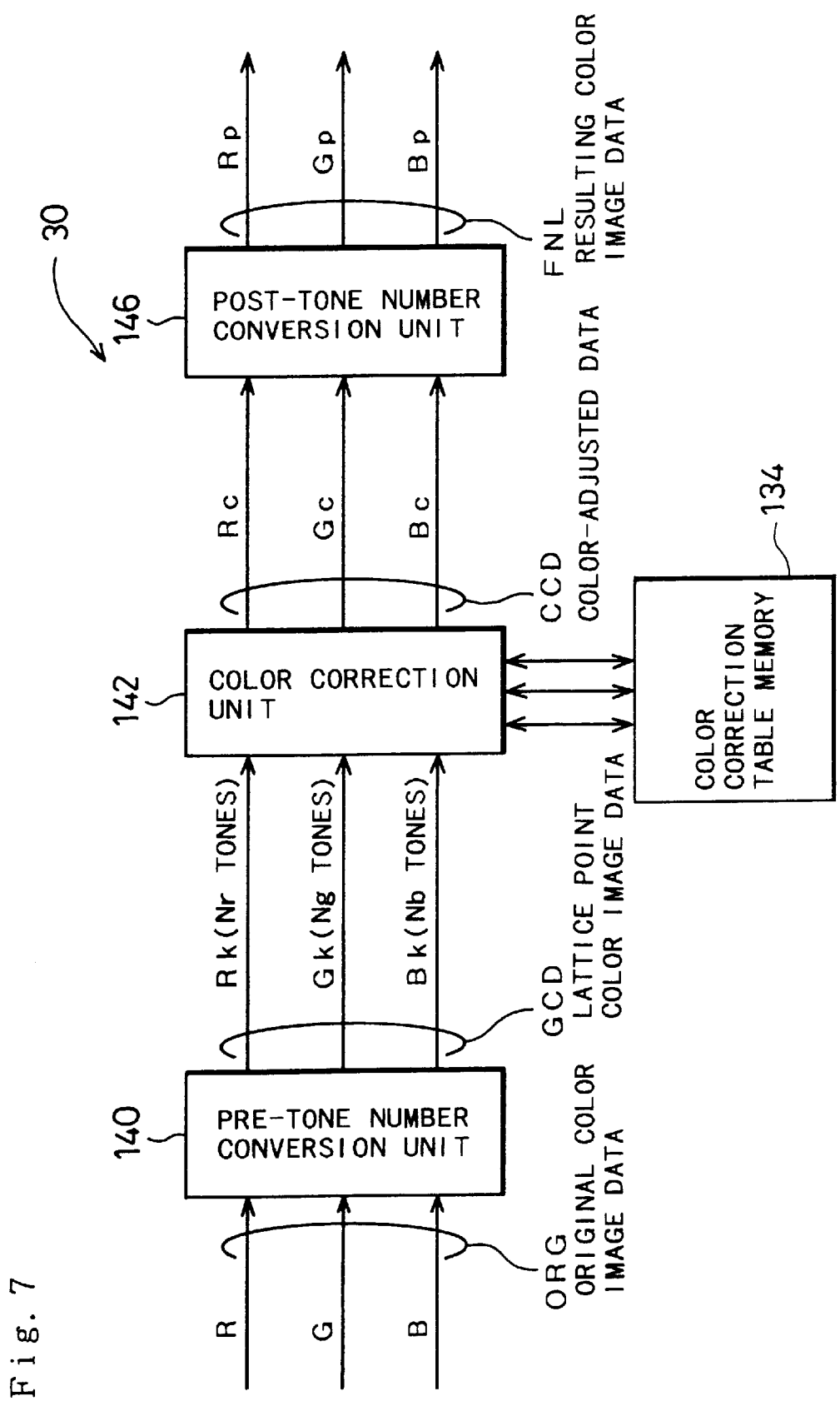
FIG. 7 is a block diagram showing the functions of the image processing apparatus 30 of FIG. 1.

FIG. 7 is a block diagram illustrating functions of the image processing apparatus 30 realized by the color correction module 98 and the halftone module 99 of the computer 90. The image processing apparatus 30 has a pre-tone number conversion unit 140, a color correction unit 142, a post-tone number conversion unit 146, and a color correction table memory 134 in which the color correction table CT is stored. The correction data registered in the color correction table memory 134 are discussed first.

Referring back to FIG. 6, the input original color image data ORG are defined by the coordinate values in the color space that has coordinate axes corresponding to the respective color components, R, G, and B. Each coordinate axis has coordinate values equal to the number of tones relating to each color component. The color space is divided into lattices, and correction data of the respective color components are stored at each lattice point 300.

A variety of techniques may be applicable to determine the correction data registered in the color correction table CT stored in the color correction table memory 134. A standard procedure gives various R, G, and B values to a target output system, such as the color printer 22, and measures the colors actually output from the target output system. The procedure then specifies a relationship between the R, G, and B values given to the output system and the R, G, and B values obtained by measuring the output results. Although the actual ink colors used in the printer 22 are C, M, and Y, the ink colors are regarded as R, G, and B for the clarity of explanation. Conversion of the R, G, and B to C, M, and Y will be discussed later.

The standard procedure then determines tone-adjusted data of the respective color components R, G, and B required for outputting a desired color at each lattice point 300 based on the above relationship and stores the tone-adjusted data as the correction data into the color correction table memory 134.

In this manner, the results of color correction at each lattice point 300 are stored in the color correction table memory 134. The greater number of divisions of the color space improves the picture quality, while increasing the required capacity of the color correction table memory 134. An appropriate number of divisions is thus determined by taking into account the balance of the picture quality and the required capacity of the color correction table memory 134.

The image processing apparatus 30 processes the input original color image data ORG using the correction data stored in the color correction table memory 134, as discussed below.

The pre-tone number conversion unit 140 adopts a predetermined tone number conversion technique and carries out the pre-conversion of the tone number, that is, converts the tone number of the respective color components R, G, and B of the original color image data ORG to the coordinate values at an optimum lattice point included in the color space shown in FIG. 6. The resulting data are output as lattice point color image data GCD to the color correction unit 142. The pre-conversion of the tone number executed here converts the respective color components R, G, and B of the original color image data ORG to Nr tones, Ng tones, and Nb tones, which are output as Rk, Gk, and Bk to the color correction unit 142.

The tone number conversion technique adopted by the pre-tone number conversion unit 140 may be the multi-valued error diffusion method, the least mean-error method, or the multi-valued systematic dither method. Details of these techniques will be described later.

The color correction unit 142 reads tone-adjusted data regarding a lattice point corresponding to the input lattice point color image data GCD from the color correction table memory 134, adjusts the number of tones of the respective color components Rk, Gk, and Bk of the lattice point color image data GCD, and outputs the resulting data as color-adjusted data CCD to the post-tone number conversion unit 146. The color-adjusted data CCD include data of the respective color components Rc, Gc, and Bc.

The post-tone number conversion unit 146 adopts either the error diffusion method or the least mean-error method and carries out the post-conversion of the tone number, that is, converts the color-adjusted data CCD output from the color correction unit 142 to a final number of tones. The resulting data are output as the resulting color image data FNL expressed by Rp, Gp, and Bp.

The resulting color image data FNL are output, for example, to the color printer 22, which accordingly prints out a color image having favorable color reproducibility on a recording medium.

The process of dividing the color space into lattices and providing the color correction table memory 134 that stores color-adjusted data regarding each lattice point is known to the ordinary skilled in the art (see, for example, JAPANESE PATENT LAYING-OPEN GAZETTE No. 7-30772). In the image processing apparatus 30, the pre-tone number conversion unit 140 carries out the pre-conversion of the tone number to convert the input original color image data ORG to the color data regarding each lattice point stored in the color correction table memory 134. The color correction unit 142 then refers to the color correction table CT to carry out the color correction. The post-tone number conversion unit 146 subsequently carries out the post-conversion of the tone number, for example, the halftone processing. This procedure does not require any complicated interpolation in the course of referring to the color correction table CT and thus significantly shortens the time period required for the color correction process.

The concrete procedure of the processing is described in detail. The pre-tone number conversion unit 140 adopts either the error diffusion method or the least mean-error method for the pre-conversion of the tone number. It is here assumed that a color domain having the tones of R=12, G=20, and B=24 continues over a certain area in the original color image data ORG input by the scanner 12 and that color data of this color domain are input into the image processing apparatus 30.

Figure 8:
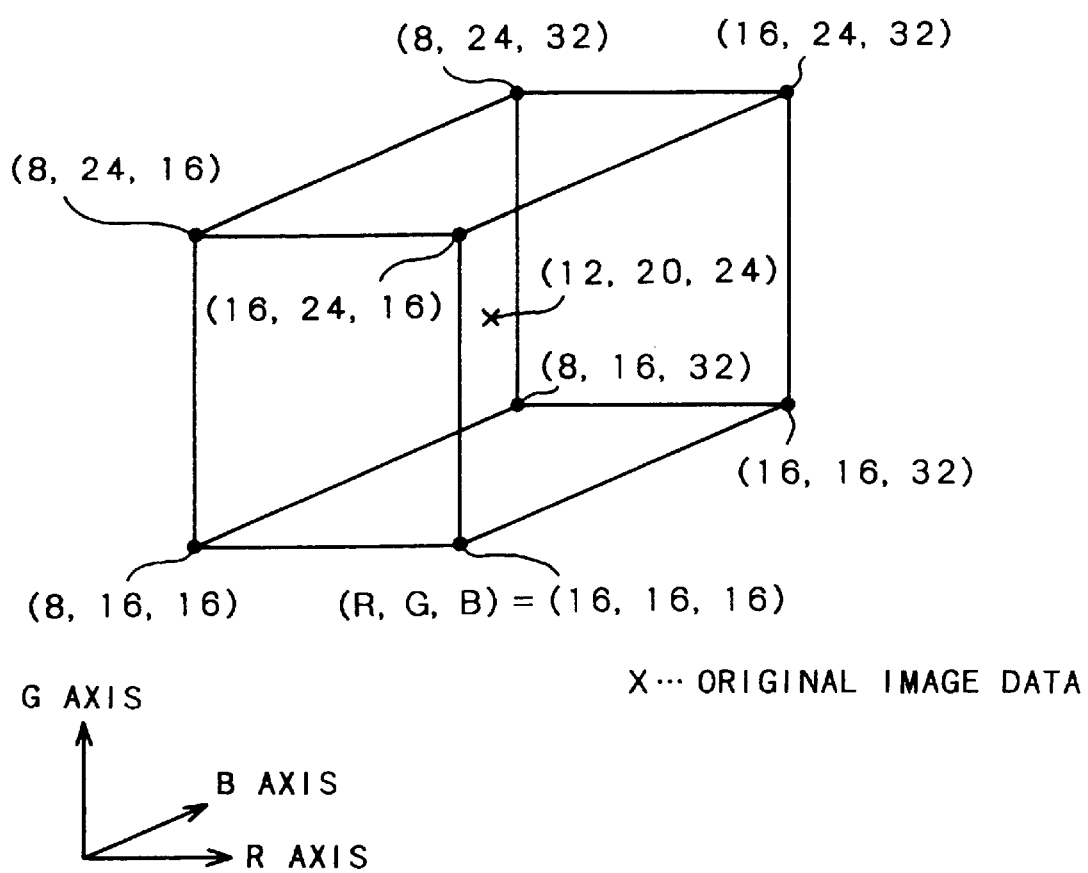
FIG. 8 shows the positions of original color image data and peripheral lattice point color image data in the color space.

FIG. 8 shows eight lattice points in the vicinity of the coordinate position (that is, the position defined by the coordinates) of the original color image data ORG in the color space. The respective lattice points are positioned at the vertices of the cube shown in FIG. 8, and the coordinate positions thereof are expressed as Equations (1) given below:

Equations 1

$$(Ri, Gj, Bk) = (8,16,16)$$

$$(Ri+1, Gj, Bk) = (16,16,16)$$

$$(Ri, Gj+1, Bk) = (8,24,16)$$

$$(Ri+1, Gj+1, Bk) = (16,24,16)$$

$$(Ri, Gj, Bk+1) = (8,16,32)$$

$$(Ri+1, Gj, Bk+1) = (16,16,32)$$

$$(Ri, Gj+1, Bk+1) = (8,24,32)$$

$$(Ri+1, Gj+1, Bk+1) = (16,24,32) \quad (1)$$

The color correction values of the respective color components R, G, and B regarding the color data at each lattice point 300 are stored in the color correction table memory 134. In the example of FIG. 8, the original color image data ORG is expressed by the coordinates (R,G,B)=(12,20,24).

The prior art technique carries out interpolation to implement the color correction. The procedure of the prior art reads eight color correction values regarding the color data at the eight lattice points in the vicinity of the coordinate position of the original color image data ORG in the color space and carries out interpolation to calculate a weighted average according to the distance between the coordinate position of the original color image data ORG and each lattice point. In the example of FIG. 8, the respective lattice points are apart from the coordinate position of the original color image data ORG by an identical distance. The interpolation thus simply averages the color correction values regarding the eight lattice points to determine the correction data of the respective color components R, G, and B.

The image processing apparatus 30 of the embodiment, on the other hand, carries out the image processing according to the following procedure. The pre-tone number conversion unit 140 adopts either the error diffusion method or the least mean-error method and carries out the pre-conversion of the tone number to convert the input original color image data ORG to the color data corresponding to one of the eight lattice points. The color correction unit 142 then refers to the color correction table CT stored in the color correction table memory 134 and carries out the color correction.

The error diffusion method or the least mean-error method adopted by the pre-tone number conversion unit 140 converts each piece of data to a value relating to an adjacent lattice point, in order to make the mean value of local color in a specific area substantially equal to the original color image data ORG. In the example of FIG. 8, where the adjacent lattice points are apart from the coordinate position of the original color image data ORG by a fixed distance, the pre-conversion of the tone number gives a specific color range, in which data of the eight lattice points are mixed by the same fraction, that is, by approximately ⅛. The color correction of the tone-adjusted color data based on the color correction table CT gives a color range, in which the color correction values regarding the eight lattice points are mixed at substantially equal probabilities.

As for the mean value of color in a certain area, the results of color correction carried out by the prior art interpolation technique are substantially identical with the results of color correction carried out by the image processing apparatus 30 of the embodiment. Although the pre-conversion of the tone number adds the quantization noise to each pixel, the color correction unit 142 gives the results of color correction that are almost equivalent to the results obtained by the prior art interpolation technique, with respect to the local mean value.

In case that the image output unit 20 has a sufficiently large number of expressible tones, the quantization noise due to the pre-conversion of the tone number causes poor picture quality. In the image processing apparatus 30 of the embodiment, after the pre-conversion of the tone number, the post-tone number conversion unit 146 carries out the post-conversion of the tone number to convert the color-adjusted image data to a final number of tones corresponding to the number of tones expressible by the image output unit 20. This post-conversion of the tone number also generates the quantization noise. In case that the quantization noise due to the pre-conversion of the tone number at the pre-process stage is sufficiently smaller than the quantization noise due to the post-conversion of the tone number at the final stage, the quantization noise due to the pre-conversion of the tone number does not cause any practical problems. In the image processing apparatus 30 of the embodiment, the number of tones convertible by the pre-tone number conversion unit 140 is thus set to be sufficiently larger than the number of tones convertible by the post-tone number conversion unit 146. This structure effectively prevents the deterioration of the picture quality accompanied by the pre-conversion of the tone number.

In the structure of the embodiment, the post-tone number conversion unit 146 adopts either the error diffusion method or the least mean-error method to carry out the post-conversion of the tone number. The pre-conversion of the tone number and the post-conversion of the tone number accordingly have the mechanism of minimizing the error in the calculation of the local mean value in a specific area. The procedure of setting the number of tones convertible in the pre-conversion of the tone number to be sufficiently larger than the number of tones convertible in the post-conversion of the tone number results in the favorable picture quality, which is substantially equivalent to the picture quality obtained by the prior art technique that refers to a plurality of lattice points in the color correction table and carries out interpolation.

For example, when each color component of the original color image data ORG has 256 tones, the number of tones convertible by the pre-tone number conversion unit 140 is set equal to 32 for each color component, and the number of tones convertible by the post-tone number conversion unit 146 is set equal to 2 for each color component. The color correction and conversion of the tone number under such conditions gives a reproduced image of high quality, which is substantially indistinguishable from the result by the prior art technique that converts the color-adjusted data to the data of two tones after interpolation and color correction. Even when the number of tones convertible in the pre-conversion of the tone number is reduced to eight tones, the resulting image has sufficient picture quality that does not cause any practical problems.

As mentioned above, the smaller number of tones convertible in the pre-conversion of the tone number reduces the required capacity of the color correction table memory 134. For example, it is assumed that the color-adjusted data output from the color correction unit 142 are n-bit data for each of m color components. In case that the number of tones convertible in the pre-conversion of the tone number is equal to L for each color component (q bits), the required capacity of the color correction table memory 134 is expressed as Equation (2) given below:
Equation 2

$$Q = m \times n \times 2^{(q \times 3)} \qquad (2)$$

In case that m (the number of color components) is equal to 3, n (the bit number) is equal to 8 bits (=1 byte) for each color component, and L (the number of convertible tones) is equal to 32 for each color component (that is, q is equal to 5 bits), $$Q = 3 \times 8 \times 2^{(5 \times 3)}$$
$$= 98304 \times 8 \text{ [bits]}$$
$$= 96 \text{ K [bytes]}$$

wherein 1 K [byte] is equivalent to 1024 [bytes].

In a similar manner, the required capacity of the color correction table memory 134 is calculated when the number of tones convertible in the pre-conversion of the tone number is set equal to 16 and equal to 8 for each color component. The required memory capacity is only 12 K bytes in the case of 16 tones and 1.5 K bytes in the case of 8 tones. In case that a color correction table stores data regarding all the expressible tones of the original color image data ORG, which are 8-bit data for each color component and have 256 tones, on the other hand, the required memory capacity is as large as approximately 16 M byte.

In the above description, the pre-tone number conversion unit 140 adopts either the error diffusion method or the least mean-error method for the conversion of the tone number.

The pre-tone number conversion unit 140 may, however, adopt the systematic dither method or any other appropriate method for the conversion of the tone number.

In the latter case, the pre-tone number conversion unit 140 does not have the mechanism of minimizing the error in the calculation of the local mean value in a specific area. This may cause deterioration of the picture quality, especially when 256 tones of the original color image data ORG is remarkably decreased to, for example, 8 tones. The effect of the quantization noise is negligible, however, when the number of tones used for the expression of the original color image data ORG is not significantly different from the number of tones convertible by the pre-tone number conversion unit 140; for example, when the pre-conversion of the tone number reduces 64 tones of the original color image data ORG to 32 tones or 16 tones. The effect is also negligible in case that the image output unit 20 has a sufficiently high resolution and the spatial frequency of the quantization noise is sufficiently high. In such cases, the simpler tone number conversion technique, such as the systematic dither method, may be applicable instead of the error diffusion method. The simpler tone number conversion technique like the systematic dither method favorably shortens the time period required for the conversion of the tone number.

[C] Details of Image Processing Common to First through Third Embodiments

The image processing carried out by the image processing apparatus 30 of the embodiment is described more in detail. As shown in FIG. 2, the original color image data ORG that are 8-bit data for the respective colors R, G, and B and have 256 tones are input by the scanner 12 into the computer 90 functioning as the image processing apparatus 30. The printer driver 96 of the computer 90 processes the original color image data ORG and outputs the resulting color image data FNL to the color printer 22. The color printer 22 used here prints an image in two tones corresponding to the on(existence of dots)/off (non-existence of dots) state of each color dot with the three color inks, cyan C, magenta M, and yellow Y. The concrete structure of the printer 22 has been discussed previously.

Figure 9:
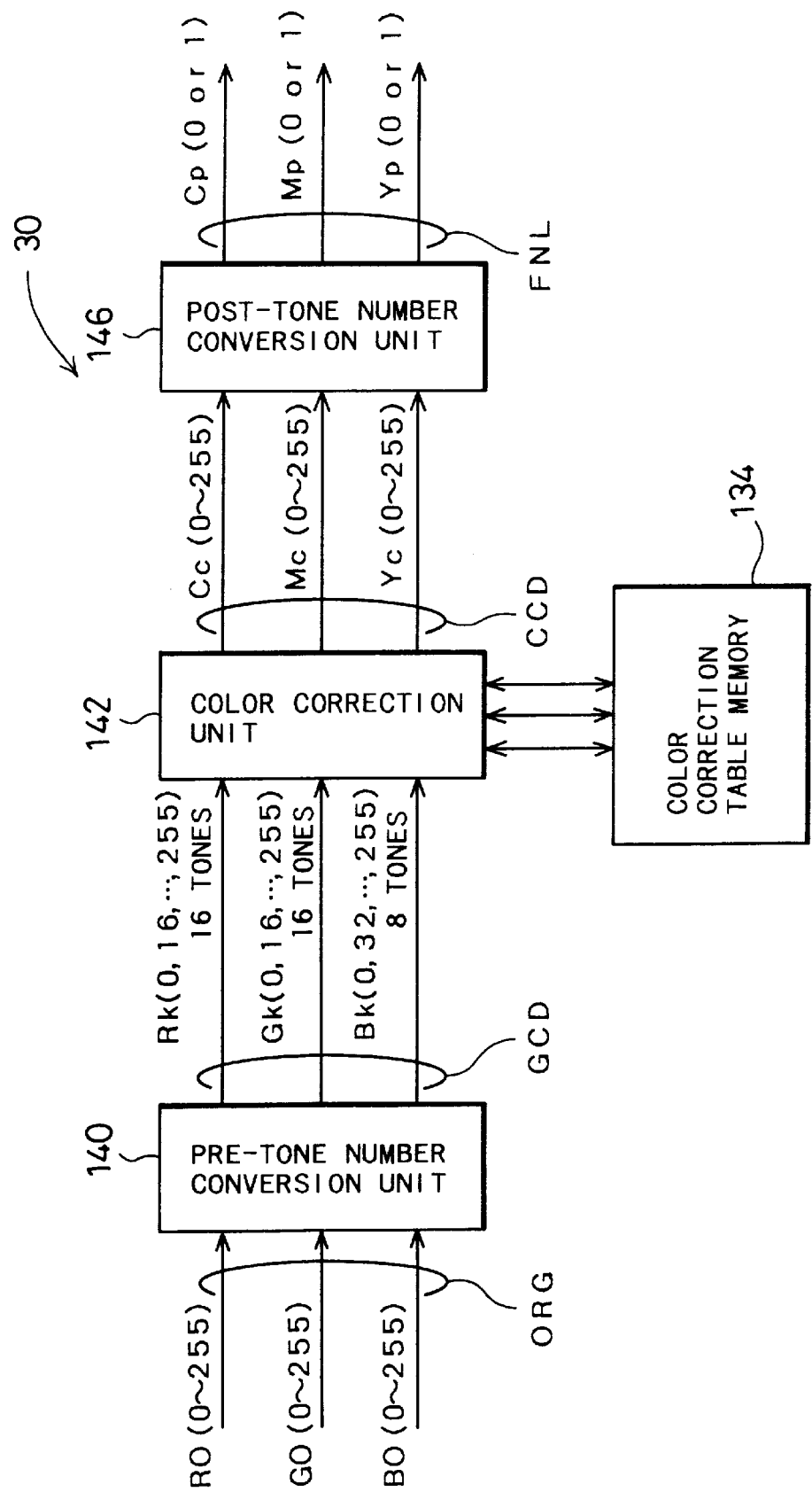
FIG. 9 is a block diagram showing the functions of the image processing apparatus 30 when the color printer 22 is used as the image output unit 20.

FIG. 9 is a block diagram illustrating a concrete structure of the image processing unit 30. The input original color image data ORG are subjected to color correction, converted from the RGB colorimetric system to the CMY colorimetric system, and output as the color-adjusted data CCD by the pre-tone number conversion unit 140 and the color correction unit 142. The color-adjusted data CCD are then binarized corresponding to the number of tones displayable by the printer 22 and output as the resulting color image data FNL by the post-tone number conversion unit 146.

The correction data obtained according to the following procedure are registered in the color correction table memory 134. The post-tone number conversion unit 146 (that is equivalent to the halftone module 99 shown in FIG. 2) included in the image processing apparatus 30 of FIG. 9 is combined with the target color printer 22. The procedure binarizes a variety of C, M, and Y values given to the post-tone number conversion unit 146 and measures the colors output to the target color printer 22, so as to specify a relationship between the C, M, and Y values given to the post-tone number conversion unit 146 and the R, G, and B values obtained by measuring the output results of the color printer 22.

The procedure then reads the C, M, and Y values required for outputting the R, G, and B values corresponding to lattice point color image data in the color space from the specified relationship, and stores the C, M, and Y values as the color-adjusted data into the color correction table memory 134. This procedure is carried out prior to the actual image processing and gives the color correction table CT.

The pre-tone number conversion unit 140 converts the respective color components R0, G0, and B0 of the input original color image data ORG to 16 tones in the case of R and G and to 8 tones in the case of B. and outputs the respective color components Rk, Gk, and Bk as the lattice point color image data GCD. This is equivalent to the structure of FIG. 7, in which Nr and Ng are equal to 16 and Nb is equal to 8. In order to realize such conversion, the procedure of the embodiment carries out the known multi-value coding process according to either the error diffusion method or the least mean-error method.

The following describes a concrete example of the multi-value coding process that converts the color component B to 8 tones. It is here assumed that the color component B of the original color image data ORG is expressed by 8 bits in the binary-coded notation and has 256 tones ranging from 0 to 255. The pre-tone number conversion unit 140 octal-codes the color component B to eight lattice point color data pre_B (i=0, 1, . . . ,7) given below:

pre_B[0], pre_B[1]. . . , pre_B[7]

More concretely, the color component B of the original color image data ORG is subjected to the pre-conversion of the tone number to give the following results. Although the eight values are set at substantially equal intervals in this example, the lower-density range is divided into smaller areas in the first and the second embodiments described below.

pre_B[0]=0;
pre_B[1]=36;
pre_B[2]=73;
pre_B[3]=109;
pre_B[4]=146;
pre_B[5]=182;
pre_B[6]=219; and
pre_B[7]=255.

In the following description, the lattice point color data may be referred to as pre[i].

Seven threshold values used in the pre-conversion of the tone number are defined as:

slsh_B[0], slsh_B[1], . . . , slsh_B[6]

Each threshold value satisfies the following inequality:

pre_B[i]<slsh_B[i]<pre_B[i+1]

(i=0,1,2, . . . ,6)

The threshold value is generally expressed as:

slsh_B[i]=(pre_B[i]+pre_B[i+1]) /2

In this case, the threshold values are given as:

slsh_B[0]=18;
slsh_B[1]=54;
slsh_B[2]=91;
slsh_B[3]=127;
slsh_B[4]=164;
slsh_B[5]=200;
slsh_B[6]=236;

Scanning of the original color image data ORG given to the image processing apparatus 30 generally starts from the pixel on the left-upper corner of an image and goes on the same line to the right-end pixel. Scanning then shifts to the next line and goes from the left-end pixel to the right-end pixel. This scanning operation is repeatedly executed until image data of one picture plane are input into the image processing apparatus 30.

The pre-tone number conversion unit 140 carries out the pre-conversion of the tone number, that is, octal-codes the original color image data ORG, in the sequence of scanning the image data. Namely the octal-coding starts from the pixel on the left-upper corner of the image and goes on the same line to the right-end pixel. The octal-coding then shifts to the next line and goes from the left-end pixel to the right-end pixel. This octal-coding process is repeatedly carried out to octal-code the image data of one picture plane.

Referring to FIG. 10, all the pixels before a target pixel 400 have already been subjected to the multi-value coding, whereas all the pixels after the target pixel 400 have not yet been subjected to the multi-value coding.

For example, a weighting matrix for error diffusion shown in FIG. 11A may be applied to the pre-conversion of the tone number, that is, the octal-coding process. The weighting matrix distributes the error regarding the target pixel 400 in FIG. 11A to the right-side pixel at the fraction of 2, to the lower-side pixel at the fraction of 1, and to the lower-right pixel at the fraction of 1.

Figure 12:
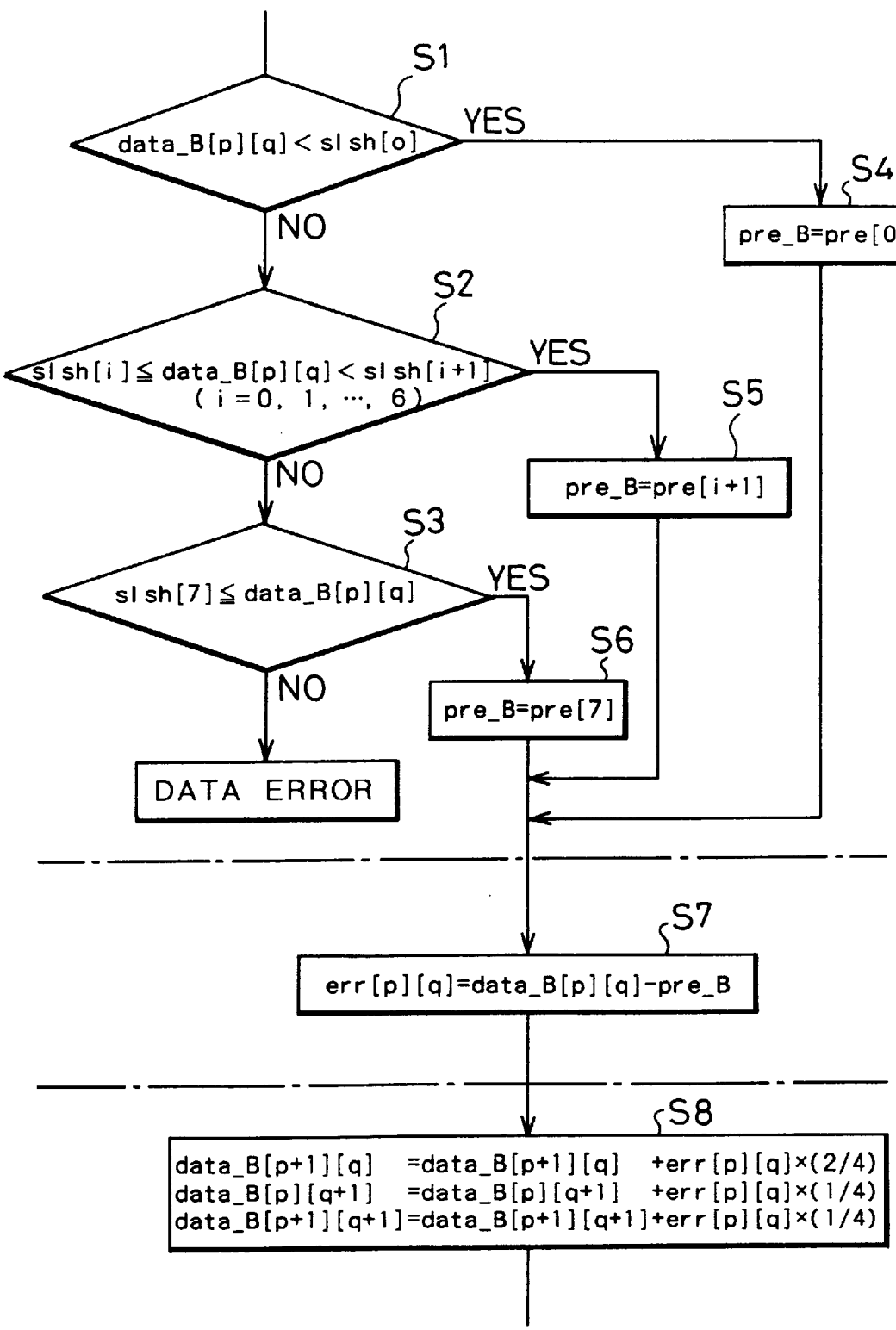
FIG. 12 is a flowchart showing a processing routine when the pre-conversion of the tone number is carried out according to the error diffusion method.

FIG. 12 is a flowchart showing an octal-coding process (pre-conversion of the tone number) carried out by the pre-tone number conversion unit 140 according to the error diffusion method with the weighting matrix.

A target pixel is in the p-th row and q-th column. The original color image data ORG regarding the color component B of the target pixel is expressed as data_B[p][q] and subjected to the octal-coding. The quantization error due to the octal-coding of the pixel in the p-th row and q-th column is given as err[p][q].

(1) First Process: Octal-coding (steps S1 through S6)

Target pixel data is compared with the threshold values and subjected to octal-coding to yield lattice point color data pre_B[p][q], which is hereinafter referred to as the lattice point color data pre_B. In case that the original color image data ORG (data_B[p][q]) is less than the threshold value slsh[0] at step S1, the smallest lattice point color data pre[0] is set to the lattice point color data pre_B regarding the target pixel at step S4. In case that the original color image data data_B[p][q] is not less than the threshold value slsh[0] at step S1, the range of the threshold value (that is, the range of slsh[i] to slsh[i+1]), in which the original color image data data_B[p][q] exists, is specified at step S2. The lattice point color data pre[i+1] is then set to the lattice point color data pre_B regarding the target at step S5. In case that the original color image data data_B[p][q] is not less than the threshold value slsh[7] at step S3, on the other hand, the largest lattice point color data pre[7] is set to the lattice point color data pre_B regarding the target pixel at step S6. The original color image data data_B[p][q] shown in FIG. 12 is not identical with the target pixel data itself, but has already been corrected with the errors diffused from the eight-coded pixels in the vicinity of the target pixel. The error diffusion method is discussed later as the third process.

(2) Second Process: Calculation of Errors (step S7)

The processing of step S7 calculates the error err[p][q] generated in the target pixel by the preceding octal-coding process. The original color image data data_B[p][q] does not actually exist on a lattice point but is allocated to the lattice point through the octal-coding process. This causes the quantization error err[p][q], and the second process calculates the magnitude of the quantization error err[p][q].

(3) Third Process: Error Diffusion (step S8)

The quantization error err[p][q] of the target pixel is distributed into the peripheral pixels that have not yet been octal-coded. This process utilizes the weighting matrix shown in FIG. 11A and distributes a half of the error to the right-side pixel ([p+1][q]), one quarter to the lower-side pixel ([p][q+1]), and another quarter to the lower-right pixel ([p+1][q+1]). These values are added to the original color image data data_B regarding there spective pixels. The original color image data data_B[p][q] of the target pixel used in the first process is the data after such error diffusion.

The octal-coding process may be carried out according to the least mean-error method, instead of the error diffusion method discussed above.

Figure 13:
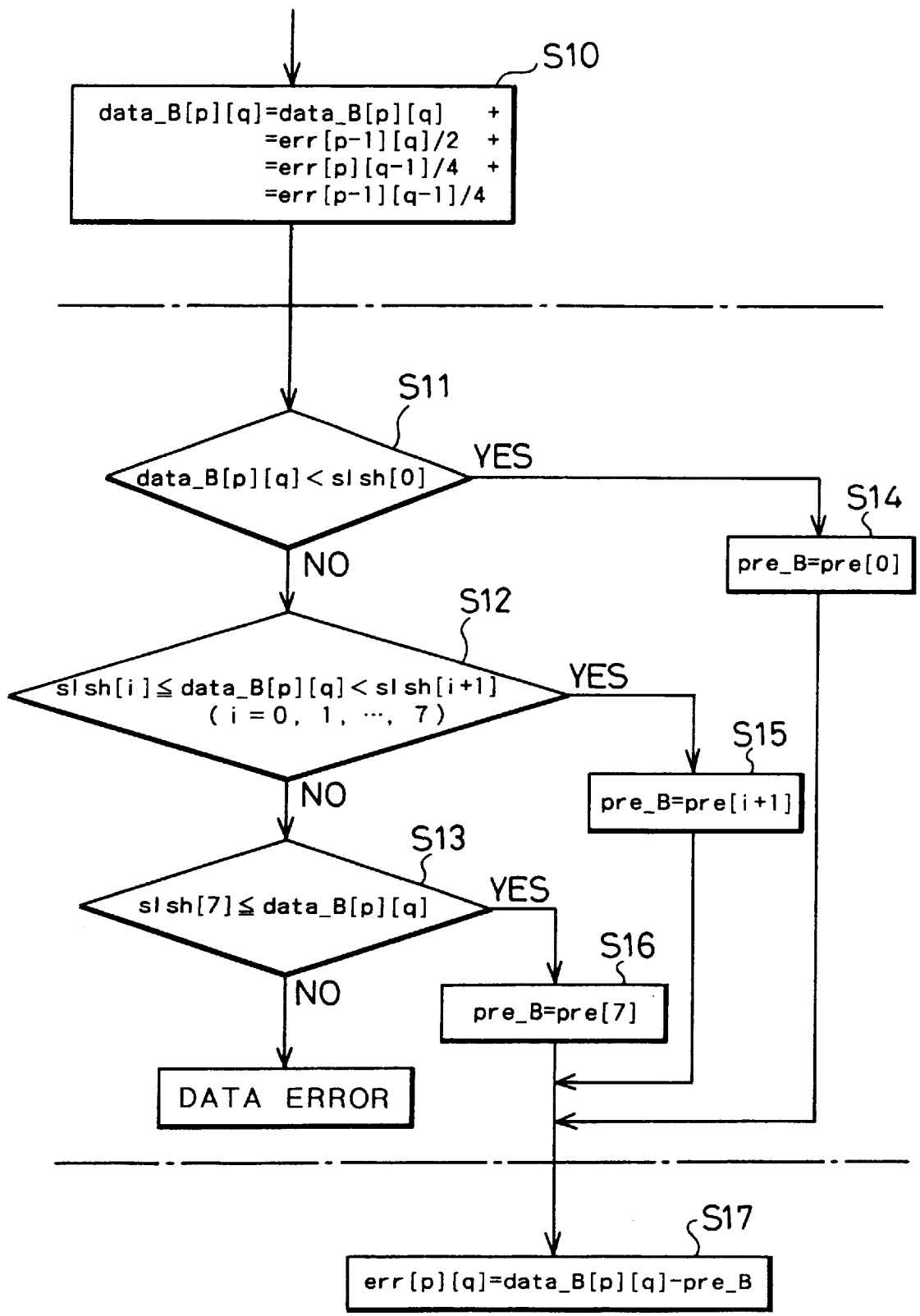
FIG. 13 is a flowchart showing a processing routine when the pre-conversion of the tone number is carried out according to the least mean-error method.

FIG. 13 is a flowchart showing an octal-coding process according to the least mean-error method.

(1) First Process: Correction of Error (step S10)

This process corrects the target pixel data with the errors generated in the peripheral pixels that have already been octal-coded. The matrix of error diffusion used here is identical with the weighting matrix shown in FIG. 11A. Namely the target pixel data is corrected with a half of the quantization error generated in the left-side pixel of the target pixel, one quarter of the quantization error generated in the upper-side pixel, and one quarter of the quantization error generated in the upper-left pixel.

(2) Second Process: Octal-coding (steps S11 through S16)

This process is identical with the processing of steps S1 through S6 shown in the flowchart of FIG. 12.

(3) Third Process: Calculation or Error (step S17)

This process, which is identical with the processing of step S7 shown in the flowchart of FIG. 12, calculates the error err[p][q] generated in the target pixel by the preceding octal-coding process.

The only difference between the error diffusion method shown in FIG. 12 and the least mean-error method shown in FIG. 13 is that the error diffusion is carried out immediately after calculation of the error or immediately before the N-value coding of the target pixel. The error diffusion method and the least mean-error method are accordingly equivalent to each other, except the processing on the ends of the image.

Other than the weighting matrix shown in FIG. 11A, a variety of matrices may be applied for the error diffusion. Examples include a larger matrix shown in FIG. 11B and simpler matrices shown in FIGS. 11C and 11D. FIG. 11D shows the simplest weighting matrix that distributes the error only to the right-side pixel.

The multi-valued error diffusion method is disclosed in, for example, JAPANESE PATENT LAYING-OPEN GAZETTE No. 3-18177, No. 3-34767, No. 3-80767, and No. 3-147480. An appropriate method is adopted according to the requirements.

[Operation of Pre-tone Number Conversion Unit 140 according to Systematic Dither Method]

Figure 14:
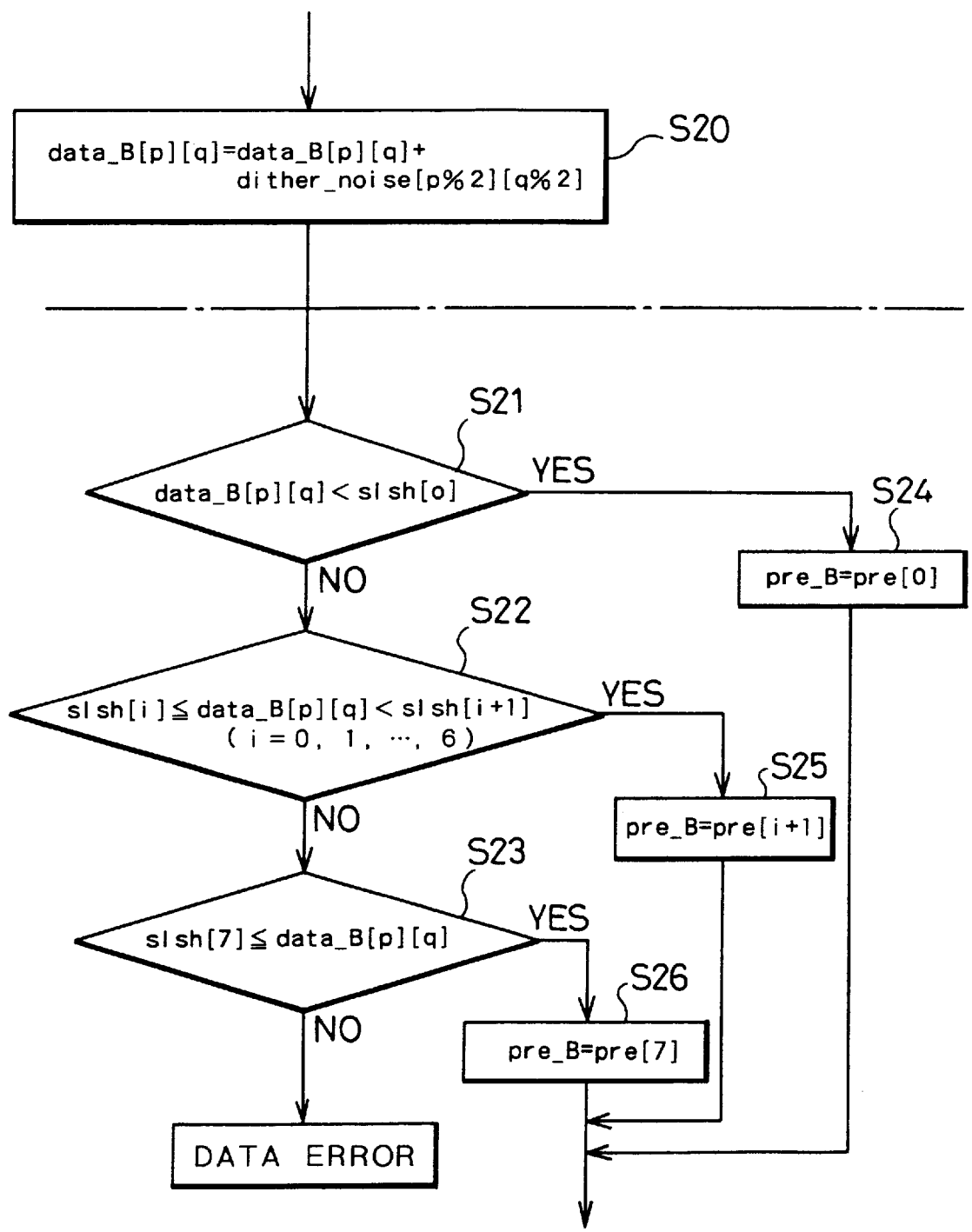
FIG. 14 is a flowchart showing a processing routine when the pre-conversion of the tone number is carried out according to the systematic dither method.

The pre-tone number conversion unit 140 may carry out the pre-conversion of the tone number according to the systematic dither method, instead of the error diffusion method or the least mean-error method described above. FIG. 14 is a flowchart showing a processing routine carried out by the pre-tone number conversion unit 140 according to the systematic dither method.

In the flowchart of FIG. 14, when the color component B of the original color image data ORG has 64 tones ranging from 0 to 63, the pre-tone number conversion unit 140 heptadecimal-codes the original color image data ORG according to the systematic dither method. The dither matrix used here has the size of 2×2. After a systematic dither noise that varies at the cycle of two pixels in both the lateral and vertical directions is added to the original color image data ORG at step S20, the data data_B[p][q] is compared with threshold values at steps S21 through S23 and converted to 17 tones of 0, 1, 2, . . . ,16 at steps S24 through S26.

Sixteen threshold values slsh_B[i] are defined as:

slsh_B[i]=(i+1)×4−2

(i=0,1,2, . . . , 15)

A systematic dither noise (dither_noise[p%2][q%2]) that is determined unequivocally by the position (p,q) of the pixel is added to the target pixel data data_B[p][q] at step S20. Here '%' denotes the remainder operator, and [p%2] implies the remainder obtained when p is divided by 2 and is equal to 0 for even q and equal to 1 for odd q. The systematic dither noise (dither_noise[p%2][q%2]) is specified, for example, as:

dither_noise[0][0]=1 dither_noise[0][1]=−1 dither_noise[1][0]=−2 dither_noise[1][1]=0

The data dataB_[p][q] is then compared with the threshold values slsh_B[i] at steps S21 through S23 to obtain the blue component pre_B of the lattice point color data for heptadecimal-coding at steps S24 through S26.

This is compared with the example of octal-coding according to the least mean-error method shown in the flowchart of FIG. 13. The least mean-error method adds the errors distributed from the peripheral octal-coded pixels to the target pixel data data_B[p][q]. The systematic dither method, on the other hand, adds the periodic noise dither_noise[p%2] that is determined unequivocally by the position of the target pixel to the target pixel data data_B[p][q]. The technique shown in the flowchart of FIG. 14 does not require the error calculation process (step S17) included in the least mean-error method. Compared with the least mean-error method and the error diffusion method, the systematic dither method without calculation of errors enhances the processing speed and saves the hardware resource, that is, the memory for storing errors.

Unlike the error diffusion method, on the other hand, the systematic dither method does not have the mechanism of minimizing the local mean value in a specific error. Extreme reduction of the tone number by the pre-conversion of the tone number may thus cause deterioration of the picture quality. Reduction of the tone number of the original color image data to approximately one quarter as shown in FIG. 14, however, does not create any quasi-contour even in the case of the small matrix of 2×2 in size and minimizes the decrease in resolution.

The user can choose the optimal method for the pre-conversion of the tone number by taking into account the processing speed, the required memory capacity, and the picture quality. For example, the technique adopted for the pre-conversion of the tone number is chosen according to the following criteria:

In case that the image output unit has sufficiently high resolution and some decrease in resolution by the pre-conversion of the tone number is thus negligible, the systematic dither method with a larger matrix is preferable;

In case that the original color image data has a relatively small number of tones and significant reduction of the tone number is not required by the pre-conversion of the tone number, the systematic dither method with a smaller matrix is preferable; and In case that the highest priority is given to the picture quality or that the pre-conversion of the tone number significantly reduces the number of tones to save the capacity of the color correction table memory, the error diffusion method is preferable.

Any adequate method other than the error diffusion method and the systematic dither method may also be applicable for the pre-conversion of the tone number.

The pre-conversion of the tone number may be carried out according to the systematic dither method for only the color component B and according to the error diffusion method for the other color components R and G. This structure is effective since the resolving power of the human's eye with respect to the color component B is generally lower than those with respect to the color components R and G.

The above discussion regards the process of converting the color component B included in the original color image data ORG to eight tones by the pre-tone number conversion unit 140. The other color components R and G included in the original color image data ORG are converted to 16 tones in a similar manner by the pre-tone number conversion unit 140.

The pre-tone number conversion unit 140 carries out the pre-conversion of the tone number and converts the components R, G, and B of the input original color image data ORG to the lattice point color image data GCD as shown below:

in the case of the component R, sixteen values of pre_R[0], pre_R[1], . . . , pre_R[15];

in the case of the component G, sixteen values of pre_G[0], pre_G[1], . . . pre_G[15]; and in the case of the component B, eight values of pre_B[0], pre_B[1], . . ., pre_B[7].

[Concrete Example of Color Correction Unit 142]

The color correction unit 142 carries out the color correction with respect to the lattice point color data, which has been subjected to the multi-value coding or the pre-conversion of the tone number, and converts the colorimetric system from the RGB system to the CMY system. In the example of FIG. 7, for the clarity of explanation, the color correction unit 142 carries out only the color correction in the RGB system. In the actual procedure, however, the color correction unit 142 converts the RGB colorimetric system to the CMY colorimetric system simultaneously with the color correction.

The following discussion regards the software structure and the hardware structure to realize the color correction unit 142 and the color correction table memory 134.

Figures 15A, 15B, 16:
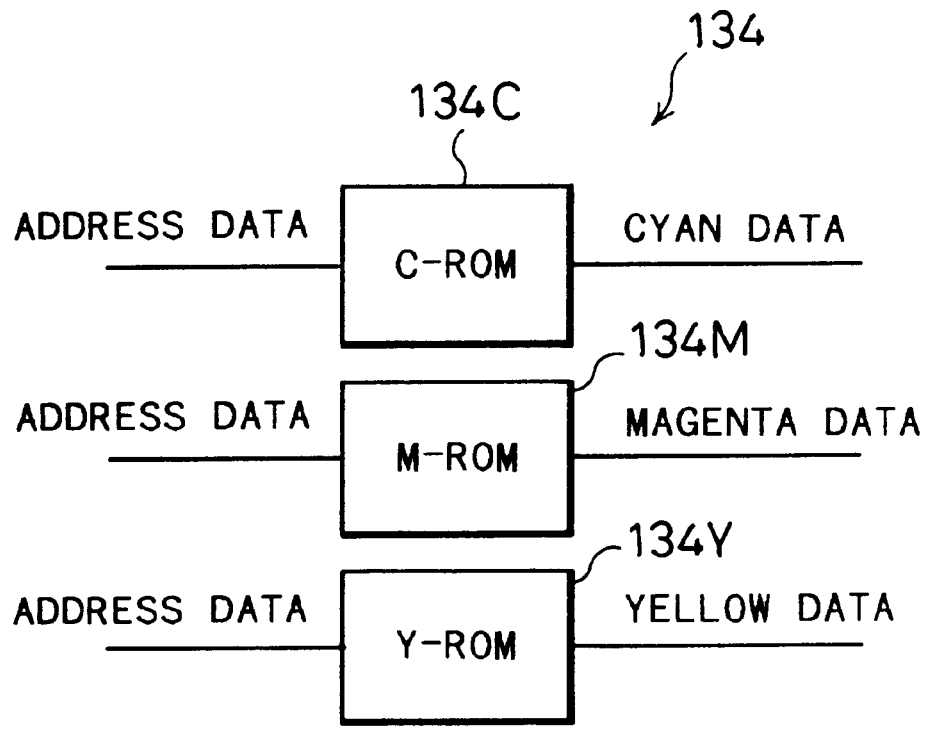
FIGS. 15A and 15B show a software structure to realize the function of the color correction unit 142.
FIG. 16 shows a hardware structure to realize the function of the color correction unit 142.

FIG. 15A shows a software structure to realize the color correction table memory 134 by the C language. Color correction tables for the respective color components C, M, and Y are expressed by the three-dimensional arrays C_table[Nr][Ng][Nb], M_table[Nr][Ng][Nb], and Y_table [Nr][Ng][Nb]. Here Nr, Ng, and Nb denote the number of tones regarding the respective color components (see FIG. 7). In this example, each color correction table has the size of 16×16×8. These tables have the array of unsigned char type (relating to only the 8 bit-data and positive integers). The results of color correction accordingly give 8-bit data in the range of 0 to 255. Conversion data from the RGB to the CMY are stored in advance in the three-dimensional arrays.

FIG. 15B shows a software structure to realize the color correction unit 142 that refers to the three-dimensional color correction tables and converts the lattice point color data pre_R[i], pre_G[j], and pre_B[k] of the respective color components R, G, and B to the CMY values corresponding to the amounts of inks used in the printer 22. The technique using the C language converts the lattice point color data to the color-adjusted C, M, and Y values only by referring to the arrays shown in FIG. 15A.

FIG. 16 shows a hardware structure to realize the color correction table memory 134, wherein the color correction table CT is stored in a semiconductor memory. The results of color correction regarding the color components C, M, and Y are respectively stored in a C-ROM 134C, an M-ROM 134M, and a Y-ROM 134Y. Input of address data that are specified according to the lattice point color data of the respective color components R, G, and B into these ROMs outputs the corresponding color-adjusted cyan data, magenta data, and yellow data.

Figures 17, 18, 19:
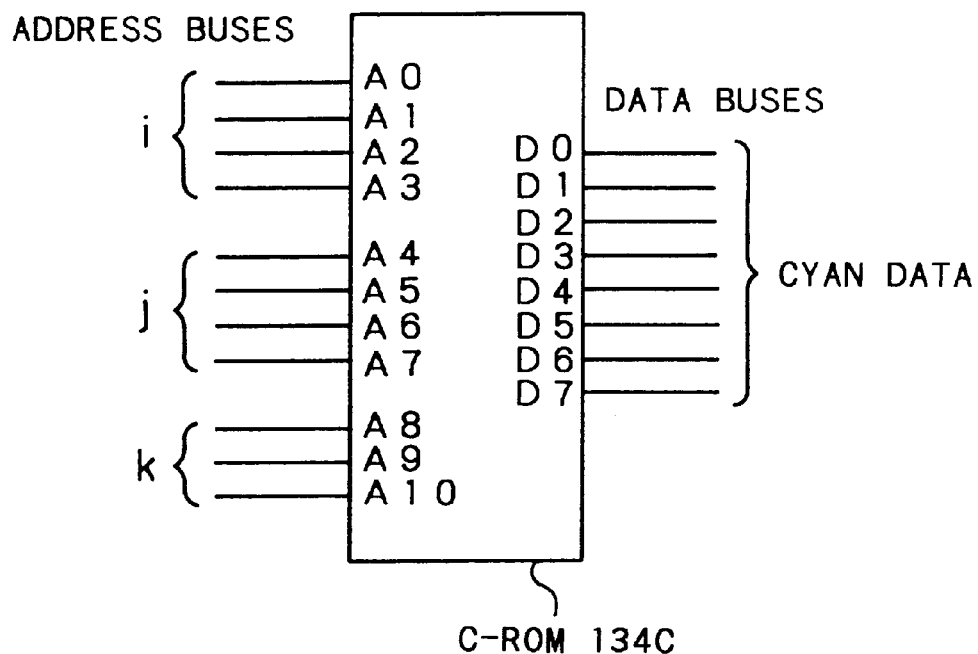
FIG. 17 shows a detailed structure of the C-ROM 134C shown in FIG. 16.
FIG. 18 shows a process of post-conversion of the tone number.
FIG. 19 shows a software structure to realize the function of the color correction unit 142 in the case of conversion from RGB three-color data to four color components C, M, Y, and K.

FIG. 17 shows a detailed structure of the C-ROM 134C shown in FIG. 16. The C-ROM 134C has 11-bit address buses A0 to A10 and 8-bit data buses D0 to D7. The binary-coded i, j, and k values corresponding to the lattice point color data pre_R[i ], pre_G[j], and pre_B[k] are allocated respectively to the lower four bits A0 to A3, the medium four bits A4 to A7, and the upper three bits A8 to A10 in the address bus. Each bit number corresponds to the number of tones with respect to each color component R, G, or B (16 tones for R and G and 8 tones for B).

Since $0 \leq i \leq 15$, $0 \leq j \leq 15$, and $0 \leq k \leq 7$, 4 bits, 4 bits, and 3 bits are sufficient for the i value, the j value, and the k value, respectively. The corresponding color-adjusted cyan data are output as 8-bit data in the range of 0 to 255 to the data bus.

In the hardware structure of FIG. 16, three separate ROMs are provided for the color components C, M, and Y. Another possible hardware structure has only one ROM of the greater capacity that has address buses of the greater bit number for color section signals. Replacement of the ROM by the RAM enables the contents of the table to be freely rewritten.

In both the software structure of FIG. 15 and the hardware structure of FIG. 16, the color correction unit 142 refers to the three-dimensional color correction table memory 134 and implements the color correction.

[Concrete Example of Post-Conversion of Tone Number]

After the color correction, the post-tone number conversion unit 146 (that is, the halftone module 99) binarizes the color-adjusted C, M, and Y data output from the color correction unit unit 142 according to either the error diffusion method or the least mean-error method. A known technique can be adopted for this process. The binarization process according to the error diffusion method is substantially identical with the multi-value coding process executed by the pre-tone number conversion unit 140 shown in the flowchart of FIG. 12, except that the octal coding is replaced by the binary coding. Namely the octal-coding process at steps S1 through S6 in the flowchart of FIG. 12 is replaced with the binary coding process, and the binary coding shown in FIG. 18 is carried out for data_C[p][q], which replaces data_B[p][q]. The cyan data binarized to the value 255 represents existence of cyan dots, whereas the cyan data binarized to the value 0 represents non-existence of cyan dots. The subsequent error calculation process and error diffusion process are identical with the processing of steps S7 and S8 in the flowchart of FIG. 12.

In this binarization process, the excessively small size of the weighting matrix for error diffusion often causes a characteristic dot pattern that may result in deterioration of the picture quality. It is accordingly preferable to use a matrix of the greater size, for example, the matrix shown in FIG. 11B, than that used in the multi-value coding process in the pre-conversion of the tone number. The multi-value coding according to the least mean-error method shown in the flowchart of FIG. 13 may also be replaced by the binary coding.

One primary characteristic in the above structure is that the extremely small-sized weighting matrices for error diffusion, for example, those shown in FIGS. 11A through 11D, are suitably used in the multi-coding process executed by the pre-tone number conversion unit 140 to give sufficiently high picture quality. In the binarization process, the extremely small matrices including only two or less adjacent pixels, to which the error is distributed, such as those shown in FIGS. 11C and 11D, create a pattern characteristic of error diffusion, in which dots continue to form line shapes, and deteriorate the picture quality. In case that the conversion reduces the tone number to eight or more tones like the pre-tone number conversion unit 140 of the embodiment, however, even the extremely small weighting matrices, such as those shown in FIGS. 11C and 11D, used for error diffusion do not significantly deteriorate the picture quality. The weighting matrix for error diffusion used in the pre-tone number conversion unit 140 is accordingly smaller in size than the matrix used in the post-tone number conversion unit 146. The error diffusion process, for example, executed at step S8 in the flowchart of FIG. 12, occupies a most part of the operations, and the amount of operations is proportional to the size of the weighting matrix for error diffusion. The multi-value coding executed by the pre-tone number conversion unit 140 accordingly requires an extremely small amount of operations. Compared with the amount of operations executed in the multi-value coding process by the pre-tone number conversion unit 140 is significantly smaller than the amount of operations executed in the binary coding process by the post-tone number conversion unit 146. The color correction carried out by the color correction unit unit 142 only refers to the contents stored in the color correction table memory 134. The pre-tone number conversion unit 140 and the color correction unit 142 accordingly realize the high-speed data processing.

In the above structure, the color correction unit unit 142 uses the color correction table memory 134 shown in any one of FIGS. 15A, 15B, and 16 to carry out the conversion from the RGB colorimetric system to the CMY colorimetric system simultaneously with the color correction. The color correction unit unit 142 may, however, convert the colorimetric system to the four color components C, M, Y, and K for the printer that uses black ink K in addition to the three color inks C, M, and Y. For example, the color correction tables realized by the software structure shown in FIG. 15A may be expanded to color correction tables for the four colors C, M, Y, and K as shown in FIG. 19. The number of color correction tables is increased with an increase in number of color components through the color correction.

In the above discussion, the original color image data ORG consists of three color components R, G, and B. The original color image data ORG may, however, be expressed by any colorimetric system, such as CMY, L*a*b* in CIE, or XYZ. As shown in FIG. 9, the original color image data ORG may be converted to data in another colorimetric system by the color correction unit 142.

[D] First through Third Embodiments

Based on the structure of the image processing apparatus 30, the following describes concrete structures of the respective embodiments according to the present invention.

(1) First Embodiment

Figure 20:
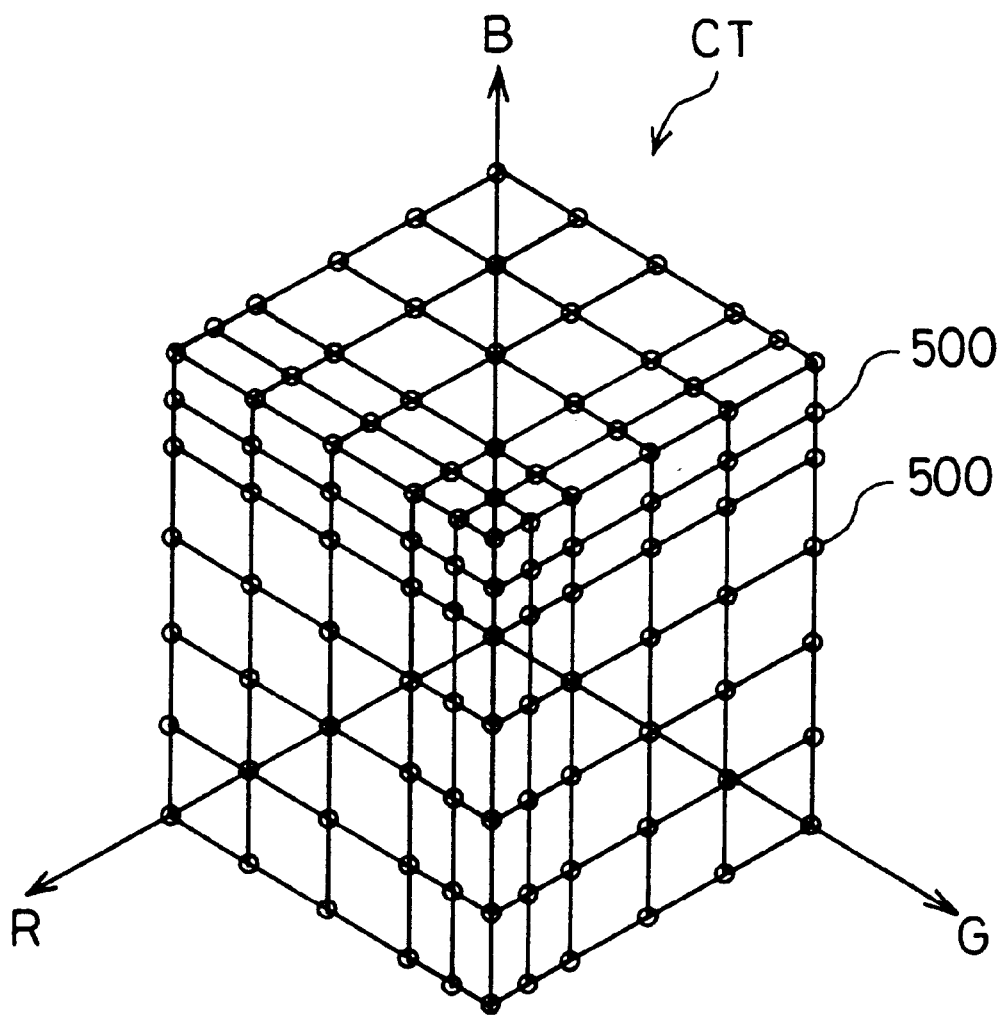
FIG. 20 shows the color space that is divided into smaller areas in a low-density range and used by the image processing apparatus 30 in a first embodiment.

For the clarity of explanation, in the above discussion regarding the image processing apparatus 30, it is assumed that the color space is divided at equal intervals and color correction tables are provided for the respective lattice points 300. In the first embodiment, the color space is divided into smaller areas in the low-density ranges of the color inks C, M, and Y used in the printer 22 or the final image output unit. As mentioned previously, in case that the number of tones after the pre-conversion of the tone number is sufficiently greater than the final number of tones after the post-conversion of the tone number, the quantization noise due to the pre-conversion of the tone number is sufficiently small. Application of the error diffusion method or the least mean-error method makes the local mean value substantially equal to zero. The quantization noise thus does not practically affect the resulting output image. The small quantization noise due to the pre-conversion of the tone number, however, exists and causes irregularities in the appearance of dots in the resulting output image. Strictly speaking, the effect of the quantization noise is practically negligible in the high-density and medium-density ranges having the greater density of dots, whereas the quantization noise may cause deterioration of the picture quality in the low-density range having the less density of dots. In order to solve this problem, the structure of the first embodiment uses a color correction table CT defined by lattice points 500 that are set at narrower intervals in the low-density range as shown in FIG. 20. The pre-conversion of the tone number converts the original color image data to the tone values of the lattice points 500, that is, the lattice point color data, based on this color correction table CT.

By way of example, when the original color image data have the tones of 0 to 255, the pre-conversion of the tone number quantizes the original color image data to the following 18 tones for each of the colors R, G, and B:

0, 16, 32, 48, 80, 96, 112, 128, 144, 160, 176, 192, 208, 224, 240, 248, 255

In this example, each quantization step, that is, the interval between the adjoining lattice points, is basically equal to 16. In the vicinity of the tone value 255, that is, in the low-density range, however, the quantization step is lessened to 8 or 7. The first embodiment carries out the pre-conversion of the tone number according to the error diffusion method shown in the flowchart of FIG. 12, based on these lattice points.

The smaller quantization step in the low-density range is the primary characteristic of the first embodiment. In the prior art interpolation technique, when an ink jet printer is used as the image output unit, on the contrary, the lattice points are set at greater intervals in the low-density range and at narrower intervals in the high-density and the medium-density ranges. Since the probability of contact or overlap of dots is relatively low in the low-density range, the relationship between the input data and the output data has high linearity and even the one-dimensional interpolation gives sufficient accuracy. In the medium-density and the high-density ranges having the greater density of dots, on the other hand, the relationship between the input data and the output data has low linearity. Contrary to the prior art technique, the structure of the embodiment utilizes the color correction table CT, in which the lattice points are set at narrower intervals in the low-density range, in order to reduce a variation in output data in the low-density range. This results in reducing the quantization noise due to the pre-conversion of the tone number in the low-density range, thereby preventing deterioration of the picture quality due to the quantization noise in the low-density range and improving the picture quality of the resulting output image. Since only the low-density range has the narrower intervals of lattice points, this structure does not significantly increase the required capacity of the color correction table memory 134.

The data after the pre-conversion of the tone number are subjected to the color correction based on the color correction table CT. The conversion characteristic of the color correction table CT is generally not linear, so that the quantization steps of the data after the color correction may be different from the quantization steps by the pre-conversion of the tone number. Even when the quantization steps by the pre-conversion of the tone number are sufficiently small in the low-density range, for example, the conversion characteristic of the color correction table CT may cause the quantization steps of the data after the color correction to be not sufficiently small in the low-density range of each ink color. In this case, even when the color correction table CT is divided into smaller areas in the low-density range along each axis R, G, or B as shown in FIG. 20, the resulting image is affected by the quantization noise in the low-density range.

Figure 21:
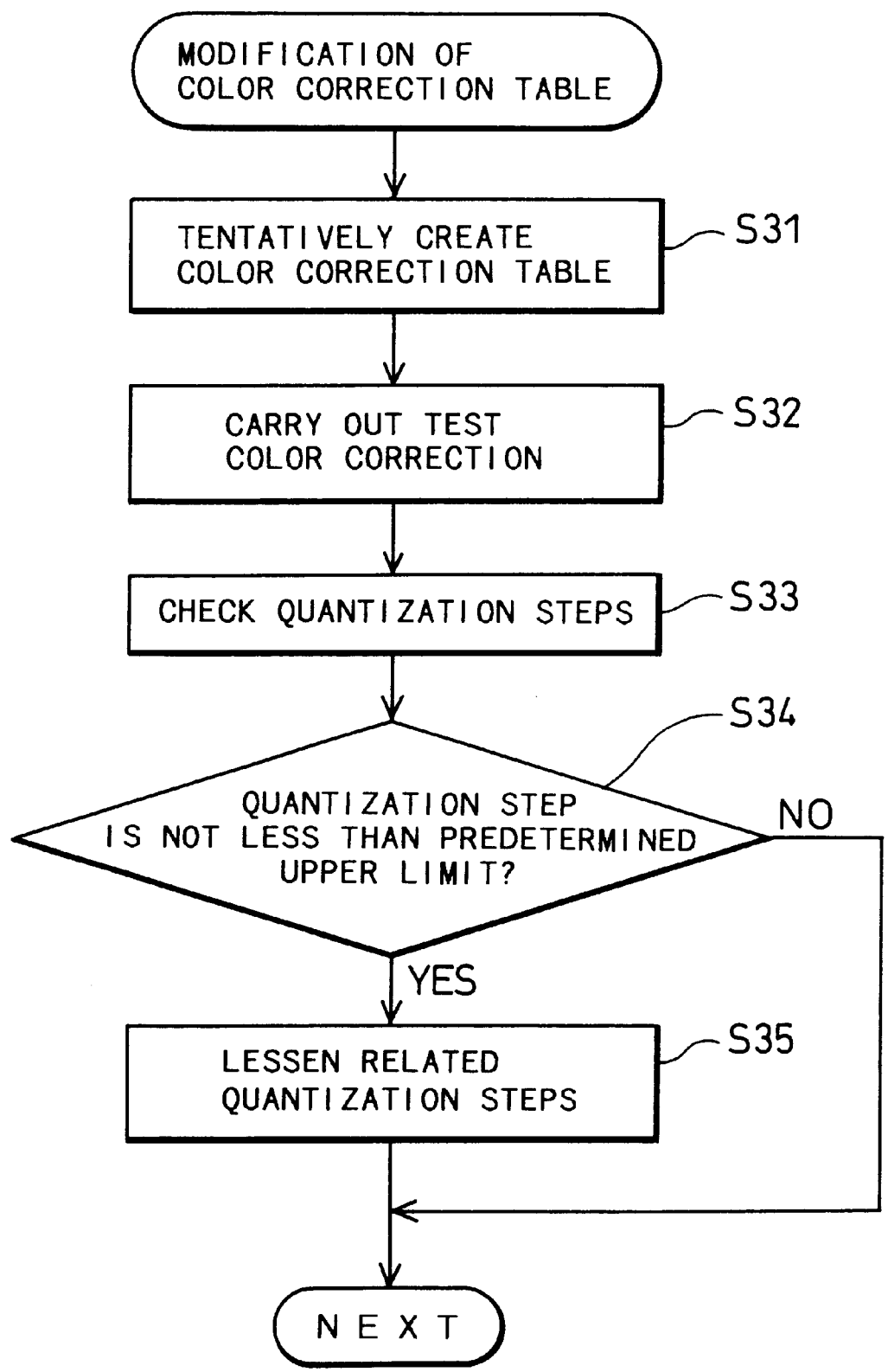
FIG. 21 is a flowchart showing a processing routine for modifying the color correction table CT.

The quantization steps by the pre-conversion of the tone number should accordingly be modified to be sufficiently small in the low-density range and ensure the sufficiently small quantization steps of the data after the color correction in the low-density range. The modification may follow the flowchart of FIG. 21.

(1) The procedure tentatively sets the quantization steps by the pre-conversion of the tone number, which are sufficiently small in the low-density range, and creates a tentative color correction table CT at step S31. The test color correction is then carried out with the tentative color correction table CT at step S32.

(2) The procedure subsequently checks the quantization steps of the data after this test color correction at step S33. It is then determined at step S34 whether or not the quantization step is not smaller than a predetermined upper limit in any part of the low-density range. The predetermined upper limit is specified to cancel the effect of quantization errors in the low-density range. In case that the quantization step is not smaller than the predetermined upper limit in any part of the low-density range, smaller values are set to the related part of the quantization steps by the pre-conversion of the tone number and the corresponding intervals of lattice points in the color correction table CT are modified at step S35.

In this manner, the quantization steps by the pre-conversion of the tone number and the corresponding intervals of the lattice points in the color correction table CT are modified, in order to make the quantization steps of the data after the color correction smaller than the predetermined upper limit in any part of the low-density range. The structure of the first embodiment carries out the pre-conversion of the tone number and the color correction based on the modified quantization steps and the modified color correction table CT, thereby favorably reducing the effect of the quantization noise due to the pre-conversion of the tone number in the low-density range.

(2) Second Embodiment

In the second embodiment having the same structure as that of the first embodiment, the pre-tone number conversion unit 140 carries out the conversion of the tone number according to the dither method. The pre-conversion of the tone number carried out in the second embodiment follows the flowchart of FIG. 22 and uses a dither matrix of 4×4 in size. FIG. 23 shows an available example of the dither matrix. In this example, the pre-conversion of the tone number converts original color image data Da (0 to 255) having N tones (256 tones in this embodiment) for the respective colors R, G, and B to M tones (6 tones in this embodiment). In the following discussion, GC represents lattice point color image data obtained by the pre-conversion of the tone number, and DiTh denotes a dither matrix number that takes the values of 1 to 16 as shown in FIG. 23.

The lattice points provided for the pre-conversion of the tone number have narrower intervals in the low-density range and are set as RSLT[0]=0, RSLT[1]=70, RSLT[2]=130, RSLT[3]=190, RSLT[4]=235, and RSLT[5]=255. Each distance Dist[i] between adjoining lattice points is defined as:

Dist[i]=RSLT[i+1]−RSLT[i]

I=0, 1, . . . , 4

Dist[5] is set equal to 1, in order to guarantee the result of calculation of an offset offset when the original color image data Da is equal to the value 255.

Figure 22:
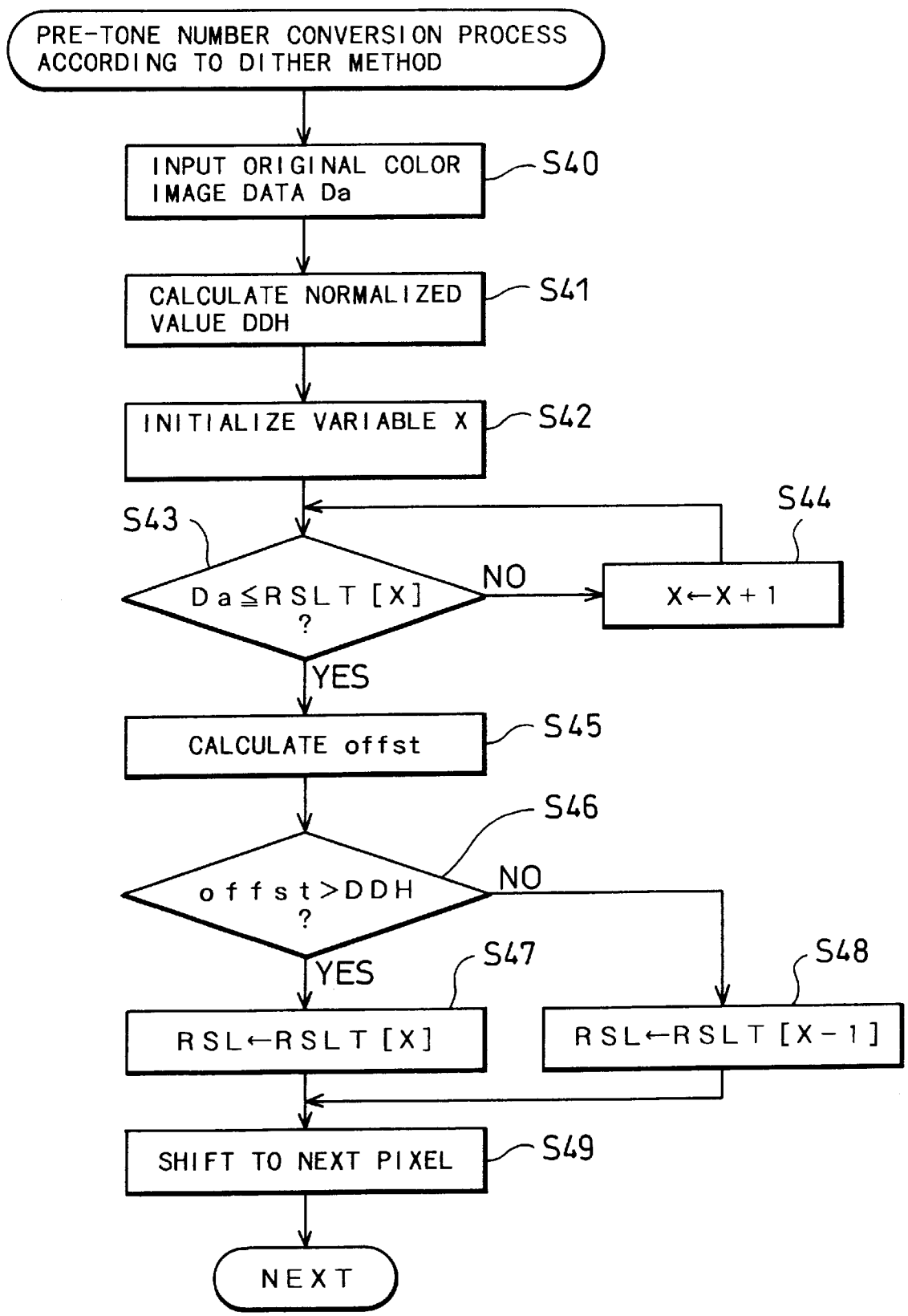
FIG. 22 is a flowchart showing a pre-tone number conversion process carried out according to the dither method by the image processing apparatus 30 in a second embodiment.
Figure 23:
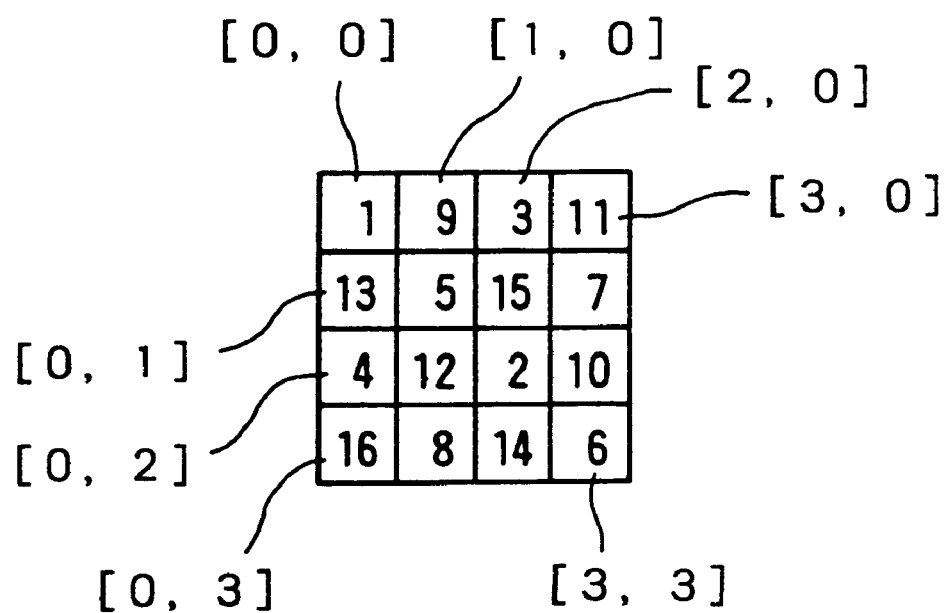
FIG. 23 shows a dither matrix used in the dither method adopted for the pre-conversion of the tone number in the second embodiment.

When the pre-conversion of the tone number shown in the flowchart of FIG. 22 starts, the program first inputs the original color image data Da regarding a target pixel at step S40 and normalizes the dither matrix number DiTh corresponding to the target pixel in the range of 0 to 1 to yield a normalized value DDH at step S41. The normalized value DDH is determined by Equation (3) given below:

Equation 3

$$DDH=(DiTh-0.5)/DiMax \tag{3}$$

wherein DiMax denotes the maximum dither matrix number and is equal to 16 in this embodiment.

The dither matrix number DiTh is obtained by reading the value at a position of [p%4,q%4] from the dither matrix shown in FIG. 23, wherein p denotes the position of the target pixel in a primary scanning direction, q denotes the position of the target pixel in a secondary scanning direction, and % represents the remainder operator. In order to extract the dither matrix number DiTh from the dither matrix of FIG. 23, a function having the elements of [0,0] to [3,3], for example, GetMatrix[x,y], is defined in advance.

After the calculation of the normalized value DDH of the dither matrix number DiTh, a variable X representing a converted tone number is initialized to zero at step S42. The lattice point value RSLT[X] specified by the converted tone number X is then compared with the original color image data Da at step S43. The comparison is carried out for each color component included in the original color image data Da. In case that the original color image data Da is greater than the lattice point value RSLT[X], the variable X is incremented by one at step S44 and the comparison is carried out again at step S43. Namely the variable X is incremented successively until the original color image data Da becomes not greater than the lattice point value RSLT[X].

In case that the original color image data Da is not greater than the lattice point value RSLT[X] at step S43, the offset offset between the original color image data Da and the lattice point value compared at step S43 is calculated at step S45. The offset offset is determined as a normalized value of the original color image data Da with respect to the distance Dist[X−1] between the adjoining lattice points across the data Da according to Equation (4) given below:

Equation 4

$$offset=(RSLT[X]-Da)/Dist[X-1] \tag{4}$$

The offset offset is then compared with the normalized value DDH of the dither matrix number DiTh at step S46. In case that the offset offset is greater than the normalized value DDH, the lattice point value RSLT[X] corresponding to the variable X is set to a resulting value RSL at step S47. This allocates the original color image data Da to the greater lattice point out of the adjoining lattice points across the data Da. In case that the offset offset is not greater than the normalized value DDH, on the other hand, the lattice point value RSLT[X−1] corresponding to the variable X−1 is set to the resulting value RSL at step S48. This allocates the original color image data Da to the smaller lattice point out of the adjoining lattice points across the data Da. After the processing of either step S47 or step S48, the program shifts the target pixel of the processing to a next pixel at step S49. The above processing is repeatedly executed for the original color image data regarding all the pixels included in the original image.

The procedure discussed above uses the discrete dither matrix shown in FIG. 23 to convert the original color image data Da having 256 tones to the lattice point color image data having 6 tones and being scattered adequately. In the example following the flowchart of FIG. 14, data extracted from the dither matrix is added as a noise to the original color image data to make a scatter. This embodiment, on the other hand, uses the dither matrix in the process of allocating the original color image data Da to either of the adjoining lattice points across the data Da, so as to generate a scatter. More concretely, the structure of the second embodiment determines the allocation of the original color image data Da, based on the comparison between the offset offset of the original color image data Da from the adjoining lattice point and the normalized value DDH of the dither matrix number DiTh extracted from the dither matrix. Even when the adjoining pixels have the same original color image data Da, this procedure may cause such original color image data Da to be allocated to different lattice points. Unlike the least mean-error method or the error diffusion method, the systematic dither method does not require calculation of errors, thereby enhancing the speed of image processing and saving the hardware resource, that is, the memory for storing errors.

(3) Third Embodiment

Figure 24:
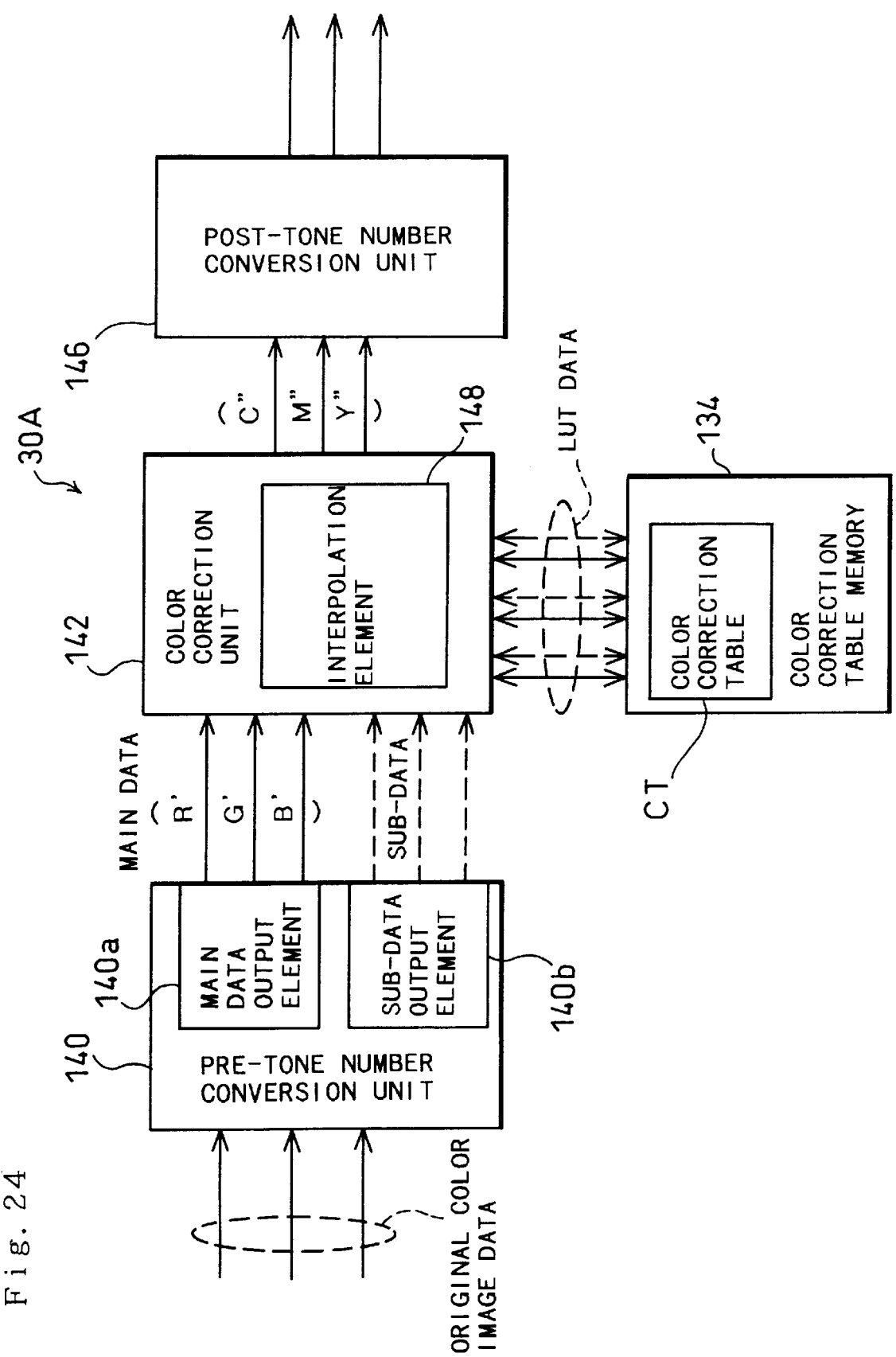
FIG. 24 is a block diagram showing the functions of an image processing apparatus 30A given as a third embodiment.

An image processing apparatus 30A given as the third embodiment has a main data output element 140$a$ and a sub-data output element 140$b$ in the pre-tone number conversion unit 140 and an interpolation element 148 in the color correction unit unit 142 as shown in the block diagram of FIG. 24. Namely the image processing apparatus 30A of the third embodiment has the structure of carrying out interpolation in the course of the pre-conversion of the tone number to the color correction based on the color correction table CT, in addition to the structure of the first embodiment. This structure effectively reduces the quantization noise due to the pre-conversion of the tone number.

The prior art techniques of interpolation carried out in the three-dimensional space of R, G, and B include 8-point interpolation using coordinates of 8 vertices of a quadratic prism as well as 6-point interpolation and 4-point interpolation using a less number of vertices for simpler calculation (see, for example, JAPANESE PATENT PUBLICATION GAZETTE No. 58-16180). All such techniques are the three-dimensional interpolation. The structure of the third embodiment, on the other hand, carries out one-dimensional interpolation. More specifically, in this embodiment, only the input color component having the greatest effect on a desired output color among the three color components R, G, and B (hereinafter referred to as the main color or main color component) is subjected to interpolation with quantization values. For example, when the input data of RGB are converted to the output data of CMY, interpolation with quantization values is carried out only for the respective complementary colors regarded as the main color components, that is, R as the main color of C, G as the main color of M, and B as the main color of Y. The main color components have significant effects on the output results of the output color components, and a little variation in color component other than the main color does not significantly affect the output results. Interpolation only for the main color component accordingly gives sufficient accuracy.

In the following description, (R,G,B) denotes original image data, and (R',G',B') denotes data after the pre-conversion of the tone number. The respective color components C, M, and Y of data obtained by applying the color correction table CT to the data (R',G',B') are expressed as LUT_C(R',G',B'), LUT_M(R',G',B'), and LUT_Y(R',G',B'). (C',M',Y') denotes final data after color correction.

Figure 25:
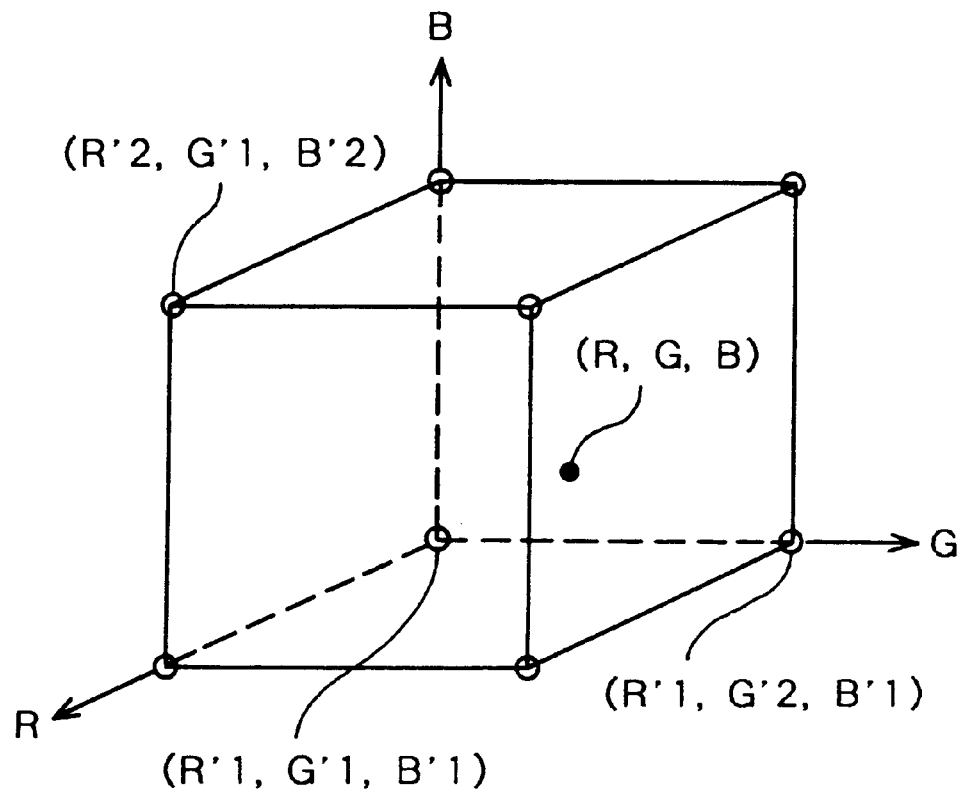
FIG. 25 shows one-dimensional interpolation carried out for a main color.

As shown in FIG. 25, it is here assumed that the original image data (R,G,B) regarding a certain pixel satisfies the following relationship with respect to the lattice points for the pre-conversion of the tone number:

R'1<R<R'2, G'1<G<G'2, B'1<B<B'2

The pre-conversion of the tone number converts the original image data (R,G,B) to data (R'1,G'2,B'1) (hereinafter referred to as the main data).

The pre-conversion of the tone number outputs sub-data, that is, data at the lattice point that is opposite to the lattice point of the main data across the original image data with respect to only the main color component, in addition to the main data (R'1,G'2,B'1). The main data is common to the respective color components, whereas the respective color components have different sub-data. The color correction table CT is applied to both the main data and the sub-data for each color component, so as to obtain two values required for the one-dimensional interpolation:

(1) R as the main color of C
LUT_C(R'1,G'2,B'1) and LUT_C(R'2,G'2,B'1);
(2) G as the main color of M
LUT_M(R'1,G'2,B'1) and LUT_M(R'1,G'1,B'1); and
(3) B as the main color of Y
LUT_Y(R'1,G'2,B'1) and LUT_Y(R'1,G'2,B'2).

In this manner, the color correction table CT is applied to the main data (R'1,G'2,B'1) as well as the sub-data having a different main color component from that of the main data, in order to obtain two values required for the one-dimensional interpolation.

The one-dimensional interpolation is carried out at the final stage of color correction to yield the final data (C",M",Y"), wherein C" denotes the result of interpolation between LUT_C(R'1,G'2,B'1) and LUT_C(R'2,G'2,B'1), M" the result of interpolation between LUT_M(R'1,G'2,B'1) and LUT_M(R'1,G'1,B'1), and Y" the result of interpolation between LUT_Y(R'1,G'2,B'1) and LUT_Y(R'1,G'2,B'2).

Figure 26:
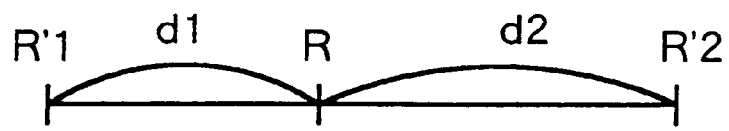
FIG. 26 shows the principle of the one-dimensional interpolation.

Interpolation of each color component is carried out with weighting coefficients corresponding to the distances between the original data and the main data and between the original data and the sub-data for each color component. For example, when the original data regarding the R(C) color component is apart from the main data by a distance d1 and from the sub-data by a distance d2 as shown in FIG. 26, C" is determined according to Equation (5) given below:.

Equation 5

$$C''=\{d2 \cdot LUT\_C(R'1,G'2,B'1)+d1 \cdot LUT\_C(R'2,G'2,B'1)\}/(d1+d2) \quad (5)$$

The one-dimensional interpolation only for the main color requires only the simple calculation and still effectively reduces the quantization noise due to the pre-conversion of the tone number. The interpolation may be carried out only in the low-density range.

[E] Details of Image Processing Common to Fourth through Seventh Embodiments

Figure 27:
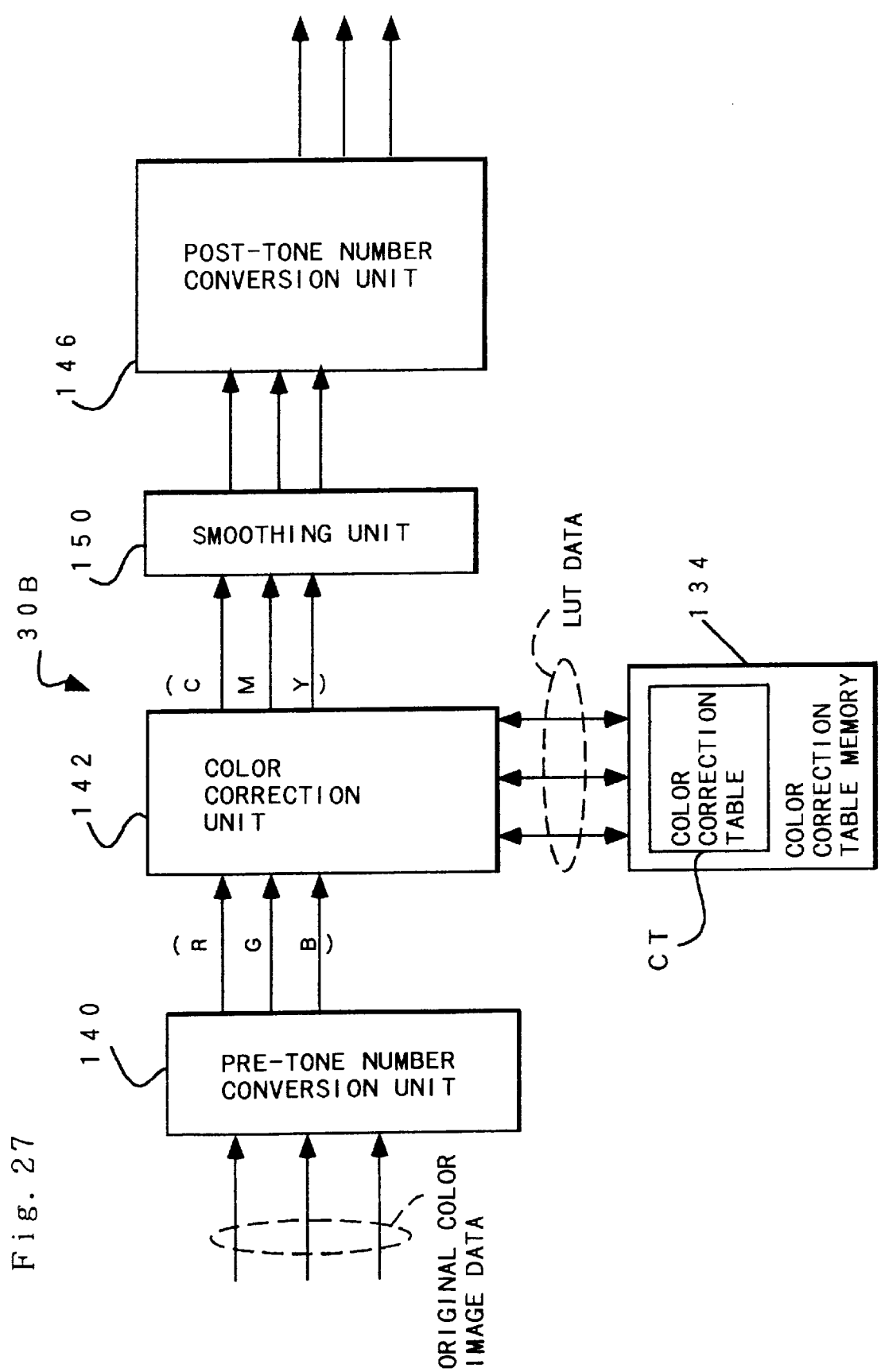
FIG. 27 is a block diagram showing the functions of an image processing apparatus 30B common to fourth through seventh embodiments.

In the color correction table CT used in the first through the third embodiments discussed above, the color space consisting of the lattice points is divided into smaller areas in the low-density range. In the fourth through the seventh embodiments discussed below, on the other hand, the color space in the color correction table CT is divided at equal intervals as shown in FIG. 6. These embodiments have a smoothing unit 150 in an image processing apparatus 30B as shown in FIG. 27, instead of the structure of dividing the color space into smaller areas in the low-density range. The following describes the image processing common to these embodiments with the smoothing unit 150.

The image processing apparatus 30B carries out smoothing after the pre-conversion of the tone number and the color correction, in order to reduce the quantization noise due to the pre-conversion of the tone number. The smoothing process successively selects a target pixel among the pixels included in a color-adjusted image in the sequence of raster scanning, applies a smoothing filter with weighting coefficients to data of the target pixel and peripheral pixels in order to calculate the weighted mean of the data, and sets the weighted mean as new data of the target pixel. This procedure is repeated for all the pixels in the color-adjusted image.

Figure 28A:
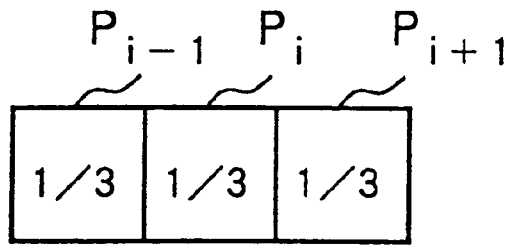
FIGS. 28A through 28D show a variety of smoothing filters.

FIGS. 28A through 28D show some examples of the smoothing filter. FIG. 28A shows a one-dimensional smoothing filter consisting of three pixels. Numerals in the respective pixels represent weighting coefficients of the pixels. In this example, the smoothing filter having the even weighting coefficients of ⅓ is applied to a target pixel $P_i$ and two adjoining pixels $P_{i-1}$ and $P_{i+1}$ on the same line. When data of the three pixels $P_{i-1}$, $P_i$, and $P_{i+1}$ are expressed as $(C_{i-1}, M_{i-1}, Y_{i-1})$ $(C_i, M_i, Y_i)$, and $(C_{i+1}, M_{i+1}, Y_{i+1})$ the final data $(C,M,Y)$ of the target pixel $P_i$ is given as:

$$C=(C_{i-1}+C_i+C_{i+1})/3$$

$$M=(M_{i-1}+M_i+M_{i+1})/3$$

$$Y=(Y_{i-1}+Y_i+Y_{i+1})/3$$

Figure 28B:
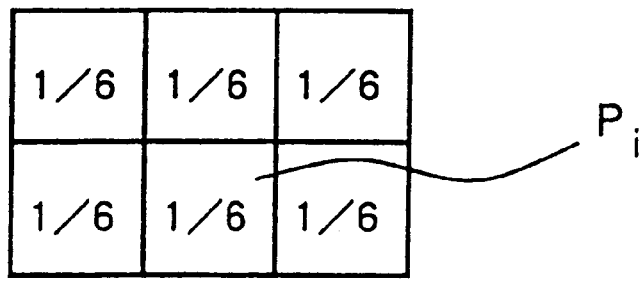
Figure 28C:
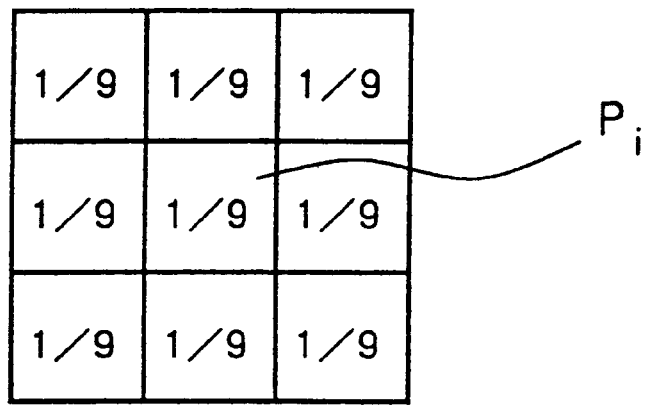
Figure 28D:
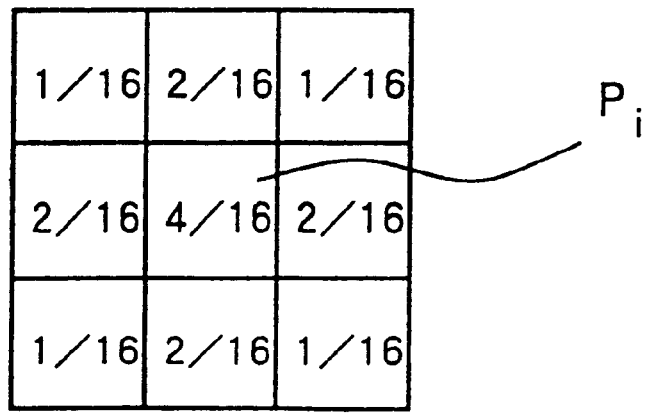

Uneven weighting coefficients may be allocated to these pixels; for example, a larger weighting coefficient to the target pixel and a smaller weighting coefficient to the adjoining pixels. FIGS. 28B through 28D show two-dimensional smoothing filters applied to pixels not only on the line of the target pixel but on an or a plurality of adjoining lines. The smoothing filter of FIG. 28B having even weighting coefficients is applied to six pixels on the line of the target pixel $P_i$ and a preceding line. The smoothing filter of FIG. 28C also having even weighting coefficients is applied to nine pixels on the line of the target pixel $P_i$, a preceding line, and a next line. The smoothing filter of FIG. 28D applied to the same pixels as those of FIG. 28C has uneven weighting coefficients.

The smoothing process can solve the problem of deteriorating picture quality of the resulting output image due to the effect of quantization errors caused by the pre-conversion of the tone number. When the post-conversion of the tone number is carried out according to the conventional discrete dither method, the quantization errors by the pre-conversion of the tone number may deteriorate the picture quality. The smoothing process executed prior to the post-conversion of the tone number can, however, prevent the deterioration of the picture quality, even when a discrete dither is adopted for the post-conversion of the tone number. The discrete dither method as well as the error diffusion method, the least mean-error method, and the concentrated dither method may accordingly be applicable to the post-conversion of the tone number.

The smoothing process reduces the quantization noise due to the pre-conversion of the tone number in a fixed tone range or a continuously gradating tone range, while causing the edges of characters and figures to lose the sharpness. It is accordingly preferable to modify the smoothing process with respect to the pixels of detected edges, so as not to damage the sharpness of the edges. A concrete procedure, for example, calculates a difference between the value of a target pixel and the value of an adjoining pixel, and regards the target pixel as an edge when the difference is not less than a predetermined value. In this case, the smoothing process for the target pixel does not refer to the pixel adjoining to the target pixel.

The outline of this procedure is described here, although its details will be discussed later. In the example of the one-dimensional three-pixel smoothing filter shown in FIG. 28A, the processing defined as Equations (6) is carried out for the color component C, wherein A denotes the predetermined value used for determination of an edge, $C_i$ represents the value of the color component C regarding a target pixel 'i', and $C_{i-1}$ and $C_{i+1}$ represent the values of the color component C regarding adjoining pixels before and after the target pixel 'i'.

Equations 6 if {absolute value of $(C_i - C_{i-1}) < A$}, $Ca = C_{i-1}$, else $C_a = C_i$ if {absolute value of $(C_i - C_{i+1}) < A$}, $Cb = C_{i+1}$ else $C_b = C_i$ $C = (C_a + C_i + C_b)/3$ The similar processing is carried out for the other color components M and Y. As for the target pixel determined as an edge when the absolute value of the tone difference between the target pixel and the adjoining pixel is not less than the predetermined value A, the smoothing process does not refer to the adjoining pixel. This smoothing process improves the picture quality in image parts other than edges while maintaining the sharpness of the edges.

[F] Fourth through Seventh Embodiments (1) Fourth Embodiment

Figure 29:
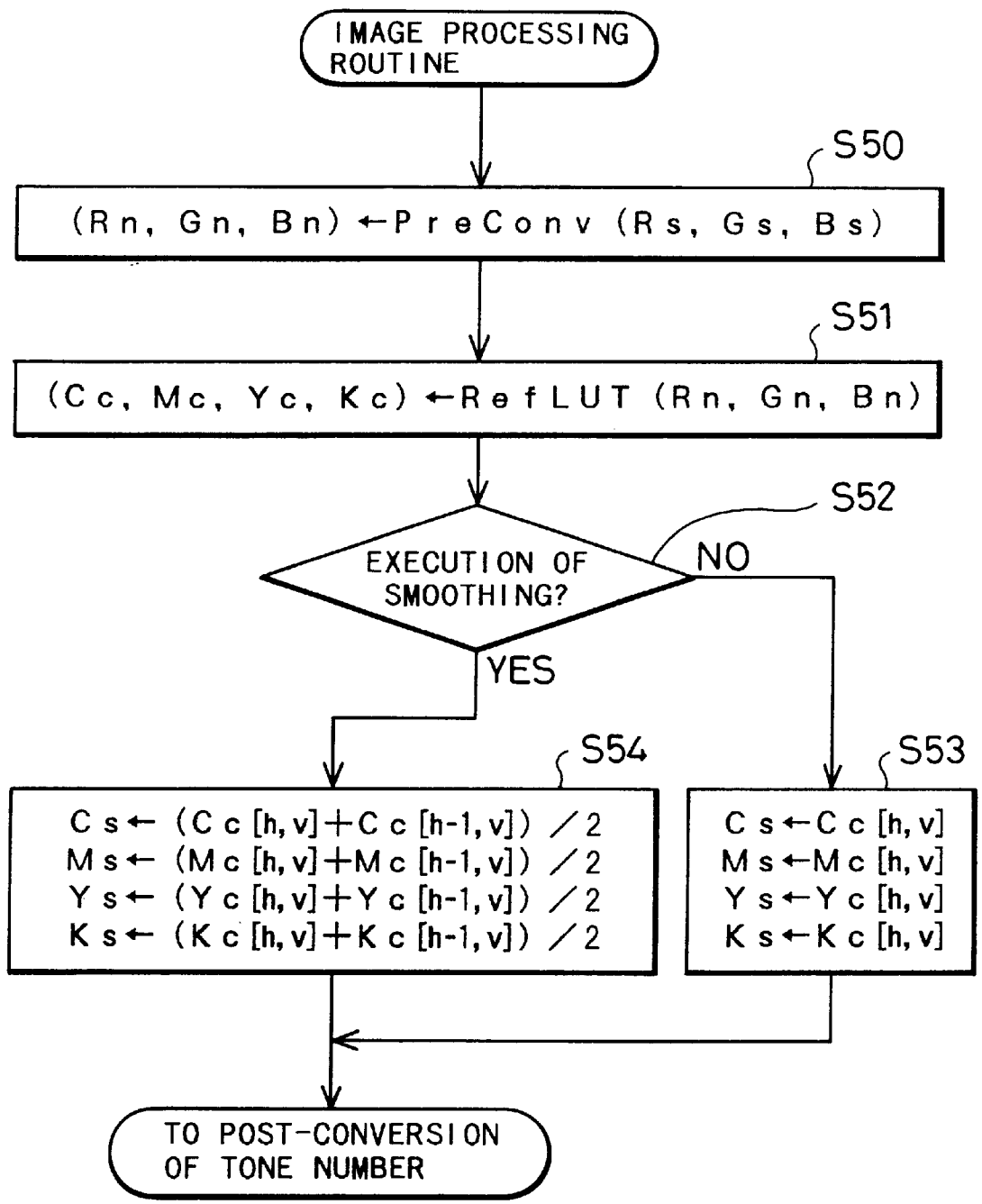
FIG. 29 is a flowchart showing an image processing routine executed in the fourth embodiment.

In the image processing apparatus 30B of the fourth embodiment, the pre-tone number conversion unit 140, the color correction unit 142, and the smoothing unit 150 are realized by an image processing routine shown in the flowchart of FIG. 29. In the structure of FIG. 2, the smoothing unit 150 is included in the color correction module 98. In the following discussion, h represents the position of the target pixel in the primary scanning direction, and v the position of the target pixel in the secondary scanning direction. The respective color components of the original color image data ORG prior to the pre-conversion of the tone number carried out by the pre-tone conversion unit 140 are defined as Rs[h,v], Gs[h,v], and Bs [h,v], whereas the respective color components of the lattice point color image data GCD after the pre-conversion of the tone number are defined as Rn[h,v], Gn[h,v], and Bn[h,v]. The pre-conversion of the tone number reduces the number of tones to either 16 tones or 8 tones for each color in this embodiment. The data Rn[h,v], Gn[h,v], and Bn[h,v] accordingly show the lattice point to which the data are allocated. In the fourth embodiment, the color correction table CT is used for conversion from RGB to the four colors CMYK. The respective color components of the color-adjusted data CCD are defined as Cc[h,v], Mc[h,v], Yc[h,v], and Kc[h,v]. In the flowchart of FIG. 29, [h,v] may be omitted for the convenience of illustration.

When the program enters the routine of FIG. 29, the pre-tone number conversion unit 140 carries out the pre-conversion of the tone number at step S50. The pre-conversion of the tone number allocates the respective color components Rs[h,v], Gs[h,v], and Bs[h,v] of the original color image data ORG to predetermined lattice points, so as to reduce the number of tones. The concrete procedure has been discussed previously in the first through the third embodiments. In the flowchart of FIG. 29, the pre-conversion of the tone number is defined by a function PreConv( ). The pre-conversion of the tone number yields the color components Rn[h,v], Gn[h,v], and Bn[h,v] of the lattice point color image data GCD.

At subsequent step S51, the color correction unit unit 142 refers to the color correction table CT previously stored in the color correction table memory 134 and carries out the color correction of the respective color components of the lattice point color image data GCD. The color correction unit unit 142 converts the colorimetric system from RGB to the four colors CMYK, which are the ink colors eventually output from the color printer 22, simultaneously with the color correction. The color correction yields the color components Cc[h,v], Mc[h,v], Yc[h,v], and Kc[h,v] of the color-adjusted data CCD. In the flowchart of FIG. 29, the color correction that refers to or looks up the color correction table CT is defined by a function RefLUT( ).

Figure 30:
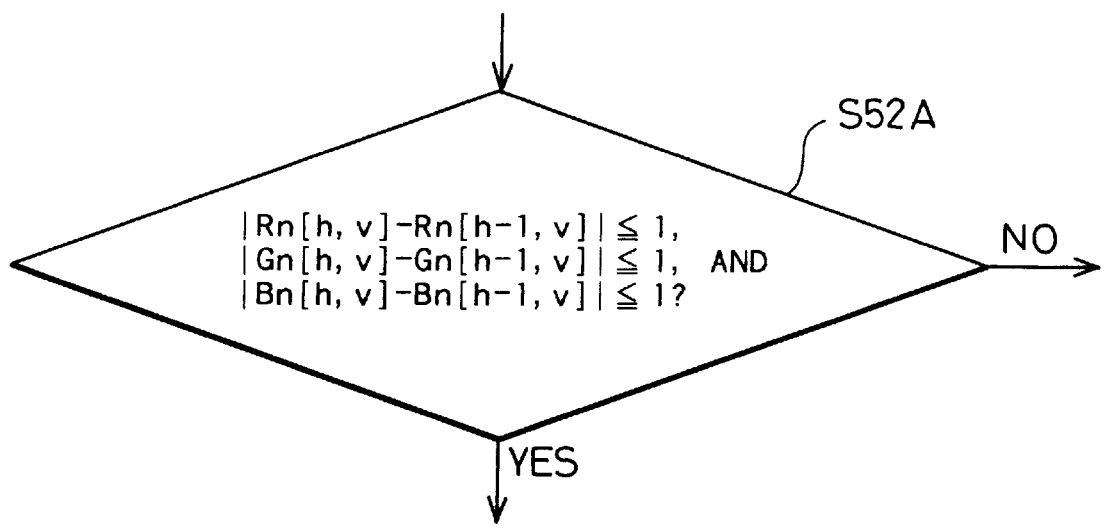
FIG. 30 shows one exemplified step to determine whether or not the smoothing process should be carried out.

After the output of the respective color components of the color-adjusted data CCD, the smoothing unit 150 carries out the smoothing process. The smoothing unit 150 first determines whether or not the smoothing process should be executed for the target pixel [h,v] and the adjoining pixel at step S52. Any appropriate technique may be used for the determination as described above. In this embodiment, as shown by step S52A of FIG. 30, the smoothing process is carried out when the differences between the data Rn[h,v], Gn[h,v], and Bn[h,v] after the pre-conversion of the tone number regarding the target pixel [h,v] and the corresponding data regarding the adjoining pixel [h−1,v] before the target pixel are not greater than one for the respective color components. Namely the smoothing process is carried out when the respective color components regarding the target pixel and the adjoining pixel before the target pixel in the primary scanning direction are allocated to the same or adjoining lattice points by pre-conversion of the pre-tone number conversion unit 140. It is accordingly determined that the smoothing process is not carried out, for example, for the edges included in the original image.

When it is determined that the smoothing process should not be carried out, the respective color components Cc[h,v], Mc[h,v], Yc[h,v], and Kc[h,v] of the color-adjusted data CCD regarding the target pixel are output to the post-tone number conversion unit 146 as output data Cs, Ms, Ys, and Ks at step S53. When it is determined that the smoothing process should be carried out, on the other hand, the program calculates the arithmetic mean of the respective color components Cc[h−1,v], Mc[h−1,v], Yc[h−1,v], and Kc[h−1,v] of the color-adjusted data regarding the adjoining pixel before the target pixel and those Cc[h,v], Mc[h,v], Yc[h,v], and Kc[h,v] regarding the target pixel and outputs the arithmetic mean to the post-tone number conversion unit 146 as the output data Cs, Ms, Ys, and Ks at step S54. In this embodiment, the post-conversion of the tone number carried out by the post-tone number conversion unit 146 is a halftoning process, such as error diffusion, since the output of the color printer 22 is binary coded, that is, formation or non-formation of ink dots. Details of the post conversion are not specifically described here.

In the image processing apparatus 30B of the fourth embodiment, the smoothing unit 150 carries out the smoothing process, in order to relieve the effect of quantization errors due to the pre-conversion of the tone number and thereby effectively prevent the deterioration of picture quality caused by the quantization errors. The smoothing unit 150 compares the data after the pre-conversion of the tone number regarding the target pixel with those regarding the adjoining pixel before the target pixel, and does not execute the smoothing process when any one of the color components is allocated to a lattice point different from the same or adjoining lattice point. This structure prevents the sharpness of the edges included in the original image from being lost by the smoothing process. Execution or non-execution of the smoothing process is based on the comparison between the data of the target pixel and the data of the adjoining pixel processed immediately before the target pixel. Only a small memory capacity is thus required for storing data used for the comparison. The comparison between the data of the target pixel and the data of the adjoining pixel requires only the simple calculation, thereby enhancing the processing speed.

Figure 31:
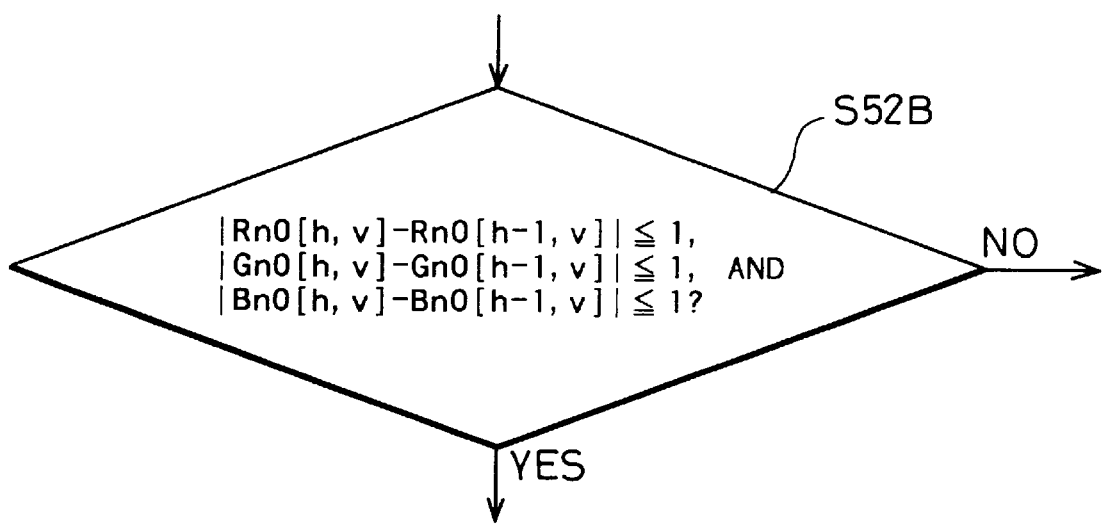
FIG. 31 shows another step to determine whether or not the smoothing process should be carried out.

In the fourth embodiment discussed above, execution or non-execution of the smoothing process is based on the differences between the respective color components of the data after the pre-conversion of the tone number regarding the target pixel and those regarding the adjoining pixel. Another technique may be applied for the determination. For example, as shown by step S52B of FIG. 31, the determination may be based on data Rn0 [h,v], Gn0 [h,v], and Bn0 [h,v] that represent the range of the original color image data, instead of the processed data Rn[h,v], Gn[h,v], and Bn[h,v] after the pre-conversion of the tone number. The data Rn0 [h,v], Gn0 [h,v], and Bn0 [h,v] show which quadratic prism defined by eight adjoining lattice points the target pixel exists in. The condition of step S52B is accordingly equivalent to the determination of whether or not the target pixel and the adjoining pixel before the target pixel in the primary scanning direction exist in the same quadratic prism defined by eight lattice points or in the adjoining quadratic prisms. The processing of step S52A shown in FIG. 30 determines the execution of the smoothing process when the respective color components are allocated to the same or adjoining lattice points by the pre-conversion of the tone number, irrespective of the relation of the original color image data. The processing of step S52B shown in FIG. 31, on the other hand, determines the execution of the smoothing process only when the original color image data exist in the same space defined by adjoining lattice points or in the adjoining spaces.

Figure 32:
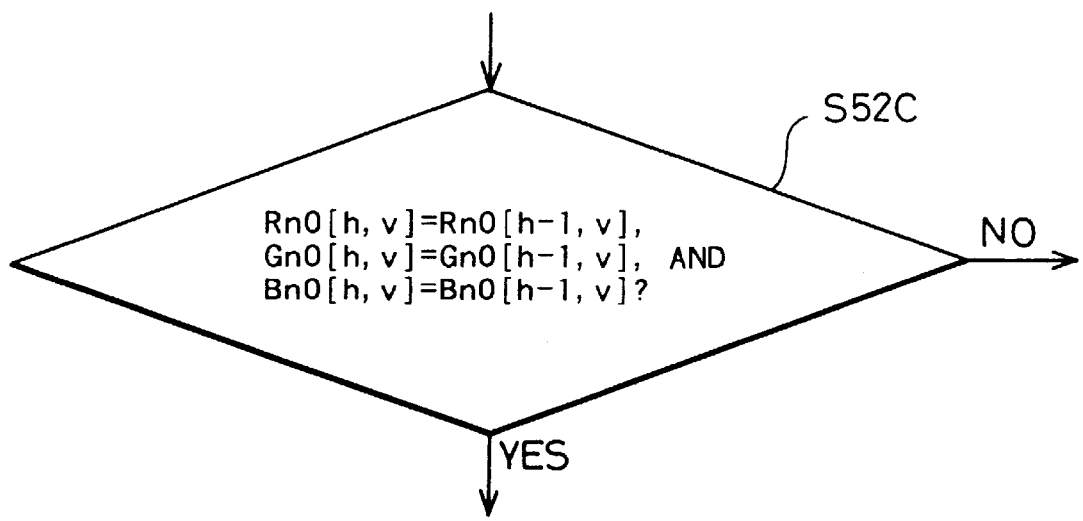
FIG. 32 shows still another step to determine whether or not the smoothing process should be carried out.

Another possible procedure shown by step S52C of FIG. 32 determines that the smoothing process should be carried out, only when the original color image data regarding the target pixel and the adjoining pixel exist in the space of the same quadratic prism defined by the adjoining lattice points.

In these examples, the smoothing process is carried out in case that the difference between the adjoining pixels is not greater than 1. In accordance with another possible application, the smoothing process may be carried out even when the difference is not less than 2. Since there is a difference between the respective color components in the number of tones after the pre-conversion of the tone number, the criterion may be set to be not less than 2 for only a specific color. In accordance with still another possible application, the determination may be based on the summation of the differences regarding the respective color components as shown by Inequality (7) given below:

Inequality 7

$$|Rn[h,v]-Rn[h-1,v]|+|Gn[h,v]-Gn[h-1,v]|+|Bn[h,v]-Bn[h-1,v]| \leq 3 \qquad (7)$$

In this example, even when the specific color component is allocated to a lattice point different from the same or adjoining lattice point, the smoothing process is carried out as long as the other color components are allocated to the same lattice point. Another possible condition is that the smoothing process is carried out when the summation of squares of the differences regarding the respective color components is not greater than a predetermined value as shown by Inequality (8) given below: Inequality 8

$$(Rn[h,v]-Rn[h-1,v])^2+(Gn[h,v]-Gn[h-1,v])^2+(Bn[h,v]-Bn[h-1,v])^2 \leq 2^2 \qquad (8)$$

Figure 33:
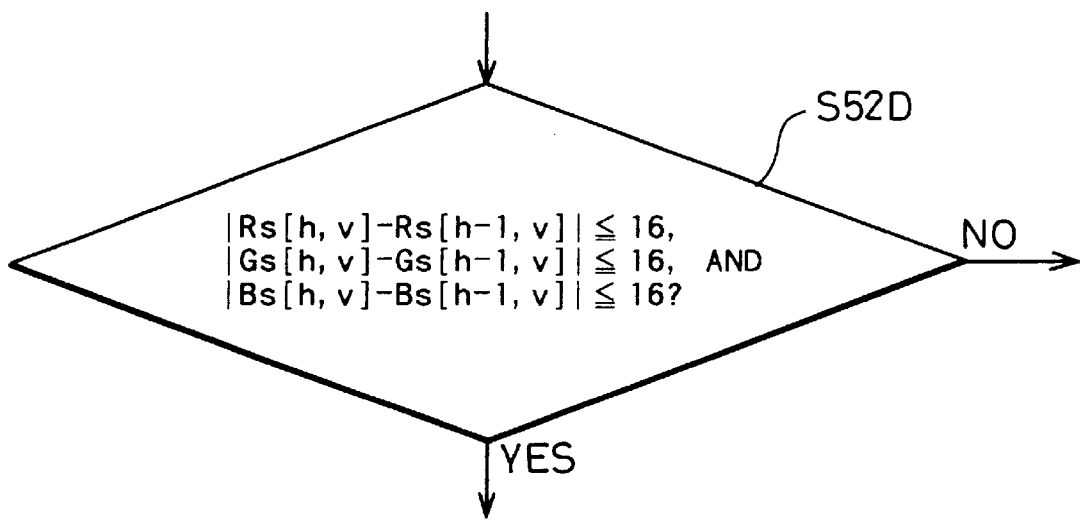
FIG. 33 shows another step to determine whether or not the smoothing process should be carried out.

As shown by step S52D of FIG. 33, the determination may be based on the original color image data Rs[h,v], Gs[h,v], and Bs[h,v], instead of the data after the pre-conversion of the tone number. In this embodiment, the original color image data have 256 tones ranging from 0 to 255. The processing of step S52D accordingly determines that the smoothing process should be carried out when the difference of each color component between the adjoining pixels is not greater than 16 tones. The difference of each color component used as the criterion may be varied arbitrarily. It is desirable to determine the difference used as the criterion by actually carrying out the processing for a predetermined image. In accordance with another preferable application, the determination may be based on both the original color image data and the data after the pre-conversion of the tone number.

Figure 34:
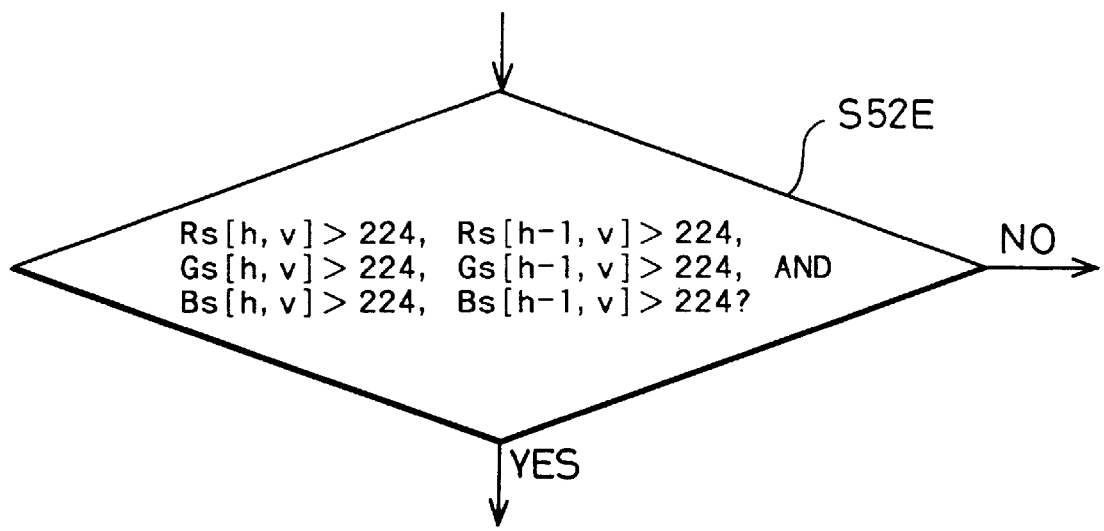
FIG. 34 shows still another step to determine whether or not the smoothing process should be carried out.

In the case of the color printer 22, the effect of quantization errors due to the pre-conversion of the tone number is most prominent in the low-density range (highlight range) of a resulting image. One practical procedure accordingly carried out the smoothing process only in the vicinity of the highlight range. For example, the processing of step S52E shown in FIG. 34 determines the execution of the smoothing process only in the highlight range. In this example, the low-density range is defined by the original color image data, and the smoothing process is carried out when the original color image data Rs, Gs, and Bs regarding the target pixel [h,v] and the adjoining pixel [h−1,v] are all not less than 224 tones among the range of 0 to 255 tones. The value 224 tones used as the threshold value of determination may be varied arbitrarily. An appropriate value is set as the threshold value by actually processing various images.

(2) Fifth Embodiment

Figure 35:
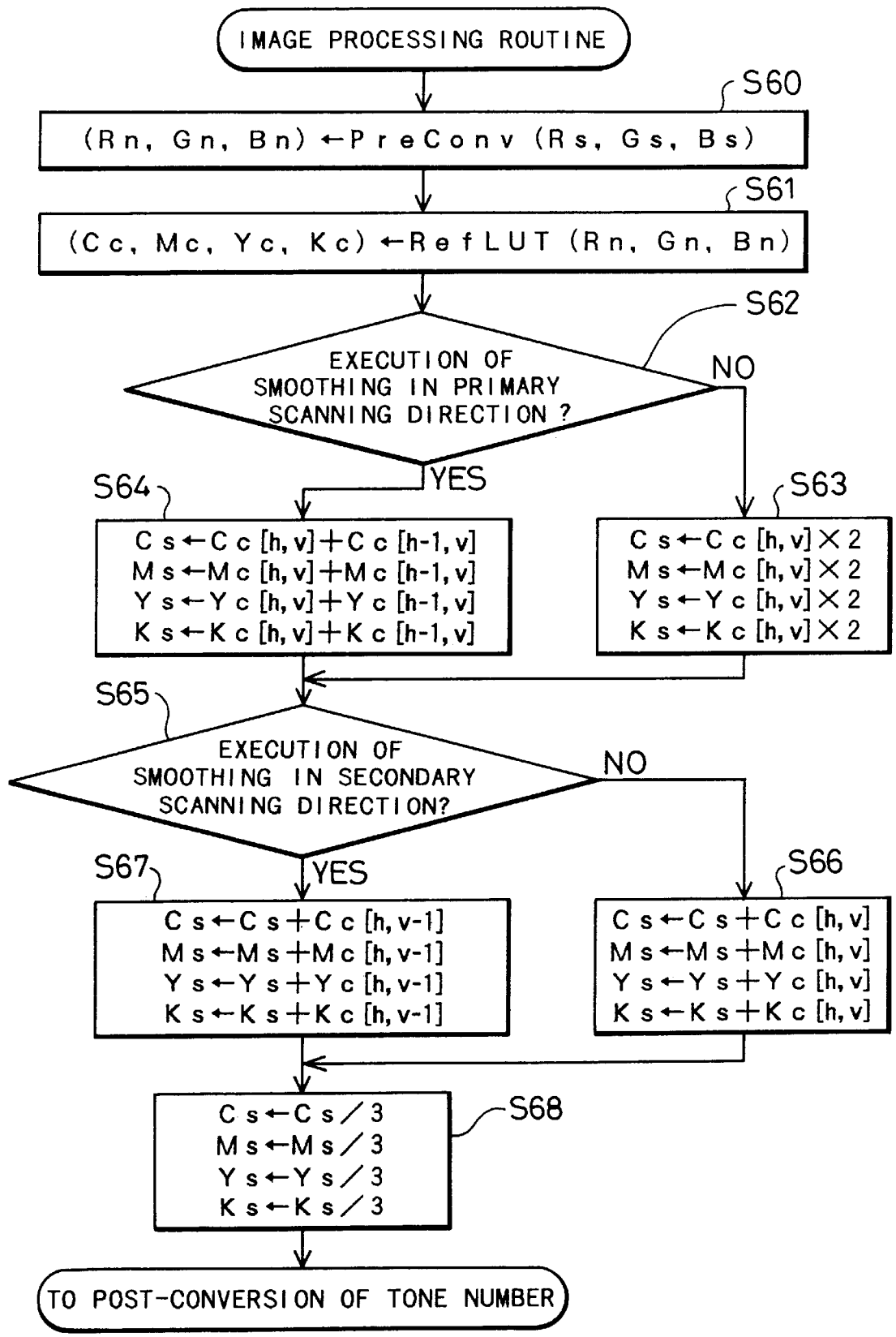
FIG. 35 is a flowchart showing an image processing routine executed in the fifth embodiment.

In the image processing apparatus 30B of the fifth embodiment, the, pre-tone number conversion unit 140, the color correction unit 142, and the smoothing unit 150 are realized by an image processing routine shown in the flowchart of FIG. 35. In the fifth embodiment, the smoothing process is carried out not only for the adjoining pixels in the primary scanning direction but for the adjoining pixels in the secondary scanning direction. When the program enters the routine of FIG. 35, the pre-tone number conversion unit 140 carries out the pre-conversion of the tone number at step S60, and the color correction unit unit 142 carries out the color correction at step S61. The processing of steps S60 and S61 is identical with the processing of steps S51 and S51 in the flowchart of FIG. 29. It is then determined whether or not the smoothing process should be carried out for the adjoining pixels in the primary scanning direction at step S62. A variety of criterion can be applied for the determination as described above in the fourth embodiment and its modified examples.

When it is determined that the smoothing process is not carried out for the adjoining pixels in the primary scanning direction, the color-adjusted data Cc[h,v], Mc[h,v], Yc[h,v], and Kc[h,v] regarding the target pixel are doubled and tentatively stored as output data Cs, Ms, Ys, and Ks at step S63. When it is determined that the smoothing process is carried out for the adjoining pixels in the primary scanning direction, on the other hand, the sums of the color-adjusted data regarding the target pixel and the adjoining pixel are calculated and tentatively stored as the output data Cs, Ms, Ys, and Ks at step S64.

Figure 36:
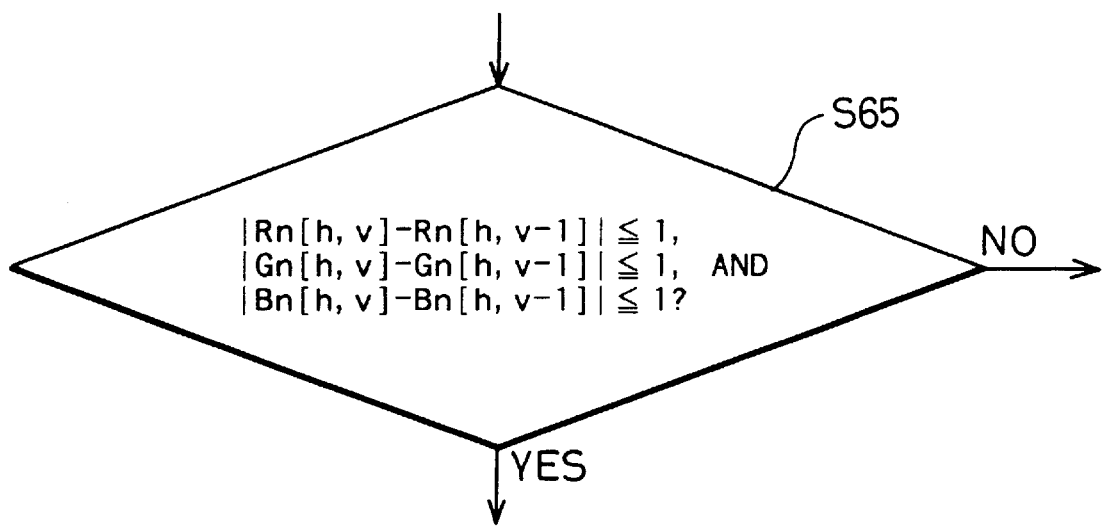
FIG. 36 shows a step to determine whether or not the smoothing process should be carried out in the fifth embodiment.

It is then determined whether or not the smoothing process should be carried out for the adjoining pixels in the secondary scanning direction at step S65. For example, it is determined that the smoothing process is carried out when the difference of the lattice point color image data between the target pixel [h,v] and the adjoining pixel [h,v−1] before the target pixel in the secondary scanning direction is not greater than one for all the respective color components, as shown by step S65 of FIG. 36. The variety of criterion discussed in the fourth embodiment and its modified examples are also applicable for this determination. The determination of step S62 may be different from the determination of step S65. In case that the color printer 22 used as the output unit of the resulting image has different resolutions in the vertical direction and in the horizontal direction, for example, it is practical to adopt different criterion for determination of execution or non-execution of the smoothing process in the primary scanning direction and in the secondary scanning direction.

When it is determined that the smoothing process is not carried out for the adjoining pixels in the secondary scanning direction, the color-adjusted data Cc[h,v], Mc[h,v], Yc[h,v], and Kc[h,v] regarding the target pixel are added to the output data Cs, Ms, Ys, and Ks tentatively stored at step S66. When it is determined that the smoothing process is carried out for the adjoining pixels in the secondary scanning direction, on the other hand, the color-adjusted data Cc[h,v−1], Mc[h,v−1], Yc[h,v−1], and Kc[h,v−1] regarding the adjoining pixel before the target pixel in the secondary scanning direction are added to the output data Cs, Ms, Ys, and Ks tentatively stored at step S67.

The program subsequently divides the data Cs, Ms, Ys, and Ks obtained at either one of steps S66 and S67 by three to yield the mean and outputs the mean as the smoothed data Cs, Ms, Ys, and Ks to the post-tone number conversion unit 146 at step S68.

In the structure of the fifth embodiment, the smoothing process is carried out not only for the adjoining pixels in the primary scanning direction but for the adjoining pixels in the secondary scanning direction. This structure effectively prevents the deterioration of picture quality due to the quantization errors caused by the pre-conversion of the tone number in both the primary scanning direction and the secondary scanning direction, thereby further improving the picture quality of the resulting image.

(3) Sixth Embodiment

In the sixth embodiment of the present invention, the smoothing process is carried out when the color printer 22 used as the image output unit 20 can discharge light cyan ink C2 that has the lower density than that of the cyan ink C and light magenta ink M2 that has the lower density than that of the magenta ink M, in addition to the cyan ink C, magenta ink M, yellow ink Y, and black ink K. In the hardware structure shown in FIG. 3, this color printer 22 has six rows of color heads 61 through 66 corresponding to the six color inks on the carriage 31, and the five color inks (including both the lower-density inks and the higher-density inks) other than the black ink K are accommodated in the color ink cartridge 72. The table of FIG. 37 shows the composition of all the six color inks. In case that the cyan ink and the magenta ink are spouted at low densities to express a low-density range of the original color image data, dots formed by these inks are rather conspicuous in this range. This increases the degree of granularity and deteriorates the picture quality. This is why the lower-density inks, the light cyan ink C2 and the light magenta ink M2, are provided for cyan and magenta. In the low-density range of the original color image data, the lower-density inks are used for printing. This significantly improves the quality of the resulting image. The lower-density ink is not provided for yellow, since the yellow ink Y has high lightness and does not substantially cause any granularity.

Figure 38:
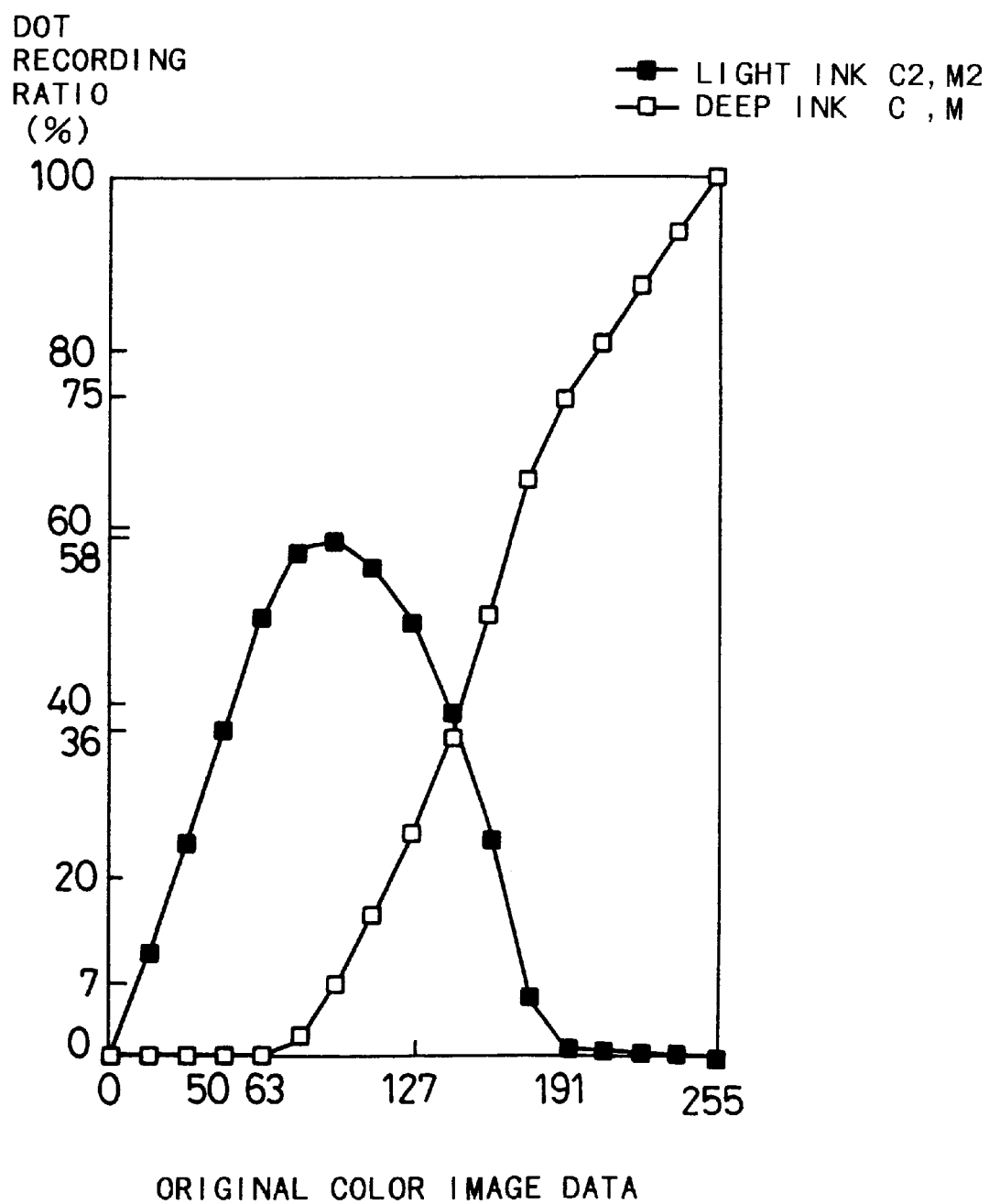
FIG. 38 is a graph showing the dot recording ratios of light ink and deep ink in the sixth embodiment.

The graph of FIG. 38 shows the curves of dot recording ratios of the lower-density ink (hereinafter may be referred to as the light ink) and the higher-density ink (hereinafter may be referred to as the deep ink) regarding cyan and magenta. In this embodiment, the light ink is primarily spouted for printing in the low-density range of the original color image data. With an increase in density of the original color image data, the ratio of the deep ink is gradually increased, while the ratio of the light ink is decreased. Only the deep ink is used for printing in the range of not less than a predetermined density.

Figure 39:
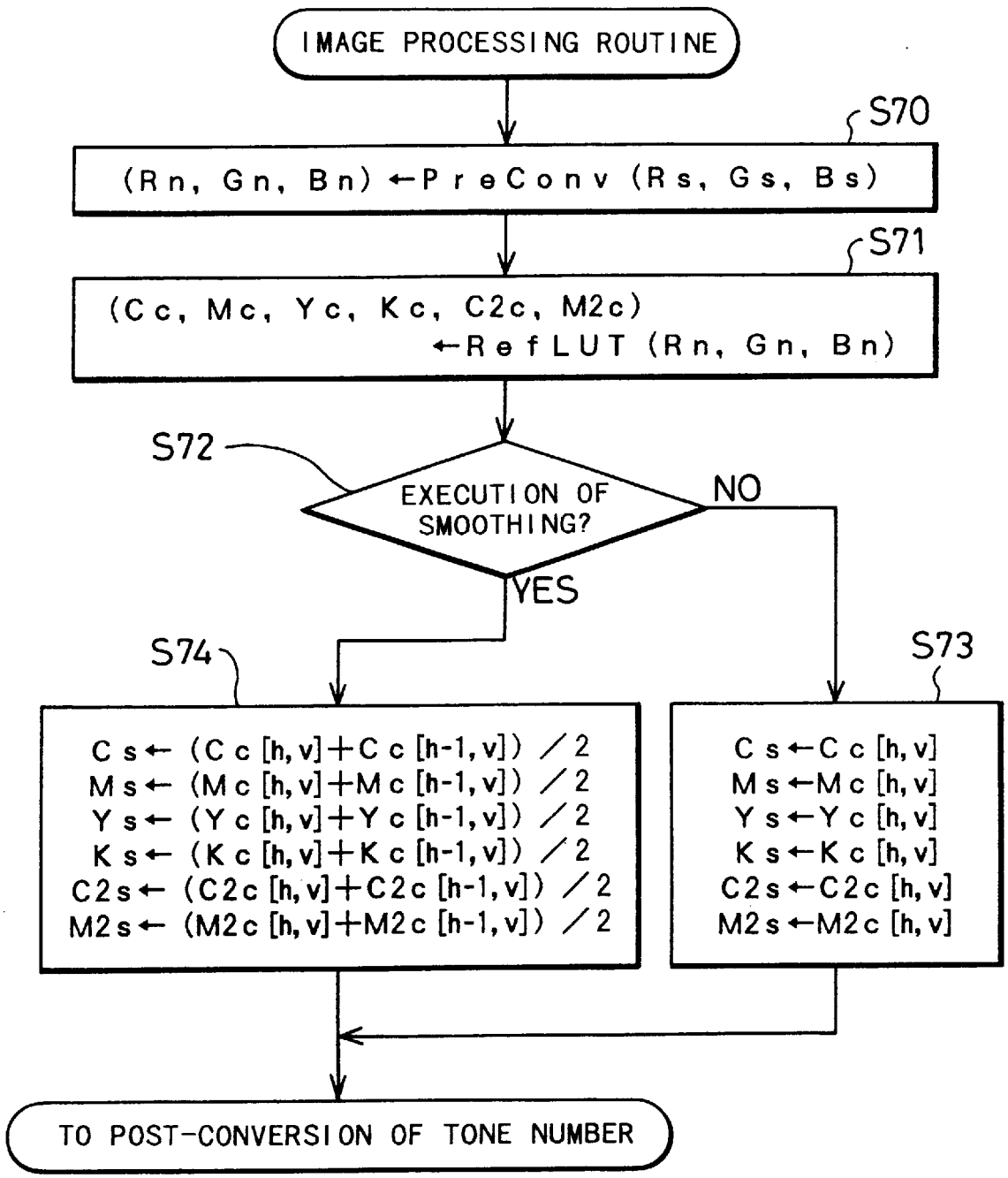
FIG. 39 is a flowchart showing an image processing routine executed in the sixth embodiment.

In the image processing apparatus 30B of the sixth embodiment, the pre-tone number conversion unit 140, the color correction unit 142, and the smoothing unit 150 are realized by an image processing routine shown in the flowchart of FIG. 39. When the program enters the routine of FIG. 39, the pre-tone number conversion unit 140 causes the respective color components Rs, Gs, and Bs of the original color image data to be subjected to the pre-conversion of the tone number at step S70. The color correction unit unit 142 then refers to the color correction table CT and causes the respective color components Rn, Gn, and Bn of the lattice point color image data after the pre-conversion to be subjected to the color correction at step S71. The color correction table CT converts the R, G, and B components to the six colors C, M, Y, K, C2, and M2.

It is then determined whether or not the smoothing process should be carried out for the target pixel at step S72. This process is basically identical with the determination discussed above in the fourth embodiment and its modified examples. When it is determined that the smoothing process is not carried out, the respective color components Cc[h,v], Mc[h,v], Yc[h,v], Kc[h,v], C2c[h,v], and M2 c[h,v] of the color-adjusted data regarding the target pixel are output to the post-tone number conversion unit 146 as output data Cs, Ms, Ys, Ks, C2s, and M2s at step S73. When it is determined that the smoothing process is carried out, on the other hand, the arithmetic mean of the respective color components Cc[h−1,v], Mc[h−1,v], Yc[h−1,v], Kc[h−1,v], C2c[h−1,v], and M2c[h−1,v] of the color-adjusted data regarding the adjoining pixel before the target pixel in the primary scanning direction and those Cc[h,v], Mc[h,v], Yc[h,v], Kc[h,v], C2c[h,v], and M2c[h,v] regarding the target pixel is calculated and output to the post-tone number conversion unit 146 as the output data Cs, Ms. Ys, Ks, C2s, and M2s at step S74.

The structure of the sixth embodiment carries out the smoothing process for the six color inks including the light cyan ink C2 and the light magenta ink M2 used in the color printer 22, which adequately spouts the light inks and the deep inks for printing. This structure effectively prevents the deterioration of picture quality due to the quantization errors caused by the pre-conversion of the tone number.

(4) Seventh Embodiment

In the fourth through the sixth embodiments, execution or non-execution of the smoothing process is based on the differences of the respective color components of the data either before or after the pre-conversion of the tone number between the target pixel and the adjoining pixel (for example, the adjoining pixel before the target pixel either in the primary scanning direction or in the secondary scanning direction). In the seventh embodiment, on the other hand, the determination and the actual smoothing process are carried out for each color component.

Figure 40:
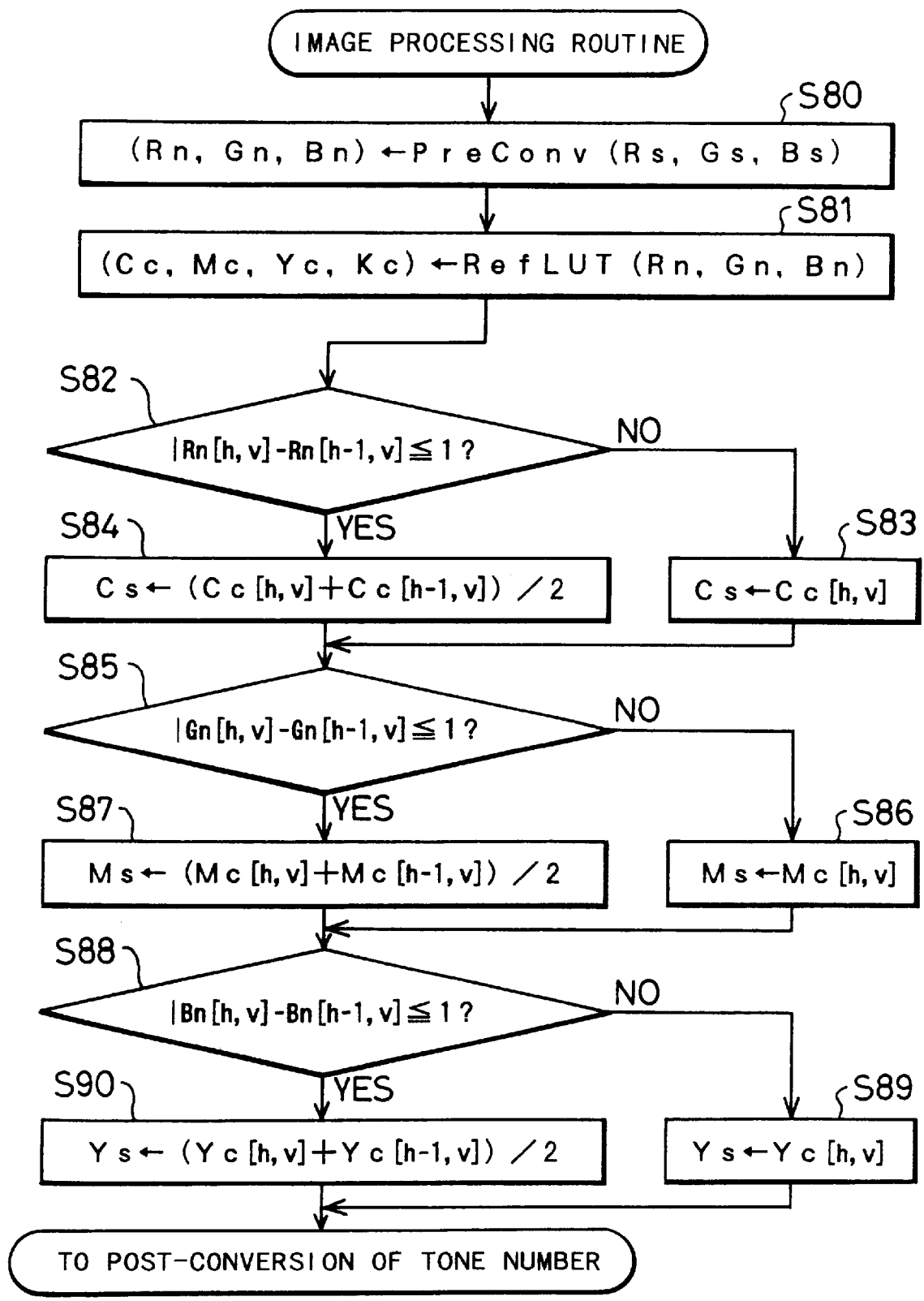
FIG. 40 is a flowchart showing an image processing routine executed in the seventh embodiment.

In the image processing apparatus 30B of the seventh embodiment, the pre-tone number conversion unit 140, the color correction unit 142, and the smoothing unit 150 are realized by an image processing routine shown in the flowchart of FIG. 40. When the program enters the routine of FIG. 40, the pre-tone number conversion unit 140 causes the respective color components Rs, Gs, and Bs of the original color image data to be subjected to the pre-conversion of the tone number at step S80. The color correction unit unit 142 then refers to the color correction table CT and causes the respective color components Rn, Gn, and Bn of the lattice point color image data after the pre-conversion to be subjected to the color correction at step S81.

At subsequent step S82, the difference between the target pixel and the adjoining pixel in the component R of the lattice point color image data after the pre-conversion of the tone number is compared with a predetermined value. When the difference of the component R on the lattice points between the adjoining pixels is greater than 1, the program determines that the smoothing process is not carried out and sets the color-adjusted data Cc[h,v] of the target pixel to the output data Cs at step S83. When the difference of the component R on the lattice points between the adjoining pixels is not greater than 1, on the other hand, the program determines that the smoothing process is carried out, calculates the arithmetic mean of the cyan component Cc[h,v] of the color-adjusted data regarding the target pixel and the cyan component Cc[h−1,v] of the color-adjusted data regarding the adjoining pixel before the target pixel in the primary scanning direction, and sets the arithmetic mean to the output data Cs at step S84.

Execution or non-execution of the smoothing process for the cyan ink C is based on the component R of the original color image data, since the strong correlations are found between R and C, G, and M, and B and Y in the conversion of RGB to CMY.

After the processing has been concluded for the cyan ink C, the smoothing process is successively carried out for the magenta ink M based on the difference in the component G on the lattice points between the target pixel and the adjoining pixel (steps S85 through S87) and for the yellow ink Y based on the difference in the component B on the lattice points between the target pixel and the adjoining pixel (steps S88 through S90). After these processes, the post-conversion of the tone number is carried out.

The structure of the seventh embodiment determines execution or non-execution of the smoothing process for each color component. This structure is especially preferable in the case of converting only a specific tone and exerts the effect of smoothing while enabling the sharpness of the edges of the original image to be maintained.

The present invention is not restricted to the above embodiments or their modified examples, but there may be many other modifications, changes, and alterations without departing from the scope or spirit of the main characteristics of the present invention.

For example, in the fourth through the seventh embodiments, execution or non-execution of the smoothing process is based on the difference between the target pixel and the adjoining pixel before the target pixel either in the primary scanning direction or in the secondary scanning direction. The determination may alternatively be based on the difference between the target pixel and the adjoining pixel [h+1,v] or [h,v+1] after the target pixel either in the primary scanning direction or in the secondary scanning direction. A smoothing filter of any range other than those shown in FIGS. 28A through 28D can be adopted for the smoothing process. Although the determination and the actual smoothing process are carried out for all the color components in the above embodiments, the determination and the actual smoothing process may be limited to one or a plurality of specific colors. For example, the yellow ink Y that has high lightness and is generally inconspicuous may be omitted from the smoothing process. This structure further enhances the processing speed. In the printer having both the light inks and deep inks, it is also preferable that the light inks that substantially cause no granularity are omitted from the smoothing process.

In the fourth through the seventh embodiments, the pre-conversion of the tone number carried out prior to the smoothing process is not specifically described. As is clear, however, any one of the error diffusion method, the least mean-error method, and the dither method described in the second embodiment can be adopted for the pre-conversion of the tone number. The smoothing process sufficiently compensates the deterioration of picture quality by the dither method and ensures output of the favorable resulting image.

In the above embodiments, the halftone module 99 is included in the printer driver 96 of the computer 90. The halftone module 99 may, however, be arranged in the printer 22. For example, In the latter case, the computer 90 transfers image information written in a language like PostScript to the printer 22 that has the halftone module 99 and the other related elements. In the embodiment, the software programs realizing a variety of functions are stored, for example, in a hard disk of the computer 90 and incorporated into the operating system in the form of the printer driver at the time of activation of the computer 90. In accordance with another possible application, the software programs may be stored in portable storage media (carriable storage media), such as floppy disks and CD-ROMs, and transferred from the storage media to the main memory of the computer 90 or an external storage device. As another example, the software programs may be transferred from the computer 90 to the printer 22. In accordance with still another application, the contents of the halftone module 99 may be transferred from a server for supplying these software programs to either the computer 90 or the printer 22 via a communication line.

Figure 41:
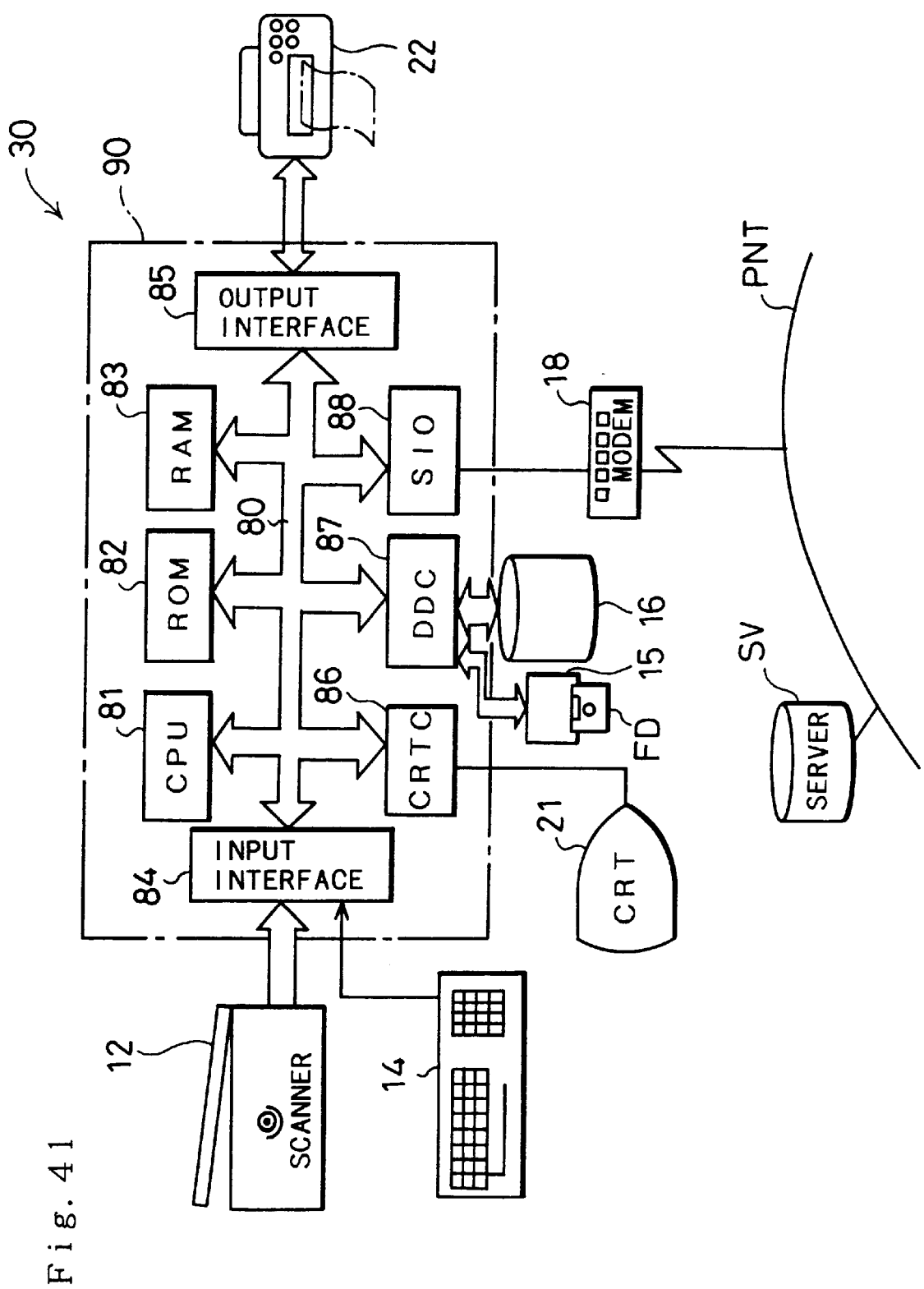
FIG. 41 is a block diagram illustrating internal structure of the computer 90 to realize the image processing apparatus 30.
Figure 42A:
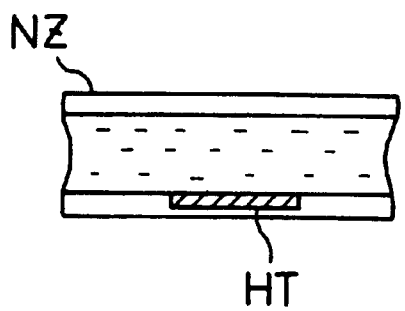
FIGS. 42A through 42E show another operation principle of the ink jet printer.
Figure 42B:
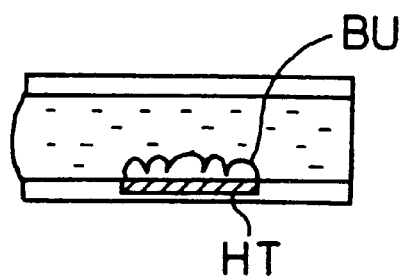
Figure 42C:
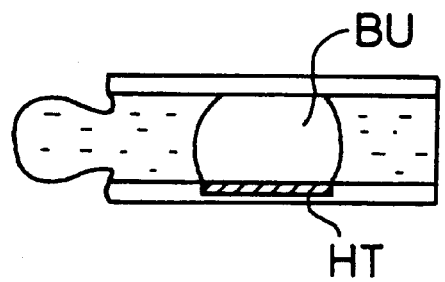
Figure 42D:
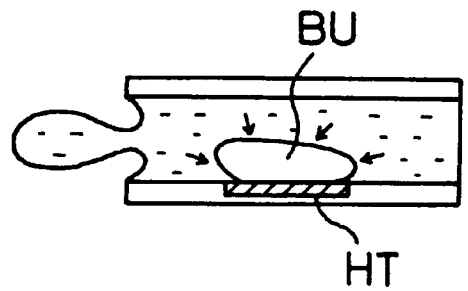
Figure 42E:
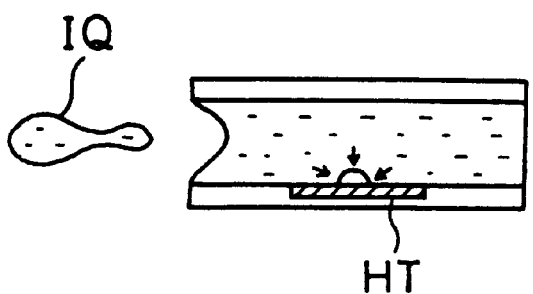

The computer 90 may have an internal structure as shown in the block diagram of FIG. 41. The computer 90 includes a CPU 81, which executes a variety of arithmetic and logic operations according to programs in order to control the actions relating to image processing, and peripheral units mutually connected to one another via a bus 80. A ROM 82 stores programs and data required for execution of the variety of arithmetic and logic operations by the CPU 81. A RAM 83 is a memory, which various programs and data required for execution of the variety of arithmetic and logic operations by the CPU 81 are temporarily read from and written in. An input interface 84 receives input signals from the scanner 12 and a keyboard 14, whereas an output interface 85 transfers output data to the printer 22. A CRTC 86 controls signal outputs to a CRT 21 that can display color images. A disk controller (DDC) 87 controls transmission of data from and to a hard disk (HD) 16, a flexible disk drive (FDD) 15, and a CD-ROM drive (not shown).

The hard disk 16 stores a variety of programs that are loaded into he RAM 83 and executed, as well as other programs that are supplied in the form of a device driver. A serial input-output interface (SIO) 88 is also connected to the bus 80. The SIO 88 is connected to a public telephone network PNT via a modem 18. The image processing apparatus 30 is connected with an external network via the SIO 88 and the modem 18, and can access a specific server SV in order to download the programs required for image processing into the hard disk 16. The computer 90 may alternatively execute the required programs loaded from a flexible disk FD or a CD-ROM.

The programs executed in the above embodiments may be recorded on recording media, such as flexible disks and CD-ROMs. The computer 90 reads these programs via the flexible disk drive 15 or the CD-ROM drive, thereby realizing the image processing discussed above.

In the above embodiments, a predetermined voltage is applied to the piezoelectric elements PE for a predetermined time period for spout of inks. Another method is, however, applicable to discharge inks. The available ink-discharge techniques can be classified into two types; that is, the method of separating ink particles from a continuous jet stream of ink and the on-demand method applied in the above embodiments. The former type includes a charge modulation method that separates droplets of ink from a jet stream of ink by means of charge modulation and a microdot method that utilizes fine satellite particles produced in the process of separating large-diametral particles from a jet stream of ink. These methods are also applicable to the printer 22 of the present invention.

The on-demand type, on the other hand, produces ink particles for the respective dot units according to the requirements. One available method included in the on-demand type, other than the method utilizing the piezoelectric elements applied in the above embodiments, disposes a heating body HT in the vicinity of a nozzle NZ of ink, produces bubbles BU by heating ink, and makes ink particles IQ discharged by the pressure of the bubbles BU as shown in FIGS. 42A through 42E. Such on-demand type methods are also applicable to the printer 22 of the present invention.

Although the above embodiments are related to the printer 22 that is operable alone as the image output unit 20, the principle of the present invention may be applicable to any image output units incorporated in a variety of apparatuses, such as digital copying machines and facsimiles. The principle of the present invention is also applicable to any image output units that record images by dots, for example, thermal transfer printers, thermal sublimation printers, and color laser printers, other than the ink jet printers discussed in the above embodiments. The principle of the present invention is further applicable to digital cameras which do not generally have a memory of large capacity. In this case, an image subjected to the image processing in the digital camera is directly output from the digital camera to the printer. In the prior art structure that requires a large capacity of error diffusion buffers, on the other hand, the image can not be output directly from the digital camera to the printer.

It should be clearly understood that the above embodiments are only illustrative and not restrictive in any sense. The scope and spirit of the present invention are limited only by the terms of the appended claims.

What is claimed is:

1. An image processing apparatus for causing a multi-color original image expressed by coordinate values in a multi-dimensional color space to be subjected to color correction and outputting a color-adjusted resulting image, said image processing apparatus comprising:

input means for inputting color image data with respect to each pixel included in said original image, coordinate values of said color image data being expressed by a predetermined number of tones given in a format corresponding to a density of each color component of said color image data;

lattice point information storage means for dividing said color space by a number of tones, which is less than said predetermined number of tones expressing the coordinate values of said color image data, in such a manner that a predetermined low-density range of said color space is divided into smaller areas than the other density ranges, and storing coordinate values of lattice points in said color space obtained by carrying out said division for each dimension;

a color correction table configured to store correction data regarding color of said color image data corresponding to each said lattice point and regarding tones of each color component of said color image data;

lattice point conversion means for converting the coordinate values of said input color image data in said color space to coordinate values of a specific lattice point stored in said lattice point information storage means according to a technique that makes mean offset of the coordinate values of said input color image data from the coordinate values of said specific lattice point not greater than a predetermined value and for dividing said predetermined low-density range of said color space, in order to make intervals of the tones of each color component of said color image data stored in said color correction table narrower in said predetermined low-density range than in the other density ranges;

color correction means for reading correction data of said specific lattice point corresponding to the converted coordinate values from said color correction table and outputting said correction data read from said color correction table as corrected color image data; and tone number conversion means for converting a number of tones of each color component of said corrected color image data output from said color correction means to a final number of tones suitable for an image output unit, wherein a number of tones obtained by said conversion of the coordinate values carried out by said lattice point conversion means is greater than the number of tones obtained by said conversion carried out by said tone number conversion means.

2. An image processing apparatus in accordance with claim 1, wherein said lattice point conversion means converts the coordinate values of said color image data to the coordinate values of said specific lattice point according to an error diffusion technique.

3. An image processing apparatus in accordance with claim 1, wherein said lattice point conversion means converts the coordinates values of said color image data to the coordinate values of said specific lattice point with a threshold matrix of discrete dither.

4. An image processing apparatus in accordance with claim 1, wherein said color correction table stores data that are compatible with color reproducing properties of an image output unit, which eventually processes said corrected color image data output from said color correction means, as said correction data.

5. An image processing apparatus for causing a multi-color original image expressed by coordinate values in a multi-dimensional color space to be subjected to color correction and outputting a color-adjusted resulting image, said image processing apparatus comprising:

input means for inputting color image data with respect to each pixel included in said original image, coordinate values of said color image data being expressed by a predetermined number of tones;

lattice point information storage means for dividing said color space by a number of tones, which is less than said predetermined number of tones expressing the coordinate values of said color image data, in such a manner that a predetermined low-density range of said color space is divided into smaller areas than the other density ranges, and storing coordinate values of lattice points in said color space obtained by carrying out said division for each dimension;

a color correction table for storing correction data regarding color of said color image data corresponding to each said lattice point;

lattice point conversion means for converting the coordinate values of said input color image data in said color space to coordinate values of a specific lattice point stored in said lattice point information storage means according to a technique that makes mean offset of the coordinate values of said input color image data from the coordinate values of said specific lattice point not greater than a predetermined value;

color correction data reading means for reading correction data of said specific lattice point corresponding to the converted coordinate values from said color correction table; and color correction means for selecting a first value corresponding to a main color among said correction data of said specific lattice point read by said color correction data reading means, reading a second value corresponding to said main color among correction data of an adjoining lattice point that has a coordinate value with respect to said main color different from that of said specific lattice point, carrying out interpolation with said first value and said second value, and outputting correction data including the coordinate value with respect to said main color replaced by a result of said interpolation as resulting corrected color image data.

6. An image processing apparatus in accordance with claim 5, wherein said interpolation carried out by said color correction means is linear interpolation.

7. An image processing apparatus in accordance with claim 5, wherein each coordinate value of said color image data is defined as a value corresponding to a density of each color component of said color image data, and said lattice point conversion means comprises first tone number conversion means for carrying out said conversion of the coordinate values as tone number conversion, said image processing apparatus further comprising:

second tone number conversion means for converting a number of tones of each color component of said corrected color image data output from said color correction means to a number of tones suitable for an image output unit, a number of tones obtained by said conversion of the coordinate values carried out by said first tone number conversion means being greater than the number of tones obtained by said conversion carried out by said second tone number conversion means.

8. An image processing apparatus for causing a multi-color original image expressed by coordinate values in a multi-dimensional color space to be subjected to color correction and outputting a color-adjusted resulting image wherein each coordinate value of said color image data is defined as a value corresponding to a density of each color component of said color image data, said image processing apparatus comprising:

input means for inputting color image data with respect to each pixel included in said original image, coordinate values of said color image data being expressed by a predetermined number of tones;

lattice point information storage means for dividing said color space by a number of tones, which is less than said predetermined number of tones expressing the coordinate values of said color image data, and storing coordinate values of lattice points in said color space obtained by carrying out said division for each dimension;

a color correction table for storing correction data regarding color of said color image data corresponding to each said lattice point;

lattice point conversion means for converting the coordinate values of said input color image data in said color space to coordinate values of a specific lattice point stored in said lattice point information storage means according to a technique that makes mean offset of the coordinate values of said input color image data from the coordinate values of said specific lattice point not greater than a predetermined value, said lattice point conversion means having first tone number conversion means for carrying out said conversion of the coordinate values as tone number conversion;

color correction data reading means for reading correction data of said specific lattice point corresponding to the converted coordinate values from said color correction table;

smoothing means for smoothing said correction data of each pixel read by said color correction data reading means, based on correction data of a peripheral pixel in the vicinity of said each pixel; and second tone number conversion means for converting a number of tones of each color component of said corrected color image data output from said color correction means to a number of tones suitable for an image output unit, wherein a number of tones obtained by said conversion of the coordinate values carried out by said first tone number conversion means is greater than the number of tones obtained by said conversion carried out by said second tone number conversion means.

9. An image processing apparatus in accordance with claim 8, wherein said lattice point conversion means converts the coordinates values of said color image data to the coordinate values of said specific lattice point with a threshold matrix of discrete dither.

10. An image processing apparatus in accordance with claim 8, wherein said lattice point conversion means converts the coordinate values of said color image data to the coordinate values of said specific lattice point according to an error diffusion technique.

11. An image processing apparatus in accordance with claim 8, wherein said lattice point conversion means comprises first coordinate conversion means for converging the coordinate values of said color image data to the coordinate values of said specific lattice point according to an error diffusion technique, second coordinate conversion means for converting the coordinate values of said color image data to the coordinates values of said specific lattice point with a threshold matrix of discrete dither, and conversion means selecting means for selecting either one of said first coordinate conversion means and said second coordinate conversion means, said smoothing means carrying out said smoothing process in a low-density range of said input color image data when said first coordinate conversion means is selected by said conversion means selecting means.

12. An image processing apparatus in accordance with claim 8, wherein said peripheral pixel used in said smoothing process carried out by said smoothing means is an adjoining pixel to said each pixel in an input direction of said color image data by said input means.

13. An image processing apparatus in accordance with claim 12, wherein said adjoining pixel is located before said each pixel in said input direction.

14. An image processing apparatus in accordance with claim 12, wherein said adjoining pixel is located after said each pixel in said input direction.

15. An image processing apparatus in accordance with claim 8, wherein said peripheral pixel used in said smoothing process carried out by said smoothing means comprises two adjoining pixels located before and after said each pixel in an input direction of said color image data by said input means.

16. An image processing apparatus in accordance with claim 8, wherein said peripheral pixel used in said smoothing process carried out by said smoothing means comprises an adjoining pixel to said each pixel in an input direction of said color image data by said input means and a pixel in a direction intersecting said input direction.

17. An image processing apparatus in accordance with claim 8, said image processing apparatus further comprising:

density detection means for detecting a density of said each pixel, based on said color image data of said each pixel input by said input means, wherein said smoothing means carries out said smoothing process when the density of said each pixel detected by said density detection means is not greater than a predetermined value.

18. An image processing apparatus in accordance with claim 8, wherein said smoothing means carries out said smoothing process with respect to a predetermined color component only in a range where a density of said predetermined color component of said input color image data is not greater than a predetermined value.

19. An image processing apparatus in accordance with claim 8, wherein said second tone number conversion means binarizes dots and expresses tones as distribution densities of said binarized dots, said smoothing means carries out said smoothing process when the density of said binarized dots is not greater than a predetermined value.

20. An image processing apparatus in accordance with claim 8, wherein said smoothing means comprises:

means for comparing said correction data of each pixel read by said color correction data reading means with correction data of an adjoining pixel to calculate a difference; and means for carrying out said smoothing process when the calculated difference is not greater than a predetermined value.

21. An image processing apparatus in accordance with claim 8, wherein said smoothing means determines whether or not said smoothing process is to be carried out for at least one color component out of color components constituting said color image data, and carries out said smoothing process for each color component based on said determination.

22. An image processing apparatus in accordance with claim 8, wherein said smoothing means carries out said smoothing process when it is estimated that a difference between input color image data regarding peripheral pixels in said color space is not greater than a predetermined distance.

23. An image processing apparatus in accordance with claim 22, wherein said smoothing means estimates that the difference between said peripheral pixels is not greater than said predetermined distance, in case that lattice points converted from said peripheral pixels by said lattice point conversion means are at farthest adjacent to each other.

24. An image processing apparatus in accordance with claim 22, wherein said smoothing means estimates that the difference between said peripheral pixels is not greater than said predetermined distance, in case that said input color image data regarding said peripheral pixels are both included in a unit space defined by the lattice points stored in said lattice point information storage means.

25. An image processing apparatus in accordance with claim 8, wherein said smoothing means comprises:
   means for estimating whether or not a difference between input color image data regarding peripheral pixels in said color space is not greater than a predetermined distance;
   means for determining whether or not another condition of said smoothing process is fulfilled; and
   means for carrying out said smoothing process only when the difference between said peripheral pixels is not greater than said predetermined distance and said another condition is fulfilled.

26. An image processing apparatus in accordance with claim 8, wherein said lattice point information storage means stores coordinate values of lattice points obtained by dividing a predetermined low-density range of said color space into smaller areas than the other density ranges.

27. An image processing apparatus for causing a multi-color original image expressed by coordinate values in a multi-dimensional color space to be subjected to color correction and outputting a color-adjusted resulting image, said image processing apparatus comprising:
   input means for inputting color image data with respect to each pixel included in said original image, coordinate values of said color image data being expressed by a predetermined number of tones;
   lattice point information storage means for dividing said color space by a number of tones, which is less than said predetermined number of tones expressing the coordinate values of said color image data, and storing coordinate values of lattice points in said color space obtained by carrying out said division for each dimension;
   a color correction table for storing correction data regarding color of said color image data corresponding to each said lattice point;
   lattice point conversion means for converting the coordinate values of said input color image data in said color space to coordinate values of a specific lattice point stored in said lattice point information storage means according to a technique that makes mean offset of the coordinate values of said input color image data from the coordinate values of said specific lattice point not greater than a predetermined value;
   color correction data reading means for reading correction data of said specific lattice point corresponding to the converted coordinate values from said color correction table; and
   color correction means for selecting a first value corresponding to a main color among said correction data of said specific lattice point read by said color correction data reading means, reading a second value corresponding to said main color among correction data of an adjoining lattice point that has a coordinate value with respect to said main color different from that of said specific lattice point, carrying out interpolation with said first value and said second value, and outputting correction data including the coordinate value with respect to said main color replaced by a result of said interpolation.

28. An image processing apparatus in accordance with claim 27, wherein each coordinate value of said color image data is defined as a value corresponding to a density of each color component of said color image data, and said lattice point conversion means comprises first tone number conversion means for carrying out said conversion of the coordinate values as tone number conversion,
   said image processing apparatus further comprising:
      second tone number conversion means for converting a number of tones of each color component of said correction data output from said color correction means to a number of tones suitable for an image output unit,
      a number of tones obtained by said conversion of the coordinate values carried out by said first tone number conversion means being greater than the number of tones obtained by said conversion carried out by said second tone number conversion means.

29. An image processing apparatus in accordance with claim 27, said image processing apparatus further comprising:
   smoothing means for smoothing said correction data of each pixel output from said color correction means, based on correction data of a peripheral pixel in the vicinity of said each pixel, and outputting said smoothed correction data as resulting color image data.

30. An image processing apparatus in accordance with claim 28, said image processing apparatus further comprising:
   smoothing means for smoothing said correction data of each pixel output from said color correction means, based on correction data of a peripheral pixel in the vicinity of said each pixel, and outputting said smoothed correction data as resulting color image data.

31. An image processing apparatus in accordance with claim 8, said image processing apparatus further comprising:
   image magnifying means for producing a new pixel between each pixel and an adjoining pixel based on color image data of said each pixel input by said input means and allocating said input color image data to said new pixel,
   wherein said smoothing means carries out said smoothing process between said each pixel and said new pixel produced by said image magnifying means.

32. An image processing method for causing a multi-color original image expressed by coordinate values in a multi-dimensional color space to be subjected to color correction and outputting a color-adjusted resulting image, said image processing method comprising the steps of:
   (a) inputting color image data with respect to each pixel included in said original image, coordinate values of said color image data being expressed by a predetermined number of tones given in a format corresponding to a density of each color component of said color image data;
   (b) dividing said color space by a number of tones less than said predetermined number of tones expressing the coordinate values of said color image data, in such a manner that a predetermined low-density range of said color space is divided in order to make intervals of the tones of each color component of said color image data stored in said color correction table narrower the other density ranges, and storing coordinate values of lattice points in said color space obtained by carrying out said division for each dimension;

(c) providing a color correction table for storing correction data regarding color of said color image data corresponding to each said lattice point and regarding tones of each color component of said color image data;

(d) converting the coordinate values of said input color image data in said color space to coordinate values of a specific lattice point stored in said step (b) according to a technique that makes mean offset of the coordinate values of said input color image data from the coordinate values of said specific lattice point not greater than a predetermined value;

(e) reading correction data of said specific lattice point corresponding to the converted coordinate values from said color correction table and outputting said correction data read from said color correction table as corrected color image data; and (f) converting a number of tones of each color component of said corrected color image data output in step (e) to a final number of tones suitable for an image output unit, wherein a number of tones obtained by said conversion of the coordinate values carried out by said step (d) is greater than the number of tones obtained by said conversion carried out by said tone number conversion in step (f).

33. An image processing method for causing a multi-color original image expressed by coordinate values in a multi-dimensional color space to be subjected to color correction and outputting a color-adjusted resulting image, said image processing method comprising the steps of:

(a) inputting color image data with respect to each pixel included in said original image, coordinate values of said color image data being expressed by a predetermined number of tones;

(b) dividing said color space by a number of tones, which is less than said predetermined number of tones expressing the coordinate values of said color image data, in such a manner that a predetermined low-density range of said color space is divided into smaller areas than the other density ranges, and storing coordinate values of lattice points in said color space obtained by carrying out said division for each dimension;

(c) providing a color correction table for storing correction data regarding color of said color image data corresponding to each said lattice point;

(d) converting the coordinate values of said input color image data in said color space to coordinate values of a specific lattice point stored in said step (b) according to a technique that makes mean offset of the coordinate values of said input color image data from the coordinate values of said specific lattice point not greater than a predetermined value;

(e) reading correction data of said specific lattice point corresponding to the converted coordinate values from said color correction table; and (f) selecting a first value corresponding to a main color among said correction data of said specific lattice point read in said step (e), reading a second value corresponding to said main color among correction data of an adjoining lattice point that has a coordinate value with respect to said main color different from that of said specific lattice point, carrying out interpolation with said first value and said second value, and outputting correction data including the coordinate value with respect to said main color replaced by a result of said interpolation as resulting corrected color image data.

34. An image processing method for causing a multi-color original image expressed by coordinate values in a multi-dimensional color space to be subjected to color correction and outputting a color-adjusted resulting image wherein each coordinate value of said color image data is defined as a value corresponding to a density of each color component of said color image data, said image processing method comprising the steps of:

(a) inputting color image data with respect to each pixel included in said original image, coordinate values of said color image data being expressed by a predetermined number of tones;

(b) dividing said color space by a number of tones, which is less than said predetermined number of tones expressing the coordinate values of said color image data, and storing coordinate values of lattice points in said color space obtained by carrying out said division for each dimension;

(c) providing a color correction table for storing correction data regarding color of said color image data corresponding to each said lattice point;

(d) converting the coordinate values of said input color image data in said color space to coordinate values of a specific lattice point stored in said step (b) according to a technique that makes mean offset of the coordinate values of said input color image data from the coordinate values of said specific lattice point not greater than a predetermined value, said conversion of the coordinate values carried out as a first tone number conversion;

(e) reading correction data of said specific lattice point corresponding to the converted coordinate values from said color correction table; and (f) smoothing correction data of each pixel read in said step (e), based on correction data of a peripheral pixel in the vicinity of said each pixel; and (g) carrying out a second conversion of a number of tones of each color component of said corrected color image data read in step (e) to a number of tones suitable for an image output unit, wherein a number of tones obtained by said first conversion of the coordinate values carried out in step (d) is greater than the number of tones obtained by said conversion carried out by said second tone number conversion in step (g).

35. An image processing method in accordance with claim 34, wherein said smoothing process is carried out when it is estimated that a difference between input color image data regarding peripheral pixels in said color space is not greater than a predetermined distance.

36. An image processing method for causing a multi-color original image expressed by coordinate values in a multi-dimensional color space to be subjected to color correction and outputting a color-adjusted resulting image, said image processing method comprising the steps of:

(a) inputting color image data with respect to each pixel included in said original image, coordinate values of said color image data being expressed by a predetermined number of tones;

(b) dividing said color space by a number of tones, which is less than said predetermined number of tones expressing the coordinate values of said color image data, and storing coordinate values of lattice points in said color space obtained by carrying out said division for each dimension;

(c) providing a color correction table for storing correction data regarding color of said color image data corresponding to each said lattice point;

(d) converting the coordinate values of said input color image data in said color space to coordinate values of a specific lattice point stored in said step (b) according to a technique that makes mean offset of the coordinate values of said input color image data from the coordinate values of said specific lattice point not greater than a predetermined value;

(e) reading correction data of said specific lattice point corresponding to the converted coordinate values from said color correction table;

(f) selecting a first value corresponding to a main color among said correction data of said specific lattice point read in said step (e), reading a second value corresponding to said main color among correction data of an adjoining lattice point that has a coordinate value with respect to said main color different from that of said specific lattice point, carrying out interpolation with said first value and said second value, and outputting correction data including the coordinate value with respect to said main color replaced by a result of said interpolation; and (g) smoothing said correction data of each pixel output in said step (f), based on correction data of a peripheral pixel in the vicinity of said each pixel, and outputting said smoothed correction data as resulting color image data.

37. A computer program product for causing a multi-color original image expressed by coordinate values in a multi-dimensional color space to be subjected to color correction and outputting a color-adjusted resulting image, said computer program product comprising:

a computer readable medium; and computer program code means stored on said computer readable medium, information previously stored on said computer readable medium comprising:

coordinate value data representing coordinate values of lattice points in said color space obtained by dividing said color space by a number of tones less than a predetermined number of tones for expressing coordinate values of color image data, for each dimension, in such a manner that a predetermined low-density range of said color space is divided in order to make intervals of the tones of each color component of said color image data stored in said color correction table narrower than the other density ranges; and a color correction table for storing correction data regarding color of said color image data corresponding to each said lattice point and regarding tones of each color component of said color image data, said computer program code means comprising:

first program code means for causing a computer to input said color image data with respect to each pixel included in said original image, the coordinate values of said color image data being expressed by said predetermined number of tones given in a format corresponding to a density of each color component of said color image data;

second program code means for causing the computer to convert the coordinate values of said input color image data in said color space to coordinate values of a specific lattice point stored as said coordinate value data according to a technique that makes mean offset of the coordinate values of said input color image data from the coordinate values of said specific lattice point not greater than a predetermined value;

third program code means for causing the computer to read correction data of said specific lattice point corresponding to the converted coordinate values from said color correction table end outputting said correction data reed from said color correction table as corrected color image data; and fourth program code means for causing the computer to convert a number of tones of each color component of said corrected color image data output from sad third program code means to a final number of tones suitable for an image output unit, wherein a number of tones obtained by said conversion of the coordinate values carried out by said second program code means is greater than the number of tones obtained by said conversion carried out by said fourth program code means.

38. A computer program product for causing a multi-color original image expressed by coordinate values in a multi-dimensional color space to be subjected to color correction and outputting a color-adjusted resulting image, said computer program product comprising:

a computer readable medium; and computer program code means stored on said computer readable medium, information previously stored on said computer readable medium comprising:

coordinate value data representing coordinate values of lattice points in said color space obtained by dividing said color space by a number of tones, which is less than a predetermined number of tones for expressing coordinate values of color image data, for each dimension, in such a manner that a predetermined low-density range of said color space is divided into smaller areas than the other density ranges; and a color correction table for storing correction data regarding color of said color image data corresponding to each said lattice point, said compute program code means comprising:

first program code means for causing a computer to input said color image data with respect to each pixel included in said original image, the coordinate values of said color image data being expressed by said predetermined number of tones;

second program code means for causing the computer to convert the coordinate values of said input color image data in said color space to coordinate values of a specific lattice point stored as said coordinate value data according to a technique that makes mean offset of the coordinate values of said input color image data from the coordinate values of said specific lattice point not greater than a predetermined value;

third program code means for causing the computer to read correction data of said specific lattice point corresponding to the converted coordinate values from said color correction table; and fourth program code means for causing the computer to select a first value corresponding to a main color among said correction data of said specific lattice point read from said color correction table, to read a second value corresponding to said main color among correction data of an adjoining lattice point that has a coordinate value with respect to said main color different from that of said specific lattice point, to carry out interpolation with said first value and said second value, and to output correction data including the coordinate value with respect to said main color replaced by a result of said interpolation as resulting corrected color image data.

39. A computer program product for causing a multi-color original image expressed by coordinate values in a multi-dimensional color space to be subjected to color correction and outputting a color-adjusted resulting image wherein each coordinate value of said color image data is defined as a value corresponding to a density of each color component of said color image data, said computer program product comprising:

a computer readable medium; and computer program code means stored on said computer readable medium, information previously stored on said computer readable medium comprising:

coordinate value data representing coordinate values of lattice points in said color space obtained by dividing said color space by a number of tones, which is less than a predetermined number of tones for expressing coordinate values of color image data, for each dimension; and a color correction table for storing correction data regarding color of said color image data corresponding to each said lattice point, said compute program code means comprising:

first program code means for causing a computer to input said color image data with respect to each pixel included in said original image, the coordinate values of said color image data being expressed by said predetermined number of tones;

second program code means for causing the computer to perform a first conversion in which the coordinate values of said input color image data in said color space are converted to coordinate values of a specific lattice point stored as said coordinate value data according to a technique that makes mean offset of the coordinate values of said input color image data from the coordinate values of said specific lattice point not greater than a predetermined value;

third program code means for causing the computer to read correction data of said specific lattice point corresponding to the converted coordinate values from said color correction table; and fourth program code means for causing the computer to smooth correction data of each pixel read from said color correction table, based on correction data of a peripheral pixel in the vicinity of said each pixel fifth program code means for causing the computer to perform a second conversion of a number of tones of each color component of said corrected color image data read by said third program code means to a number of tones suitable for an image output unit, wherein a number of tones obtained by said first conversion performed by said second program code means is greater than the number of tones obtained by said second conversion performed by said second tone number conversion in said fifth program code means.

40. A computer program product for causing a multi-color original image expressed by coordinate values in a multi-dimensional color space to be subjected to color correction and outputting a color-adjusted resulting image, said computer program product comprising:

a computer readable medium; and computer program code means stored on said computer readable medium, information previously stored on said computer readable medium comprising:

coordinate value data representing coordinate values of lattice points in said color space obtained by dividing said color space by a number of tones, which is less than a predetermined number of tones for expressing coordinate values of color image data, for each dimension; and a color correction table for storing correction data regarding color of said color image data corresponding to each said lattice point, said compute program code means comprising:

first program code means for causing a computer to input said color image data with respect to each pixel included in said original image, the coordinate values of said color image data being expressed by said predetermined number of tones;

second program code means for causing the computer to convert the coordinate values of said input color image data in said color space to coordinate values of a specific lattice point stored as said coordinate value data according to a technique that makes mean offset of the coordinate values of said input color image data from the coordinate values of said specific lattice point not greater than a predetermined value;

third program code means for causing the computer to read correction data of said specific lattice point corresponding to the converted coordinate values from said color correction table;

fourth program code means for causing the computer to select a first value corresponding to a main color among said correction data of said specific lattice point read from said color correction table, to read a second value corresponding to said main color among correction data of an adjoining lattice point that has a coordinate value with respect to said main color different from that of said specific lattice point, to carry out interpolation with said first value and said second value, and to output correction data including the coordinate value with respect to said main color replaced by a result of said interpolation; and fifth program code means for causing the computer to smooth said output correction data of each pixel, based on correction data of a peripheral pixel in the vicinity of said each pixel, and outputting said smoothed correction data as resulting color image data.

* * * * *